(12) United States Patent
Tsuchiya et al.

(10) Patent No.: US 11,297,221 B2
(45) Date of Patent: Apr. 5, 2022

(54) IMAGE-CAPTURING APPARATUS, ELECTRONIC DEVICE, AND PROGRAM

(71) Applicant: NIKON CORPORATION, Tokyo (JP)

(72) Inventors: Satoshi Tsuchiya, Kawasaki (JP); Yuuki Asano, Narashino (JP); Shuhei Yoshikawa, Tokyo (JP); Aiko Namikawa, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/366,133

(22) Filed: Mar. 27, 2019

(65) Prior Publication Data
US 2019/0222750 A1 Jul. 18, 2019

Related U.S. Application Data

(63) Continuation of application No. 15/533,072, filed as application No. PCT/JP2015/084031 on Dec. 3, 2015, now Pat. No. 10,284,771.

(30) Foreign Application Priority Data

Dec. 3, 2014 (JP) .................. 2014-245433

(51) Int. Cl.
*H04N 5/232* (2006.01)
*G03B 15/00* (2021.01)
(Continued)

(52) U.S. Cl.
CPC ......... *H04N 5/23216* (2013.01); *G03B 15/00* (2013.01); *G03B 17/18* (2013.01);
(Continued)

(58) Field of Classification Search
CPC .... H04N 5/23216; H04N 5/345; H04N 5/225; H04N 5/23222; H04N 5/23293;
(Continued)

(56) References Cited

U.S. PATENT DOCUMENTS

2007/0058064 A1* 3/2007 Hara ................ H04N 5/232935
348/333.01
2007/0132874 A1 6/2007 Forman et al.
(Continued)

FOREIGN PATENT DOCUMENTS

EP 1653279 A1 5/2006
JP 2004-179868 A 6/2004
(Continued)

OTHER PUBLICATIONS

Mar. 1, 2016 International Search Report issued in International Application No. PCT/JP2015/084031.
(Continued)

*Primary Examiner* — Mekonnen D Dagnew
(74) *Attorney, Agent, or Firm* — Oliff PLC

(57) ABSTRACT

An image-capturing apparatus includes: an image sensor having a first image-capturing region and a second image-capturing region different from the first image-capturing region; and a control unit that displays an image generated by the first image-capturing region and an image generated by the second image-capturing region on a display unit, with a region targeted for setting image-capturing conditions of the image sensor being selectable.

13 Claims, 33 Drawing Sheets

(51) Int. Cl.
 *G03B 17/18* (2021.01)
 *H04N 5/225* (2006.01)
 *H04N 5/345* (2011.01)
 *H04N 5/353* (2011.01)
 *H04N 5/374* (2011.01)

(52) U.S. Cl.
 CPC ......... *H04N 5/225* (2013.01); *H04N 5/23222* (2013.01); *H04N 5/23245* (2013.01); *H04N 5/232935* (2018.08); *H04N 5/232945* (2018.08); *H04N 5/345* (2013.01); *H04N 5/353* (2013.01); *H04N 5/374* (2013.01); *H04N 5/23212* (2013.01)

(58) Field of Classification Search
 CPC .... H04N 5/232; H04N 5/374; H04N 5/23245; H04N 5/353; G03B 15/00; G03B 17/18
 See application file for complete search history.

(56) References Cited

U.S. PATENT DOCUMENTS

| | | | |
|---|---|---|---|
| 2008/0024624 A1 | 1/2008 | Okamoto | |
| 2010/0141792 A1* | 6/2010 | Arai | H04N 5/3745 348/229.1 |
| 2010/0150450 A1 | 6/2010 | Tsuji | |
| 2010/0231738 A1* | 9/2010 | Border | H04N 5/772 348/222.1 |
| 2011/0157460 A1* | 6/2011 | Kim | H04N 5/23293 348/372 |
| 2012/0019687 A1* | 1/2012 | Razavi | H04N 5/23241 348/231.6 |
| 2013/0002928 A1 | 1/2013 | Imai | |
| 2014/0049666 A1 | 2/2014 | Tsutsumi | |
| 2014/0168463 A1* | 6/2014 | Tamura | H04N 9/735 348/223.1 |
| 2014/0267885 A1 | 9/2014 | Hirai | |
| 2014/0347541 A1 | 11/2014 | Okazaki | |
| 2016/0139774 A1* | 5/2016 | Rivard | G06F 3/04842 715/781 |
| 2017/0332008 A1 | 11/2017 | Tsuchiya et al. | |

FOREIGN PATENT DOCUMENTS

| | | |
|---|---|---|
| JP | 2005-055570 A | 3/2005 |
| JP | 2006-60629 A | 3/2006 |
| JP | 2006-197192 A | 7/2006 |
| JP | 2007-174548 A | 7/2007 |
| JP | 2008-028960 A | 2/2008 |
| JP | 2010-074314 A | 4/2010 |
| JP | 2010-226694 A | 10/2010 |
| JP | 2011-239267 A | 11/2011 |
| JP | 2012-235332 A | 11/2012 |
| JP | 2013-085178 A | 5/2013 |
| JP | 2013-258438 A | 12/2013 |
| JP | 2014-165855 A | 9/2014 |
| JP | 2014-179893 A | 9/2014 |
| JP | 2014-179920 A | 9/2014 |
| JP | 6610751 B2 | 11/2019 |
| WO | 2013/164915 A1 | 11/2013 |

OTHER PUBLICATIONS

Jan. 16, 2018 Office Action issued in Japanese Application No. 2016-562675.
Mar. 9, 2018 Office Action issued in U.S. Appl. No. 15/533,072.
Apr. 30, 2018 Extended Search Report issued in European Application No. 15864435.1.
Dec. 27, 2018 Notice of Allowance issued in U.S. Appl. No. 15/533,072.
Jul. 1, 2019 Office Action issued in European Patent Application No. 15864435.1.
May 29, 2019 Office Action issued in Chinese Patent Application No. 201580065732.1.
Dec. 19, 2019 Summons to Oral Proceedings issued in European Patent Application No. 15864435.1.
Apr. 23, 2020 Office Action issued in Chinese Patent Application No. 201580065732.1.
Sep. 15, 2020 Office Action issued in Japanese Patent Application No. 2019-198899.
Sep. 8, 2020 Office Action issued in Indian Patent Application No. 201717020341.
Jun. 8, 2021 Office Action issued in Japanese Patent Application No. 2019-198899.
Nov. 26, 2021 Office Action issued in Chinese Patent Application No. 202011506467.5.
Jan. 25, 2022 Office Action issued in Japanese Patent Application No. 2019-198899.

* cited by examiner

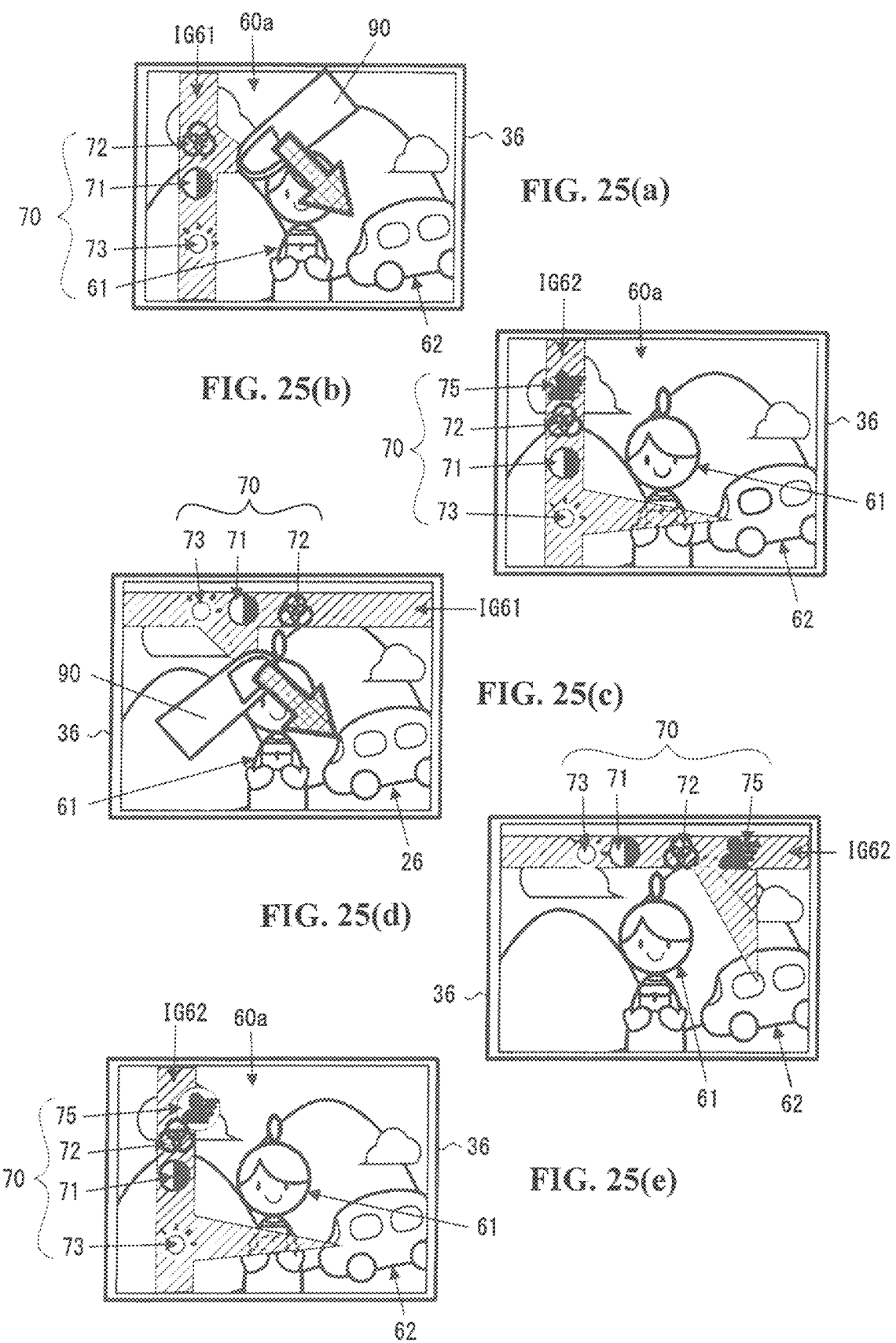

007# IMAGE-CAPTURING APPARATUS, ELECTRONIC DEVICE, AND PROGRAM

This is a continuation of U.S. patent application Ser. No. 15/533,072 filed Jun. 5, 2017, which is the U.S. National Stage of International Application No. PCT/JP2015/084031 filed Dec. 3, 2015, which claims priority from Japanese Application No. 2014-245433 filed Dec. 3, 2014. The entire disclosure of each of the above-identified applications is incorporated herein by reference.

TECHNICAL FIELD

The present invention relates to an image-capturing apparatus, an electronic device, and a program.

BACKGROUND ART

An image-capturing apparatus is known in which an exposure time defined by an electronic shutter can be controlled for each of pixel blocks into which an image-capturing plane is divided, based on an amount of movement of a subject (see PTL 1).

CITATION LIST

Patent Literature

PTL1: Japanese Laid-Open Patent Publication No. 2006-197192

SUMMARY OF INVENTION

Technical Problem

The operability in controlling the electronic shutter or the like for each pixel block has not been taken into consideration.

Solution to Problem

An image-capturing apparatus according to a first aspect of the present invention, comprises: an image sensor having a first image-capturing region and a second image-capturing region different from the first image-capturing region; and a control unit that displays an image generated by the first image-capturing region and an image generated by the second image-capturing region on a display unit, with a region targeted for setting image-capturing conditions of the image sensor being selectable.

According to a second aspect of the present invention, in the image-capturing apparatus according to the first aspect, it is preferable to further comprise: a detection unit that detects a subject based on the image generated by the first image-capturing region and the image generated by the second image-capturing region, wherein: the control unit determines ranks of the image generated by the first image-capturing region and the image generated by the second image-capturing region depending on the subject detected by the detection unit, for display on the display unit.

According to a third aspect of the present invention, in the image-capturing apparatus according to the first or second aspect, it is preferable that the control unit displays image-capturing conditions for the first image-capturing region and image-capturing conditions for the second image-capturing region on the display unit. According to a fourth aspect of the present invention, in the image-capturing apparatus according to the second aspect, it is preferable that the control unit assigns a higher rank to an image including a subject associated with a preset scene capture mode, between the image generated by the first image-capturing region and the image generated by the second image-capturing region.

According to a fifth aspect of the present invention, in the image-capturing apparatus according to the second aspect, it is preferable that the control unit assigns a higher rank to an image including a focused subject, between the image generated by the first image-capturing region and the image generated by the second image-capturing region.

According to a sixth aspect of the present invention, in the image-capturing apparatus according to the second aspect, it is preferable that the control unit assigns a higher rank to an image including a subject that is closest to the image-capturing apparatus, between the image generated by the first image-capturing region and the image generated by the second image-capturing region.

According to a seventh aspect of the present invention, in the image-capturing apparatus according to the second aspect, it is preferable that the control unit assigns a higher rank to an image including a subject having a lower or higher brightness than a predetermined value, among the image generated by the first image-capturing region and the image generated by the second image-capturing region.

According to an eighth aspect of the present invention, in the image-capturing apparatus according to the second aspect, it is preferable that the control unit assigns a higher rank to an image including a subject having a smaller difference in distances between subjects, among the image generated by the first image-capturing region and the image generated by the second image-capturing region.

According to a ninth aspect of the present invention, in the image-capturing apparatus according to the second aspect, it is preferable that the control unit assigns a higher rank to an image including a subject having a larger difference in brightness, between the image generated by the first image-capturing region and the image generated by the second image-capturing region.

According to a tenth aspect of the present invention, in the image-capturing apparatus according to the second aspect, it is preferable that the control unit assigns a higher rank to an image including a larger subject, between the image generated by the first image-capturing region and the image generated by the second image-capturing region.

According to an eleventh aspect of the present invention, in the image-capturing apparatus according to the second aspect, it is preferable that the control unit assigns a higher rank to an image including a subject closer to a center of the image, between the image generated by the first image-capturing region and the image generated by the second image-capturing region.

An electronic device according to a twelfth aspect of the present invention comprises: a control unit that displays an image generated by a first image-capturing region of an image sensor and an image generated by a second image-capturing region of the image sensor on a display unit, with a region targeted for setting image-capturing conditions of the image sensor being selectable; and a setting unit that sets image-capturing conditions of the region of the image sensor selected based on the images displayed on the display unit.

According to a thirteenth aspect of the present invention, in the electronic device according to the twelfth aspect, it is preferable to comprise: a detection unit that detects a subject based on the image generated by the first image-capturing region and the image generated by the second image-capturing region, wherein: the control unit determines ranks of the image generated by the first image-capturing region and the image generated by the second image-capturing region depending on the subject detected by the detection unit, for display on the display unit.

According to a fourteenth aspect of the present invention, in the electronic device according to the twelfth or thirteenth aspect of the present invention, it is preferable that the control unit displays image-capturing conditions for the first image-capturing region and image-capturing conditions for the second image-capturing region on the display unit.

A program, according to a fifteenth aspect of the present invention, for causing a computer to execute: image-capturing processing in which an image of a subject is captured by an image sensor having a first image-capturing region and a second image-capturing region different from the first image-capturing region; and display processing in which an image generated by the first image-capturing region and an image generated by the second image-capturing region are displayed on a display unit, with a region targeted for setting image-capturing conditions of the image sensor being selectable.

BRIEF DESCRIPTION OF DRAWINGS

FIGS. 25(a) to 25(e) are views illustrating a setting screen for image-capturing conditions in the sixth variation.

DESCRIPTION OF EMBODIMENTS

<Description of Camera>

Figure 1:
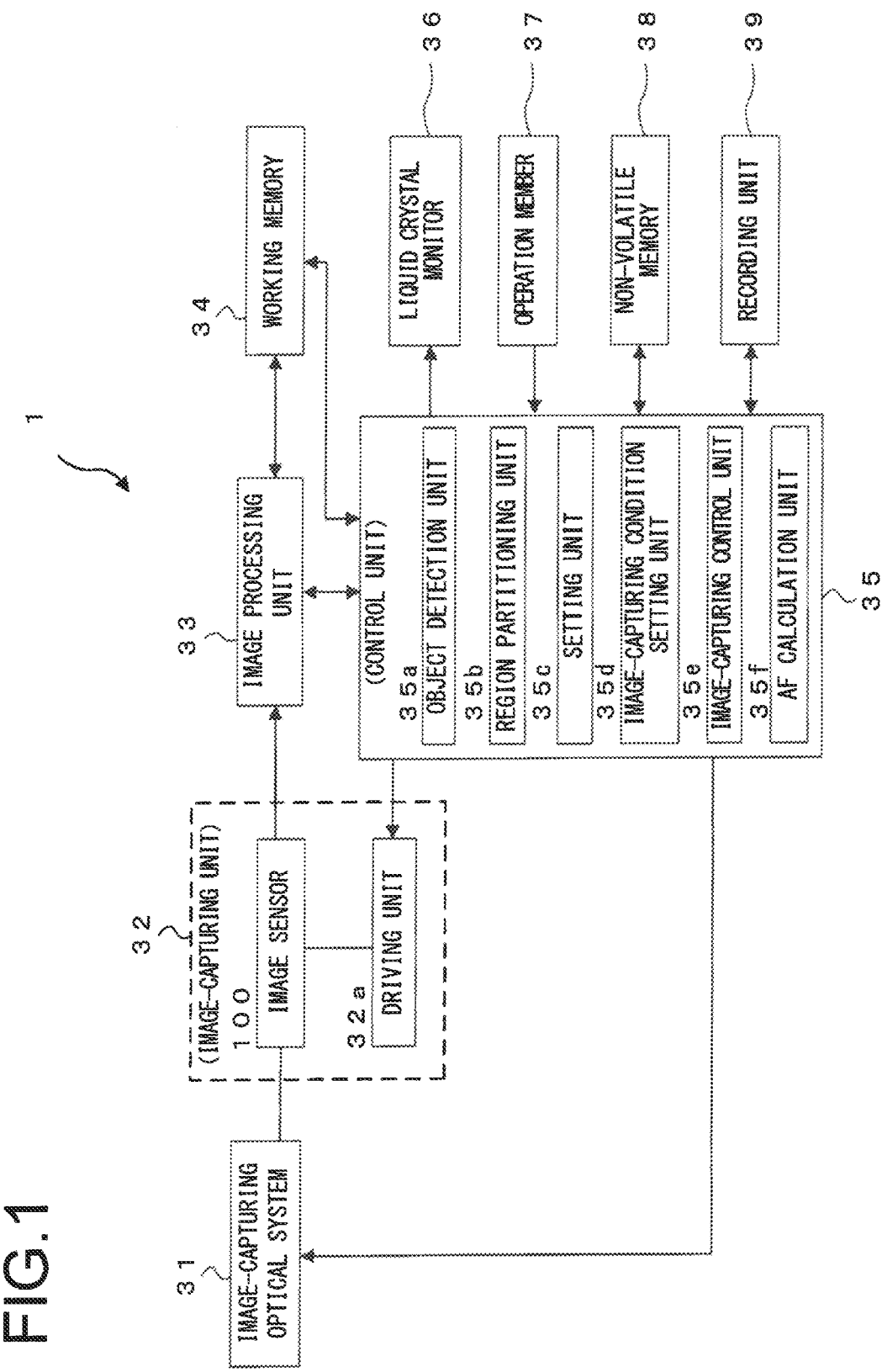
FIG. 1 is a block diagram illustrating a configuration of a camera according to an embodiment.

FIG. 1 is a block diagram illustrating a configuration of an electronic device (e.g., a camera 1) according to an embodiment. In FIG. 1, the camera 1 includes an image-capturing optical system 31, an image-capturing unit 32, an image processing unit 33, a working memory 34, a control unit 35, a liquid crystal monitor 36, an operation member 37, a non-volatile memory 38, and a recording unit 39.

The image-capturing optical system 31 directs light flux from a photographic field to the image-capturing unit 32. The image-capturing unit 32 includes an image sensor 100 and a driving unit 32a and performs a photoelectric conversion on a subject image formed by the image-capturing optical system 31. The driving unit 32a generates a driving signal required to cause the image sensor 100 to control charge accumulation. An image-capturing instruction for the image-capturing unit 32, such as an accumulation time, is transmitted from the control unit 35 to the driving unit 32a.

The image processing unit 33 cooperates with the working memory 34 to perform image processing on image data captured by the image-capturing unit 32. The image processing unit 33 performs contour enhancement (or edge enhancement) processing, gamma correction, white balance adjustment, and the like.

The working memory 34 temporarily records image data before and after image processing and other data. The control unit 35, which is composed of a CPU or the like, controls the overall operation of the camera 1. For example, the control unit 35 performs a predetermined exposure calculation on the basis of an image signal acquired by the image-capturing unit 32 to determine the accumulation time and other parameters of the image sensor 100 required for a proper exposure. The control unit 35 then sends an instruction to the driving unit 32*a*.

The control unit 35 includes an object detection unit 35*a*, a region partitioning unit 35*b*, a setting unit 35*c*, an image-capturing condition setting unit 35*d*, an image-capturing control unit 35*e*, and an AF calculation unit 35*f*. These units may be embodied in software by the control unit 35 executing programs stored in the non-volatile memory 38. Alternatively, the units may be made of an ASIC or the like.

The object detection unit 35*a* performs known object recognition processing to detect subject elements from the image captured by the image-capturing unit 32, such as persons (faces of persons), animals (faces of animals) such as dogs or cats, plants, vehicles such as bicycles, automobiles or trains, buildings, stationary objects, landscape elements such as mountains or clouds, and predetermined specific objects.

The region partitioning unit 35*b* divides (partitions) an image capture screen captured by the image-capturing unit 32 into a plurality of regions including the subject elements detected as described above. The setting unit 35*c* ranks the plurality of regions partitioned by the region partitioning unit 35*b*. A way of ranking will be described later.

The image-capturing condition setting unit 35*d* sets image-capturing conditions of the image sensor 100. As described later, the image-capturing conditions can be set for each of the plurality of regions partitioned by the region partitioning unit 35*b*. The image-capturing control unit 35*e* allows regions of the image sensor 100 to be controlled under the image-capturing conditions set for each region. In other words, the image-capturing control unit 35*e* controls image-capturing so that images are captured under different conditions such as an exposure time (accumulation time or storage time), a gain, and a frame rate for individual unit regions of the image sensor 100.

The AF calculation unit 35*f* performs an automatic focus adjustment (autofocus: AF) calculation for focusing on a corresponding subject at a predetermined position (referred to as a focus point) in the image capture screen. Based on the AF calculation result, the AF calculation unit 35*f* transmits a driving signal for shifting a focus lens of the image-capturing optical system 31 to a position where the focus lens focuses on the subject. It should be noted that the AF method may be a contrast detection method or a phase detection method.

The liquid crystal monitor 36 reproduces and displays an image processed by the image processing unit 33 or an image read out by the recording unit 39. The liquid crystal monitor 36 also displays an operation menu screen, a setting screen for setting image-capturing conditions, and other screens.

The operation member 37 includes a variety of operation members, such as a release button and a menu button. The operation member 37 transmits an operation signal corresponding to each operation to the control unit 35. The operation member 37 also includes a touch operation member provided on a display surface of the liquid crystal monitor 36.

The non-volatile memory 38 records the programs to be executed by the control unit 35 and the like. The recording unit 39 records image data and other data in a recording medium composed of a memory card (not shown) or the like, in response to an instruction from the control unit 35. The recording unit 39 also reads out the image data recorded in the recording medium, in response to an instruction from the control unit 35.

<Description of Stacked Image Sensor>

Figure 2:
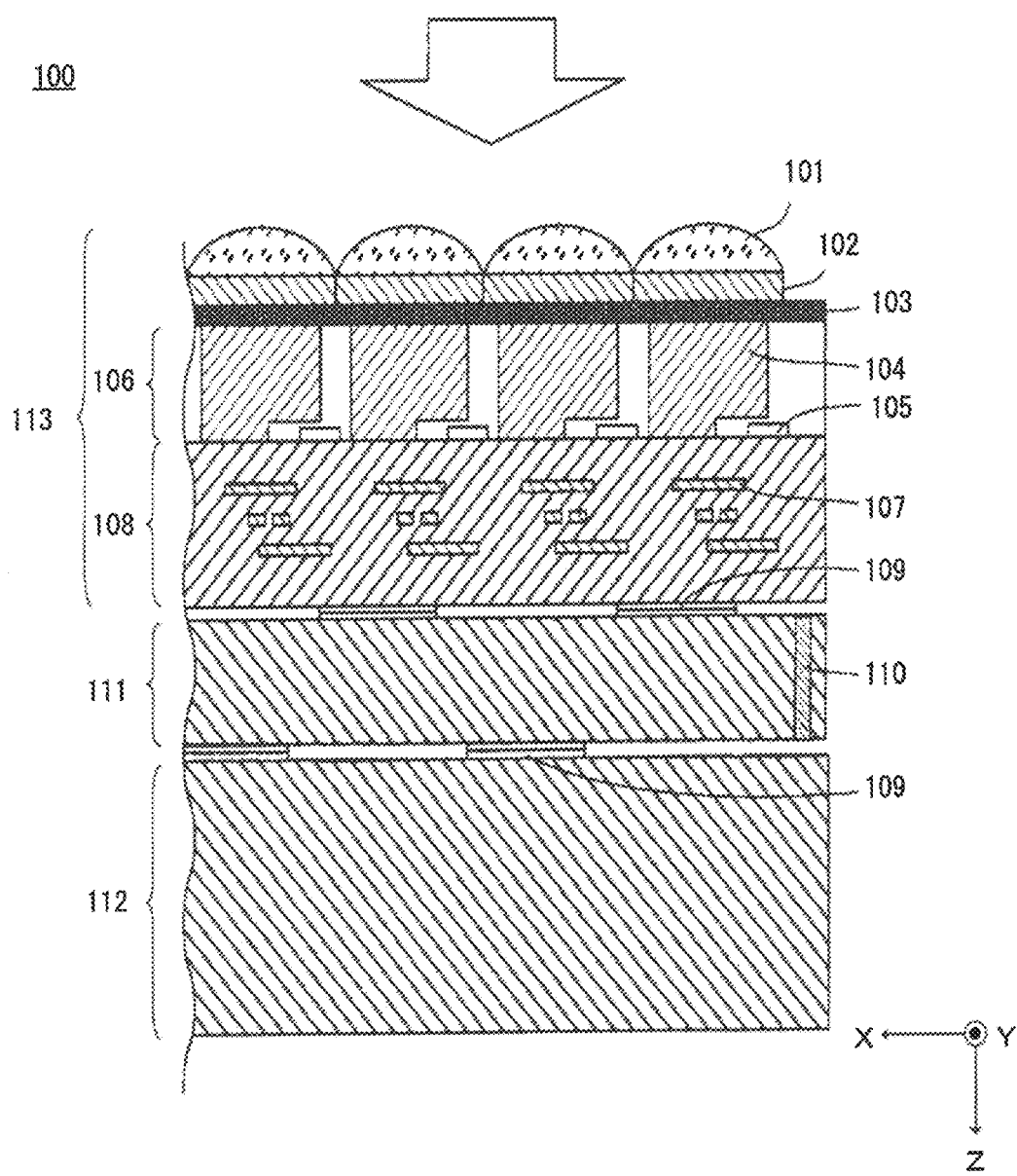
FIG. 2 is a cross-sectional view of a stacked image sensor.

A stacked image sensor 100 provided in the above-described camera 1 will be described. International Publication WO13/164915, which was previously filed by the present applicant and has been published, discloses the stacked image sensor 100. FIG. 2 is a cross-sectional view of the stacked image sensor 100. The image sensor 100 includes a back-side illumination image-capturing chip 113 that outputs a pixel signal corresponding to incident light, a signal processing chip 111 that processes the pixel signal, and a memory chip 112 that records the pixel signal. The image-capturing chip 113, the signal processing chip 111, and the memory chip 112 are stacked or laminated and electrically connected to one another with conductive bumps 109, which are made of Cu, for example.

It should be noted that the incident light is incident mainly in a positive Z-axis direction which is denoted by a white arrow, as illustrated in FIG. 2. In this embodiment, a surface of the image-capturing chip 113 on which the incident light is incident is referred to as a back surface (an image-capturing surface). Furthermore, a direction toward the left on the paper plane orthogonal to the Z axis will be defined as a positive X-axis direction, and a direction toward the front side of the paper plane orthogonal to the Z axis and the X axis will be defined as a positive Y-axis direction, as denoted by the coordinate axes. Several following figures include coordinate axes with reference to the coordinate axes of FIG. 2 to clarify the orientation of the figures.

An example of the image-capturing chip 113 is a back-side illumination MOS image sensor. A PD layer 106 is arranged on the back surface side of a wiring layer 108. The PD layer 106 includes a plurality of PDs (photodiodes) 104 that are two-dimensionally arranged and store charges in accordance with incident light, and transistors 105 that are provided in a manner corresponding to the PDs 104.

On the side of the PD layer 106 on which the incident light is incident, color filters 102 are arranged with a passivation film 103 between the PD layer 106 and the color filters 102. The color filters 102 include a number of types of filters transmitting different wavelength ranges and have a specific arrangement in a manner corresponding to the PDs 104. The arrangement of the color filters 102 will be described later. A color filter 102, a PD 104, and a transistor 105 together form one pixel.

On the side of the color filter 102 on which incident light is incident, a microlens 101 is provided in a manner corresponding to each pixel. The microlens 101 condenses the incident light onto the corresponding PD 104.

The wiring layer 108 has a wiring line 107 that transmits the pixel signal from the PD layer 106 to the signal processing chip 111. The wiring line 107 may be multilayered and may also be provided with passive elements and active elements.

A plurality of bumps 109 are disposed on a front surface of the wiring layer 108. The plurality of bumps 109 are aligned with a plurality of bumps 109 provided on an opposing surface of the signal processing chip 111. The aligned bumps 109 are then joined and electrically connected to each other by a pressure applied on the image-capturing chip 113 and the signal processing chip 111 or by other measures.

Similarly, a plurality of bumps 109 are disposed on opposing surfaces of the signal processing chip 111 and the memory chip 112. These bumps 109 are aligned with each other. The aligned bumps 109 are then joined and electrically connected to each other by a pressure applied on the signal processing chip 111 and the memory chip 112 or by other measures.

It should be noted that the bonding of the bumps 109 is not limited to Cu bump bonding by solid phase diffusion. Microbump bonding by solder melting may be employed. Additionally, only approximately one bump 109 is required for each of blocks which will be described later, for example. The size of the bump 109 may be thus larger than the pitch of the PDs 104. In a peripheral region other than the pixel region where the pixels are arranged, bumps that are larger than the bumps 109 corresponding to the pixel region may also be provided together.

The signal processing chip 111 has a TSV (through-silicon via) 110 that connects a circuit provided on the front surface to a circuit provided on the back surface of the signal processing chip 111. The TSV 110 is preferably provided in the peripheral region. The TSV 110 may also be provided in the peripheral region of the image-capturing chip 113 or in the memory chip 112.

Figure 3:
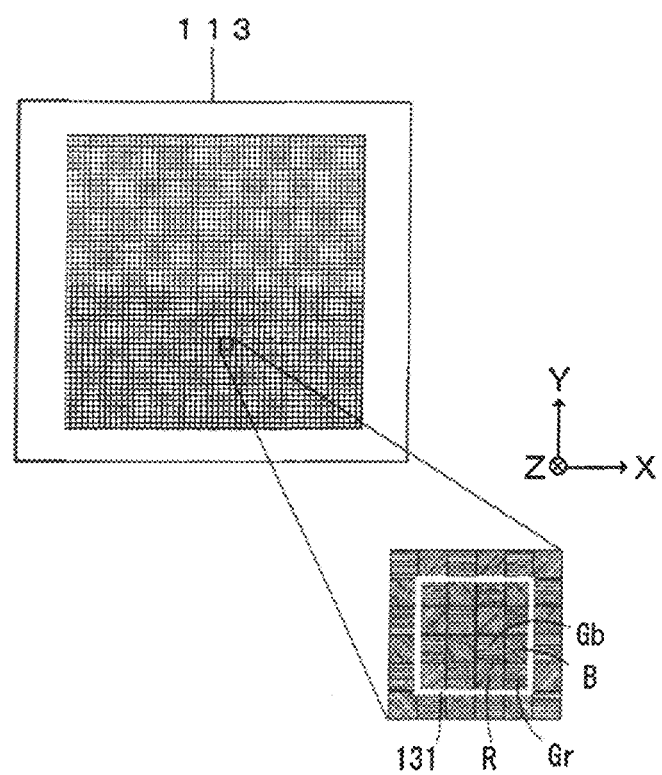
FIG. 3 is a diagram illustrating a pixel arrangement and a unit region of an image-capturing chip.

FIG. 3 is a view for explaining a pixel arrangement and a unit region 131 of the image-capturing chip 113. Specifically, FIG. 3 illustrates the image-capturing chip 113 as seen from the back surface (image-capturing surface) side. The pixel region has, for example, 20 million or more pixels that are arranged in a matrix. In the example of FIG. 3, 16 adjacent pixels (i.e., 4×4 pixels) form one unit region 131. Grid lines in the figure illustrate how adjacent pixels are grouped to form the unit region 131. The number of pixels forming the unit region 131 is not limited to this value. Alternatively, approximately 1000 pixels may be used, such as 32×64 pixels or more or less.

As illustrated in a partial enlarged view of the pixel region, the unit region 131 of FIG. 3 includes four (upper and lower, right and left) so-called Bayer arrangements, each consisting of four pixels: green pixels Gb, Gr, a blue pixel B, and a red pixel R. The green pixel Gb or Gr having a green filter as its color filter 102 receives light in a green wavelength band of incident light. Similarly, the blue pixel B having a blue filter as its color filter 102 receives light in a blue wavelength band, and the red pixel R having a red filter as its color filter 102 receives light in a red wavelength band.

In this embodiment, a plurality of blocks are defined so that each block includes at least one unit region 131. Each block can control pixels included therein with its own control parameters. In other words, image-capturing signals corresponding to different image-capturing conditions can be acquired for pixel groups included in one block and in another block. The control parameters include, for example, frame rate, gain, sub-sampling ratio, the number of rows or columns for addition of the pixel signals, charge accumulation time or the number of charge accumulation events, and the number of bits (a word length) in digitization. The image sensor 100 is free to perform sub-sampling not only in the row direction (the X-axis direction of the image-capturing chip 113), but also in the column direction (the Y-axis direction of the image-capturing chip 113). The control parameters may also be parameters in the image processing after the acquisition of the image signal from the pixel.

Figure 4:
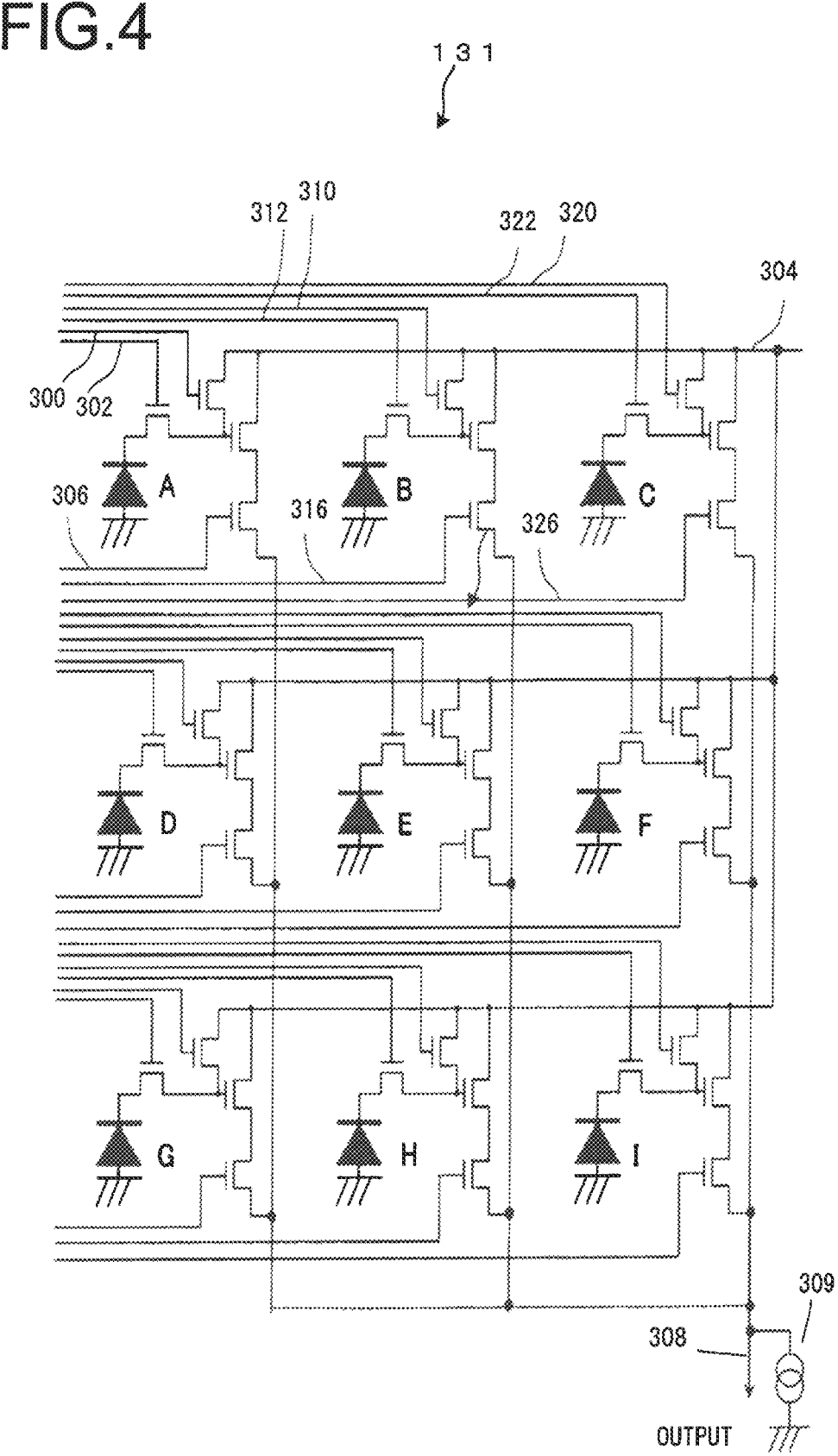
FIG. 4 is a diagram illustrating a circuit in the unit region.

FIG. 4 is a view for explaining a circuit in the unit region 131. In the example of FIG. 4, nine adjacent pixels (i.e., 3×3 pixels) form one unit region 131. As described above, the number of pixels included in the unit region 131 is not limited to this value. More or less pixels may be used. Symbols A to I denote two-dimensional positions in the unit region 131.

Reset transistors of pixels included in the unit region 131 can be individually turned on and off. In FIG. 4, a reset wiring line 300 for turning on and off the reset transistor of the pixel A is provided, and a reset wiring line 310 for turning on and off the reset transistor of the pixel B is provided separately from the reset wiring line 300. Similarly, a reset wiring line 320 for turning on and off the reset transistor of the pixel C is provided separately from the reset wiring lines 300 and 310. Other pixels D to I are also provided with their own reset wiring lines for turning on and off their reset transistors.

Transfer transistors of pixels included in the unit region 131 can also be individually turned on and off. In FIG. 4, a transfer wiring line 302 for turning on and off the transfer transistor of the pixel A, a transfer wiring line 312 for turning on and off the transfer transistor of the pixel B, and a transfer wiring line 322 for turning on and off the transfer transistor of the pixel C are separately provided. Other pixels D to I are also provided with their own transfer wiring lines for turning on and off their transfer transistors.

Selection transistors of pixels included in the unit region 131 can also be individually turned on and off. In FIG. 4, a selection wiring line 306 for turning on and off the selection transistor of the pixel A, a selection wiring line 316 for turning on and off the selection transistor of the pixel B, and a selection wiring line 326 for turning on and off the selection transistor of the pixel C are separately provided. Other pixels D to I are also provided with their own selection wiring lines for turning on and off their selection transistors.

It should be noted that a power supply wiring line 304 is shared between the pixels A to I included in the unit region 131. Similarly, an output wiring line 308 is shared between the pixels A to I included in the unit region 131. While the power supply wiring line 304 is shared between a plurality of unit regions, the output wiring line 308 is provided separately for each unit region 131. A load current source 309 supplies an electric current to the output wiring line 308. The load current source 309 may be provided in the image-capturing chip 113 or in the signal processing chip 111.

Individually turning on and off the reset transistors and the transfer transistors of the unit region 131 allows control of charge accumulation parameters including a charge accumulation start time, a charge accumulation end time, and a transfer timing for the pixels A to I included in the unit region 131. Additionally, individually turning on and off the selection transistors of the unit region 131 allows output of pixel signals of the pixels A to I through the shared output wiring line 308.

In this context, a so-called rolling shutter method is known, in which the charge accumulation is controlled in a regular order in rows and columns for pixels A to I included in the unit region 131. In the rolling shutter method, a row of the pixels may be selected and then a column may be designated, so that the pixel signals for the pixels are output in order of "ABCDEFGHI" in the example of FIG. 4.

A configuration of the circuit composed of the unit regions 131 in this way allows the charge accumulation time to be controlled for each unit region 131. In other words, pixel signals can be output at different frame rates for different unit regions 131. Furthermore, the charge accumulation (the image-capturing) is performed in unit regions 131 included in some blocks in the image-capturing chip 113, while it is disabled in unit regions 131 included in other blocks. This results in image-capturing and output of pixel signals only in predetermined blocks of the image-capturing chip 113. Additionally, blocks in which the charge accumulation (the image-capturing) may be performed (i.e., target blocks for the charge control) may be changed from one frame to another, so that images are captured and pixel signals are output sequentially in different blocks of the image-capturing chip 113.

Figure 5:
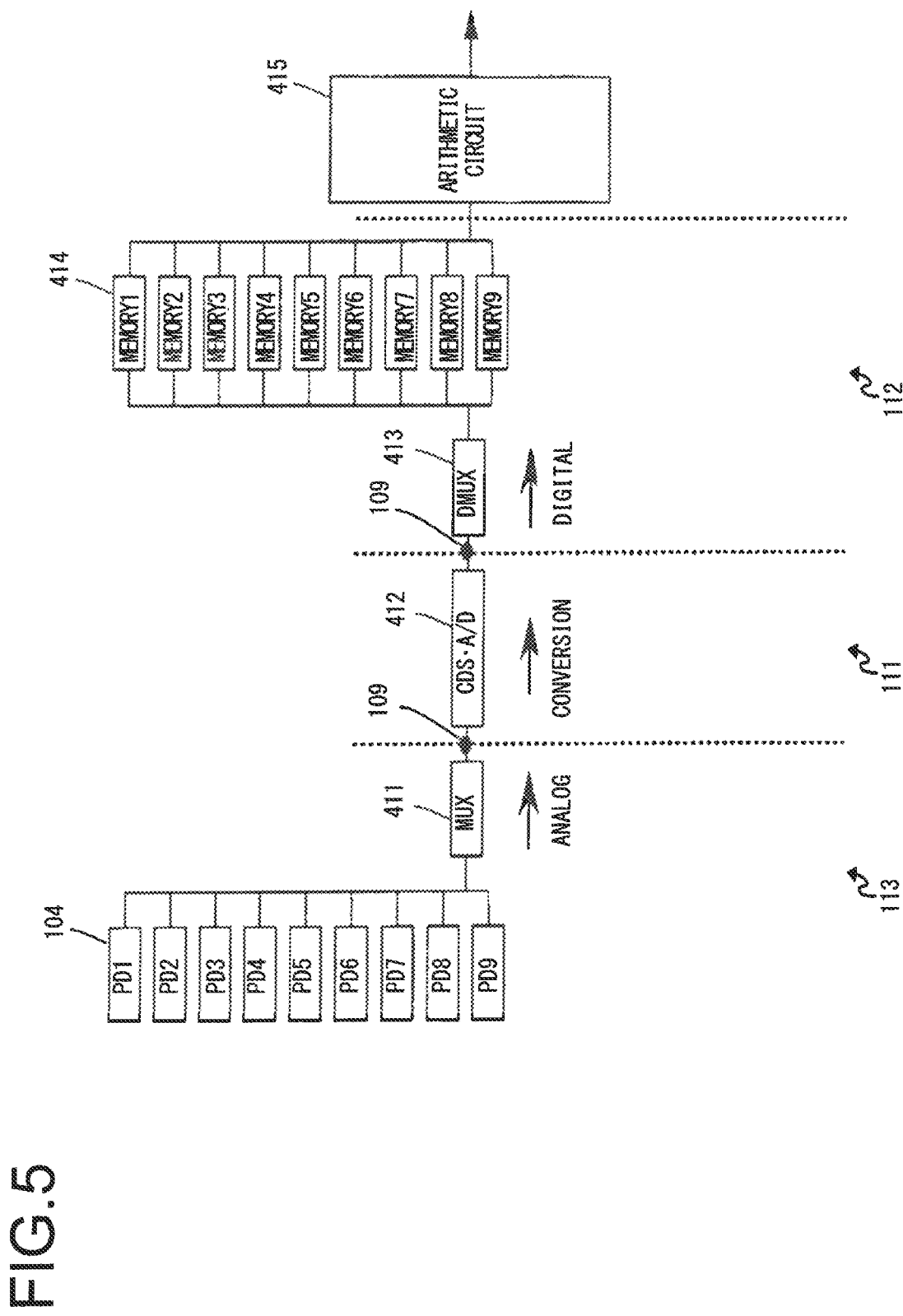
FIG. 5 is a block diagram illustrating a functional configuration of an image sensor corresponding to the circuit of FIG. 4.

FIG. 5 is a block diagram illustrating a functional configuration of the image sensor 100 corresponding to the circuit illustrated in FIG. 4. An analog multiplexer 411 sequentially selects nine PDs 104 forming the unit region 131 to output a pixel signal for each PD 104 to the output wiring line 308 provided in a manner corresponding to the unit region 131. The multiplexer 411 is formed on the image-capturing chip 113, together with the PDs 104.

The pixel signal outputted via the multiplexer 411 is subjected to correlated double sampling (CDS) and analog-to-digital (A/D) conversion in the signal processing circuit 412, which is formed in the signal processing chip 111 to perform the CDS and A/D conversion. The A/D converted pixel signal is delivered to a demultiplexer 413 and then stored in a pixel memory 414 corresponding to each pixel. The demultiplexer 413 and the pixel memories 414 are formed in the memory chip 112.

The arithmetic circuit 415 processes the pixel signal stored in the pixel memory 414 and delivers the processed pixel signal to the image processing unit that follows the arithmetic circuit 415. The arithmetic circuit 415 may be provided in the signal processing chip 111 or in the memory chip 112. Although FIG. 5 illustrates only the connection configuration for one unit region 131, such configurations are individually provided for unit regions 131 and operate in parallel, in practice. However, the arithmetic circuit 415 may not be provided for each unit region 131. For example, one arithmetic circuit 415 may sequentially reference and process values of the pixel memories 414 corresponding to individual unit regions 131.

As described above, the output wiring line 308 is provided in a manner corresponding to each unit region 131. Electrical connections between the chips with the bumps 109 may be used for the output wiring lines 308, which enables routing of the wiring lines without increasing an area of the chips in the plane direction, since the image-capturing chip 113, the signal processing chip 111, and the memory chip 112 are stacked in the image sensor 100.

Block Control of Image Sensor

In this embodiment, image-capturing conditions can be set for each of a plurality of blocks in the image sensor 100 (the image-capturing chip 113). The control unit 35 correlates the regions partitioned by the region partitioning unit 35b to the blocks to capture an image for each region under its own image-capturing conditions.

Figure 6:
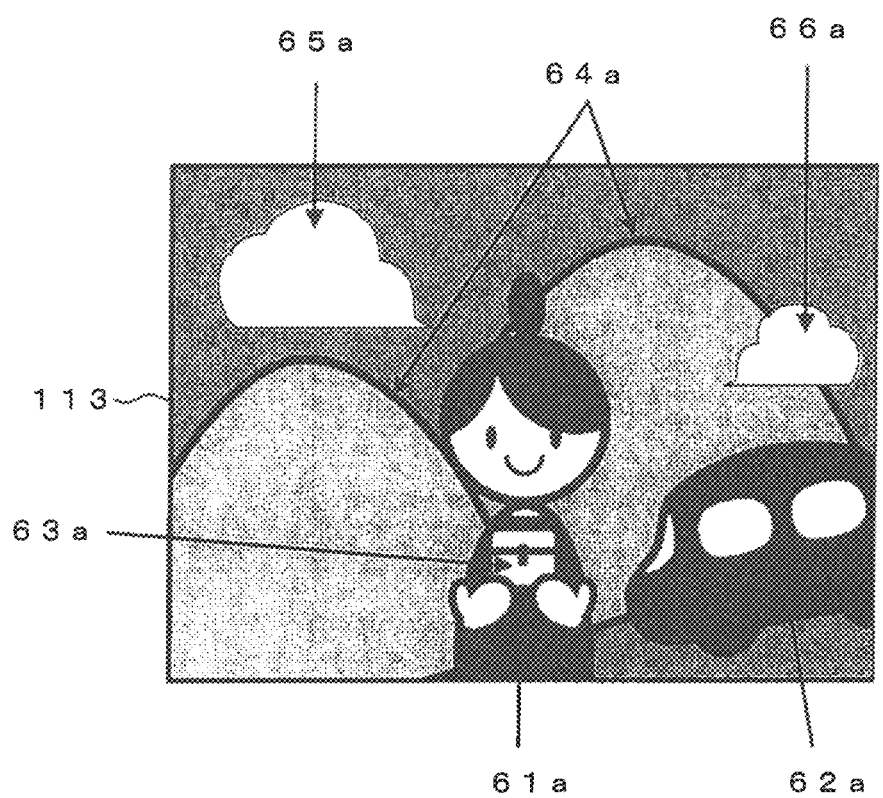
FIG. 6 is a view schematically illustrating an image of a subject formed on an image sensor of a camera.

FIG. 6 is a view schematically illustrating a subject image formed on the image sensor 100 of the camera 1. The camera 1 photoelectrically converts the subject image into a live view image, before an image-capturing instruction is provided. The live view image refer to an image for monitoring that is repeatedly captured at a predetermined frame rate (e.g., 60 fps).

Before the partitioning by the region partitioning unit 35b, the control unit 35 sets the same image-capturing conditions over the entire image-capturing chip 113 (i.e., the entire image capture screen). The image-capturing conditions before the partitioning are determined based on exposure conditions depending on a photometric value of a subject brightness or exposure conditions manually set by the user.

In FIG. 6, an image including a person 61a, an automobile 62a, a bag 63a, a mountain 64a, and clouds 65a and 66a is formed on the image-capturing surface of the image-capturing chip 113. The person 61a holds the bag 63a in both hands. Behind and right of the person 61a, the automobile 62a is parked.

Based on the live view image, the control unit 35 partitions the screen of the live view image into a plurality of regions in the following manner. First, subject elements are detected from the live view image by the object detection unit 35a. A known subject recognition technology is employed for the detection of the subject elements. In the example of FIG. 6, the object detection unit 35a detects the person 61a, the automobile 62a, the bag 63a, the mountain 64a, the cloud 65a, and the cloud 66a as the subject elements.

Next, the region partitioning unit 35b partitions the screen of the live view image into regions including the subject elements. In this example, for the sake of explanation, a region including the person 61a will be defined as a first region 61, a region including the automobile 62a as a second region 62, a region including the bag 63a as a third region 63, a region including the mountain 64a as a fourth region 64, a region including the cloud 65a as a fifth region 65, and a region including the cloud 66a as a sixth region 66.

The setting unit 35c ranks the plurality of regions partitioned by the region partitioning unit 35b. If the setting unit 35c detects the following regions (1) to (4) among the regions partitioned by the region partitioning unit 35b, the setting unit 35c sets these regions as regions having higher priorities for changing image-capturing conditions than that of other regions partitioned by the region partitioning unit 35b.

(1) A Region in Which a Specific Subject Corresponding to a Scene Capture Mode is Detected A specific subject depends on a preset scene capture mode of the camera 1. For example, if the preset scene capture mode of the camera 1 is a portrait mode, the setting unit 35c sets the first region 61 including the person 61a as a region having a higher priority for changing image-capturing conditions than that of the second region 62 including the automobile 62a, the third region 63 including the bag 63a, the fourth region 64 including the mountain 64a, the fifth region 65 including the cloud 65a, and the sixth region including the cloud 66a. This is based on an idea that image-capturing conditions for the first region 61 including the person 61a are likely to be set (changed) in the portrait mode.

For example, if the preset scene capture mode of the camera 1 is a landscape mode and a landmark has been detected by the object detection unit 35a as the subject element, the setting unit 35c sets a region including the landmark as a region having a higher priority for changing image-capturing conditions. This is based on the idea that image-capturing conditions for the region including the landmark are likely to be set (changed) in the case of the landscape mode.

In detecting a landmark from the live view image by the object detection unit 35a, a landmark possibly included in the live view image may be determined with referring to positional information of the camera 1 acquired from a GPS receiver (not shown). Alternatively, a landmark may be designated by a user operating the operation member 37. The object detection unit 35a detects the landmark determined based on the positional information or designated by the user operation. The landmark may be a mountain, a waterfall, an island, a tower, or a building, for example.

The scene capture mode of the camera 1 may be set by the user operating the operation member 37 or by the control unit 37 on the basis of the subject elements detected from the screen of the live view image.

(2) A Region Including a Focused Subject Element

If the AF operation for focusing on the subject corresponding to the focus point as described above is performed, the setting unit 35c sets a region including the focused subject element (i.e., the subject element corresponding to the focus point) as a region having a higher priority for changing image-capturing conditions than that of regions including defocused subject elements.

If no subject element is in focus, a region including a subject element having the smallest focus deviation amount (i.e., a subject element having the smallest distance from its position to a focus position) may be determined as a region having a higher priority for changing image-capturing conditions.

(3) A Region Including a Subject Element Having the Lowest Brightness or the Highest Brightness Among the plurality of subject elements detected by the object detection unit 35a, the setting unit 35c sets a region including the darkest or brightest subject element as a region having a higher priority for changing image-capturing conditions than that of other regions. This is based on the idea that image-capturing conditions for an excessively dark subject element such as a blocked-up shadow or an excessively bright subject element such as a blown-out highlight are likely to be set (changed).

(4) A Region Including a Subject Element Closest to the Camera 1

The setting unit 35c determines a region including a subject element closest to the camera 1 as a region having a higher priority for changing image-capturing conditions than that of a region including a subject element further from the camera 1. For example, the control unit 35 acquires information concerning distances between the camera 1 and the partitioned subject elements and determines a region including a subject element closest to the camera 1. If no distance information is acquired, the control unit 35 may determine a region including a subject element occupying the largest proportion of the screen as a subject element closest to the camera 1.

If the setting unit 35c detects the following regions (5) to (9) among the regions partitioned by the region partition unit 35b, the setting unit 35c determines these regions as regions having lower ranks for changing image-capturing conditions than those of the above-described regions (1) to (4).

(5) A Region Including a Subject Element Having the Smallest Focus Deviation Amount If the AF operation for focusing on the subject corresponding to the focus point as described above is performed, the setting unit 35c sets a region including a subject element having the smallest focus deviation amount as a region having a higher priority for changing image-capturing conditions than that of other regions, among the plurality of subject elements detected by the object detection unit 35a except for a region including the focused subject element. In general, the sharpness of the contour of a subject element increases as the focus deviation amount decreases. It can thus be said that a subject element having the contour with a higher sharpness has a smaller focus deviation amount. The setting unit 35c sets a region including a subject element having the contour with a higher sharpness as a region having a higher priority for changing image-capturing conditions than that of a region including a subject element having the contour with a lower sharpness.

First Example

In FIG. 6, for example, it is assumed that the AF calculation unit performs an AF operation on the first region 61 so that the person 61a is in focus. The setting unit 35c sets the third region 63 including a subject element having the smallest focus deviation amount (i.e., the bag 63a which is closest to the position of the person 61 in focus) among the automobile 62a, the bag 63a, the mountain 64a, the cloud 65a, and the cloud 66a, as a region having a second priority for changing image-capturing conditions, next to the first region 61 including the person 61a. This is based on an idea that image-capturing conditions for the third region 63 including the bag 63a are likely to be set (changed), next to the first region 61 including the person 61a.

Second Example

In FIG. 6, for example, it is assumed that the AF calculation unit focuses on a point between the person 61a and the automobile 62a. The setting unit 35c sets the second region 62 including a subject element having the smallest focus deviation amount (i.e., the automobile 62a which is closest to the position in focus) among the automobile 62a, the bag 63a, the mountain 64a, the cloud 65a, and the cloud 66a, as a region having a second priority for changing image-capturing conditions, next to the first region 61 including the person 61a. This is based on an idea that image-capturing conditions for the second region 62 including the automobile 62a are likely to be set (changed), next to the first region 61 including the person 61a.

(6) A Region Including a Subject Element Having a Small Difference in Distance

The setting unit 35d ranks the subject elements on the basis of differences in distances between the camera 1 and the subject elements. In FIG. 6, for example, it is assumed that an AF operation is performed on the first region 61 so that the person 61a is in focus. In this case, the setting unit 35d sets a region including a subject element having a distance from the camera 1 closer to a distance between the camera 1 and the person 61a (i.e., a smaller difference between the distances), among the automobile 62a, the bag 63a, the mountain 64a, the cloud 65a, and the cloud 66a, as a region having a higher priority for changing image-capturing conditions.

(7) A Region Including a Subject Element Having a Large Difference in Brightness In FIG. 6, for example, it is assumed that an AF operation is performed on the first region 61 so that the person 61a is in focus. The setting unit 35c sets a region including a subject element having the largest difference between its brightness and the brightness of the person 61a, among the automobile 62a, the bag 63a, the mountain 64a, the cloud 65a, and the cloud 66a, as a region having a second priority for changing image-capturing conditions, next to the first region 61 including the person 61a. For example, if the mountain 64a is the subject having the largest difference between its brightness and the brightness of the person 61a, the setting unit 35c sets the fourth region including the mountain 64a as a region having a second priority for changing image-capturing conditions, next to the first region 61 including the person 61a. This is based on an idea that image-capturing conditions for a region including a subject element having a large difference between its brightness and the brightness of the person 61a are likely to be set (changed).

(8) A Region Including a Large Subject Element

If the magnitude relationship of the difference between the focus deviation amounts of the regions including the subject elements is not clear and the magnitude relationship of the difference between the brightnesses of the regions is also not clear, the setting unit 35c assigns a higher rank to a region including a subject element that is larger than other subject elements, that is, a region that occupies a larger area in the screen.

(9) A Region Including a Subject Element that is Close to the Center of the Screen If the magnitude relationship of the difference between the focus deviation amounts of the regions including the subject elements is not clear and the magnitude relationship of the difference between the brightnesses of the regions is also not clear, the setting unit 35c assigns a higher rank to a region including a subject element closer to the center of the screen.

In this embodiment, one of the above-described regions (5) to (9) may be selected in advance by the user operating the operation member 37. Some of the regions (5) to (9) may also be combined.

In accordance with the procedures described above, the setting unit 35c ranks the second region 63 to the sixth region 66. For example, the second region 62 including the automobile 62a, which is a large subject element, is defined as a second-ranked region, the third region 63 including the bag 63a as a third-ranked region, the fourth region 64 including the mountain 64a as a fourth-ranked region, the fifth region 65 including the cloud 65a as a fifth-ranked region, and the sixth region 66 including the cloud 66a as a sixth-ranked region.

The setting unit 35c regards regions having no ranks even after the procedures for the conditions (5) to (9) described above, as regions having the same rank.

Figure 7A:
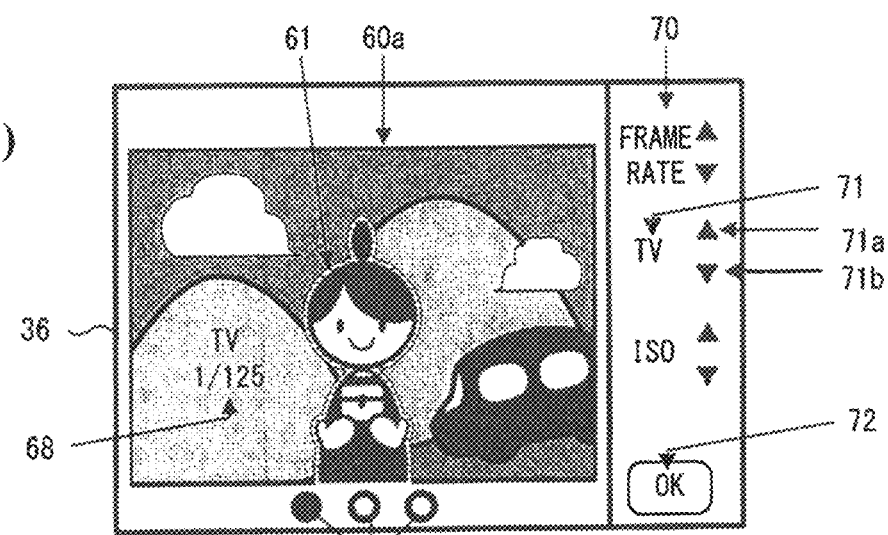
FIGS. 7(a) to 7(c) are views illustrating setting screens for image-capturing conditions.

Once the region partitioning unit 35b partitions the screen into the plurality of regions, the control unit 35 displays a setting screen as illustrated in FIG. 7(a) on the liquid crystal monitor 36. In FIG. 7(a), the live view image 60a is displayed, and a setting screen 70 for image-capturing conditions is displayed to the right of the live view image 60a.

The setting screen 70 includes frame rate, shutter speed (TV), and gain (ISO) from the top, as examples of setting items for the image-capturing conditions. The frame rate is the number of frames of live view image or frame of moving image recorded by the camera 1, acquired per second. The gain is ISO sensitivity. Other setting items for the image-capturing conditions may be added to those illustrated in FIG. 7(a), as appropriate. Setting items may be scrolled up and down to display other setting items if not all of the setting items fit within the setting screen 70.

In FIG. 7(a), a region having a highlighted or emphasized (thick, bright, differently colored, dashed-lined, blinking, etc.) contour among the first to sixth regions indicates a region targeted for setting (changing) image-capturing conditions. In the example of FIG. 7(a), the live view image 60a including the first region 61 having a highlighted contour is displayed. This means that the first region 61 is a target region for setting (changing) image-capturing conditions. For example, if the user taps a shutter speed (TV) symbol 71 in a touch-operated camera 1, the image-capturing condition setting unit 35d displays the current setting value of the shutter speed for the highlighted region (the first region 61) in the screen (reference numeral 68).

It is assumed that the camera 1 is touch-operated in the following description; however, the image-capturing conditions may be set (changed) by operation on buttons and the like which constitute the operation member 37.

If the user taps an up icon 71a or a down icon 71b for the shutter speed (TV), the image-capturing condition setting unit 35d increases or decreases the indication 68 of the shutter speed from the current setting value in response to the tap operation. The image-capturing condition setting unit 35d further instructs the image-capturing unit 32 (FIG. 1) to change the image-capturing conditions for the unit region 131 (FIG. 3) of the image sensor 100 corresponding to the highlighted region (the first region 61) in response to the tap operation. An "OK" icon 72 is an operation icon for confirming the now set image-capturing conditions. The image-capturing condition setting unit 35d also sets (changes) the frame rate and the gain (ISO) in the same manner as in the case of setting (changing) the shutter speed (TV).

Although the image-capturing condition setting unit 35d sets the image-capturing conditions on the basis of the user operation in the above description, the way of setting is not limited to this example. The image-capturing condition setting unit 35d may set the image-capturing conditions on the basis of a determination of the control unit 35, instead of the user operation. If the blown-out highlight or blocked-up shadow occurs in the region (3) described above, i.e., in the region including a subject element having the lowest brightness or the highest brightness, the image-capturing condition setting unit 35d may set the image-capturing conditions so that the blown-out highlight or blocked-up shadow is eliminated, in accordance with a determination of the control unit 35.

The preset image-capturing conditions for not-highlighted regions (regions other than the first region 61) remain unchanged.

Instead of highlighting the contour of the region targeted for setting (changing) image-capturing conditions, the control unit 35 may display the entire target region with a higher brightness, display the entire target region with a higher contrast, or blink the entire target region. The target region may also be surrounded by a frame. The frame surrounding the target region may be displayed as a double frame or a single frame, and the display style of the surrounding frame such as line type, color, and brightness may be changed as appropriate. The control unit 35 may also display an indicator for indicating a region targeted for setting image-capturing conditions, such as an arrow, in the vicinity of the target region. The control unit 35 may also display regions other than the target region for setting (changing) image-capturing conditions with a lower brightness or with a lower contrast.

The control unit 35 further partitions the first to sixth regions described above for display (i.e., the control unit 35 creates display patterns), and ranks the display patterns. First, the partitioning for display (the display patterns) will be described.

A variety of partitioning for display (display patterns) can be created depending on the number of ranked regions: for example, a display pattern in which a first-ranked region is displayed alone, a display pattern in which first-ranked and second-ranked regions are displayed in combination, a display pattern in which first-ranked, second-ranked, and third-ranked regions are displayed in combination, a display pattern in which first-ranked and third-ranked regions are displayed in combination, a display pattern in which a second-ranked region is displayed alone, and a display pattern in which a third-ranked region is displayed alone.

Next, a way of ranking the created display patterns will be described. In one example, if the preset scene mode is "portrait" as described above, a first-ranked region is a person since the user usually wishes to set image-capturing conditions for the person. Additionally, in ranking the display patterns, it is considered that a display pattern including the first-ranked region has a higher rank than that of a display pattern including no first-ranked region. Accordingly, the ranks are set in the following manner: the display pattern displaying the first-ranked region alone is a first pattern, the display pattern displaying the first-ranked and second-ranked regions in combination is a second pattern, the display pattern displaying the first-ranked, second-ranked, and third-ranked regions in combination is a third pattern, and so on. Alternatively, the ranking may be set in the following manner: the display pattern displaying the first-ranked region alone is a first pattern, the display pattern displaying the first-ranked and second-ranked regions in combination is a second pattern, the display pattern displaying the first-ranked and third-ranked regions in combination is a third pattern, and so on.

In another example, it is assumed that a scene including three persons side by side as subjects is captured if the preset scene mode is "portrait". The object detection unit 35a distinguishes three persons individually and creates regions. The rank determination unit 35c then assigns first, second, and third ranks to the regions, by the above-described method based on the position of the focus point, the position closest to the image-capturing apparatus, the position closer to the center of the screen, or the like. If all of the ranked regions include persons as in this case, the ranking may be set in the following manner: the display pattern displaying the first-ranked region alone is a first pattern, the display pattern displaying the second-ranked region alone is a second pattern, the display pattern displaying the third-ranked region alone is a third pattern, and so on. Although the image including three persons is captured in this example, the way of ranking such display patterns is not exclusively intended for images including persons.

The first pattern which displays the first region 61 having the first rank alone corresponds to a single-subject display pattern, while the second pattern and the third pattern which display the first region 61 having the first rank and another region in combination correspond to a multi-subject display pattern.

Partitioning of regions depending on the number of subject elements in the entire captured image will now be described.

If the number of subject elements detected by the object detection unit 35a is lower than a predetermined number, the control unit 35 partitions the image into single-subject regions, each having one subject element. If the number of the subject elements detected by the object detection unit 35a is higher than the predetermined number, the control unit 35 partitions the image into single-subject regions and multi-subject regions, wherein each multi-subject region is a combination of single-subject regions. Alternatively, the control unit 35 partitions the image into multi-subject regions. For example, in the case of a group travel photo, setting a single-subject region for each person recognized by the control unit 35 increases the number of regions, which results in an increased time required to set image-capturing conditions. Therefore, combining the single-subject regions into one region (a multi-subject region) for a group of the subject persons allows the image-capturing conditions to be set only for the multi-subject region. This can decrease the setting time.

In FIG. 7(a), marks 69 displayed below the live view image 60a indicate that a plurality of display patterns have been created (i.e., the partitioning for display has been performed). In the example of FIG. 7(a), three circles constituting the marks 69 indicate that three display patterns have been provided. The control unit 35 automatically creates the predetermined number of display patterns (i.e., the control unit 35 performs the partitioning for display). In other words, if three display patterns are to be provided, the control unit 35 creates three display patterns.

It should be noted that the number of display patterns may be set in advance by the user operating the operation member 37.

In this embodiment, the control unit 35 ranks the display patterns in order of a first pattern, a second pattern, and a third pattern. When regions are displayed on the liquid crystal monitor 36, a display pattern having a higher rank is preferentially displayed. In other words, as illustrated in FIG. 7(a), the first pattern having the first rank is first displayed on the liquid crystal monitor 36. The leftmost black mark 69 indicates that the display pattern having the first rank is displayed among the three display patterns.

Figure 7B:
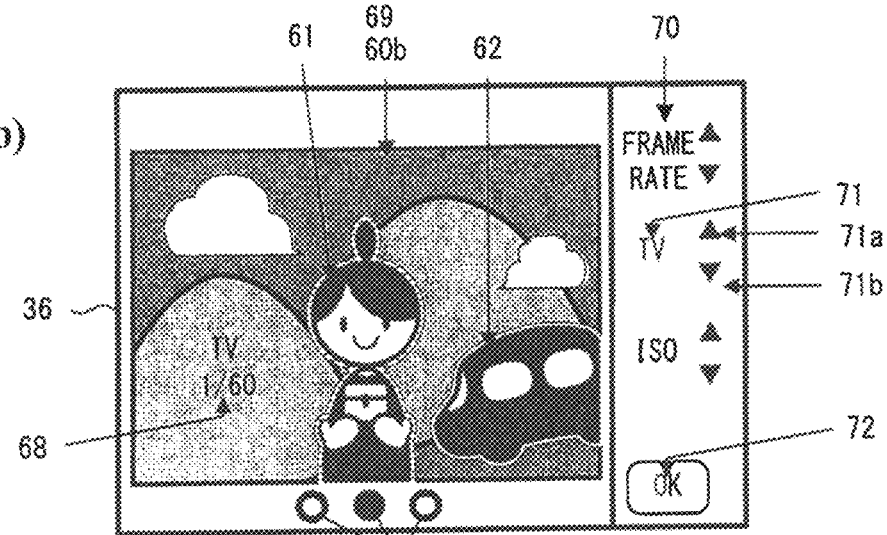

For example, if the user performs a leftward slide operation with a finger on the display screen of FIG. 7(a), the control unit 35 displays the second pattern having the second rank on the liquid crystal monitor 36, as illustrated in FIG. 7(b). In FIG. 7(b), a live view image 60b including the first region 61 and the second region 62 having highlighted contours is displayed. The second mark 69 from the left colored in black indicates that the pattern having the second rank is displayed among the three display patterns.

If the user taps an up icon 71a or a down icon 71b for the shutter speed (TV), the image-capturing condition setting unit 35d increases or decreases the indication 68 of the shutter speed from the current setting value in response to the tap operation. The image-capturing condition setting unit 35d further instructs the image-capturing unit 32 (FIG. 1) to change the image-capturing conditions for the unit region 131 (FIG. 3) of the image sensor 100 corresponding to the highlighted region (the first region 61 or the second region 62) in response to the tap operation. Although the image-capturing conditions are set in order of the ranking of the regions, the order of regions targeted for setting image-capturing conditions may be changed in accordance with user's intention such as a tap operation.

Figure 7C:
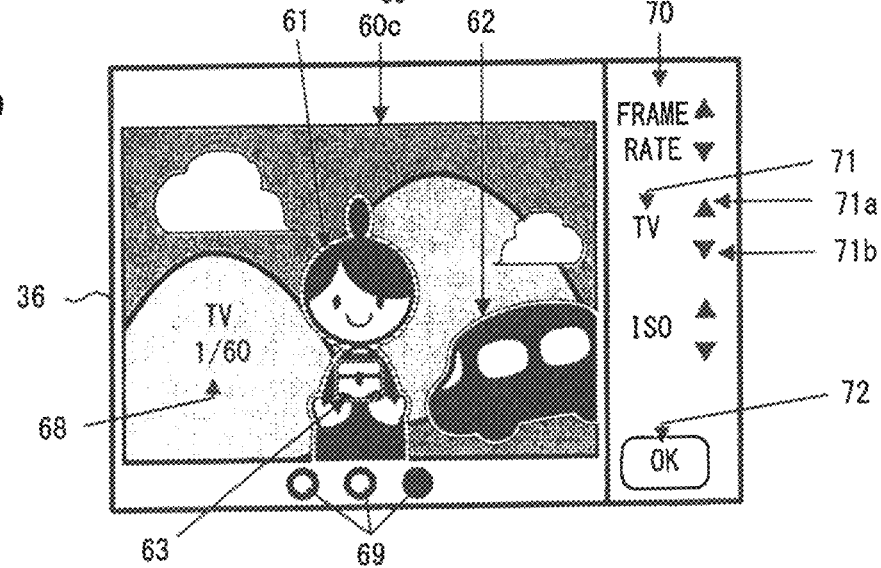

For example, if the user performs a leftward slide operation on the display screen of FIG. 7(b), the control unit 35 displays the third pattern having the third rank on the liquid crystal monitor 36, as illustrated in FIG. 7(c). In FIG. 7(c), a live view image 60c including the first region 61, the second region 62, and the third region 63 having highlighted contours is displayed. The third mark 69 from the left colored in black indicates that the display pattern having the third rank is displayed among the three display patterns.

If the user taps an up icon 71a or a down icon 71b for the shutter speed (TV), the image-capturing condition setting unit 35d increases or decreases the indication 68 of the shutter speed from the current setting value in response to the tap operation. The image-capturing condition setting unit 35d further instructs the image-capturing unit 32 (FIG. 1) to change the image-capturing conditions for the unit region 131 (FIG. 3) of the image sensor 100 corresponding to the highlighted region (the first region 61, the second region 62, or the third region 63) in response to the tap operation.

Although the image-capturing conditions are set in order of the ranking of the regions, the order of regions targeted for setting image-capturing conditions may be changed in accordance with user's intention such as a tap operation.

When a rightward slide operation is performed on the display screen of FIG. 7(b) or FIG. 7(c), the control unit 35 displays a display pattern having a higher rank on the liquid crystal monitor 36, which is a reverse operation to that in the above description.

When a release button (not shown) constituting the operation member 37 or a display icon for instructing the start of image-capturing is operated after the image-capturing conditions have been set for each region (single-subject regions or multi-subject regions) as described above, the control unit 35 generates image data captured under the image-capturing conditions set for each of the partitioned regions and records the image data in a recording medium composed of a memory card (not shown) or the like.

<Description of Flowchart>

Figure 8:
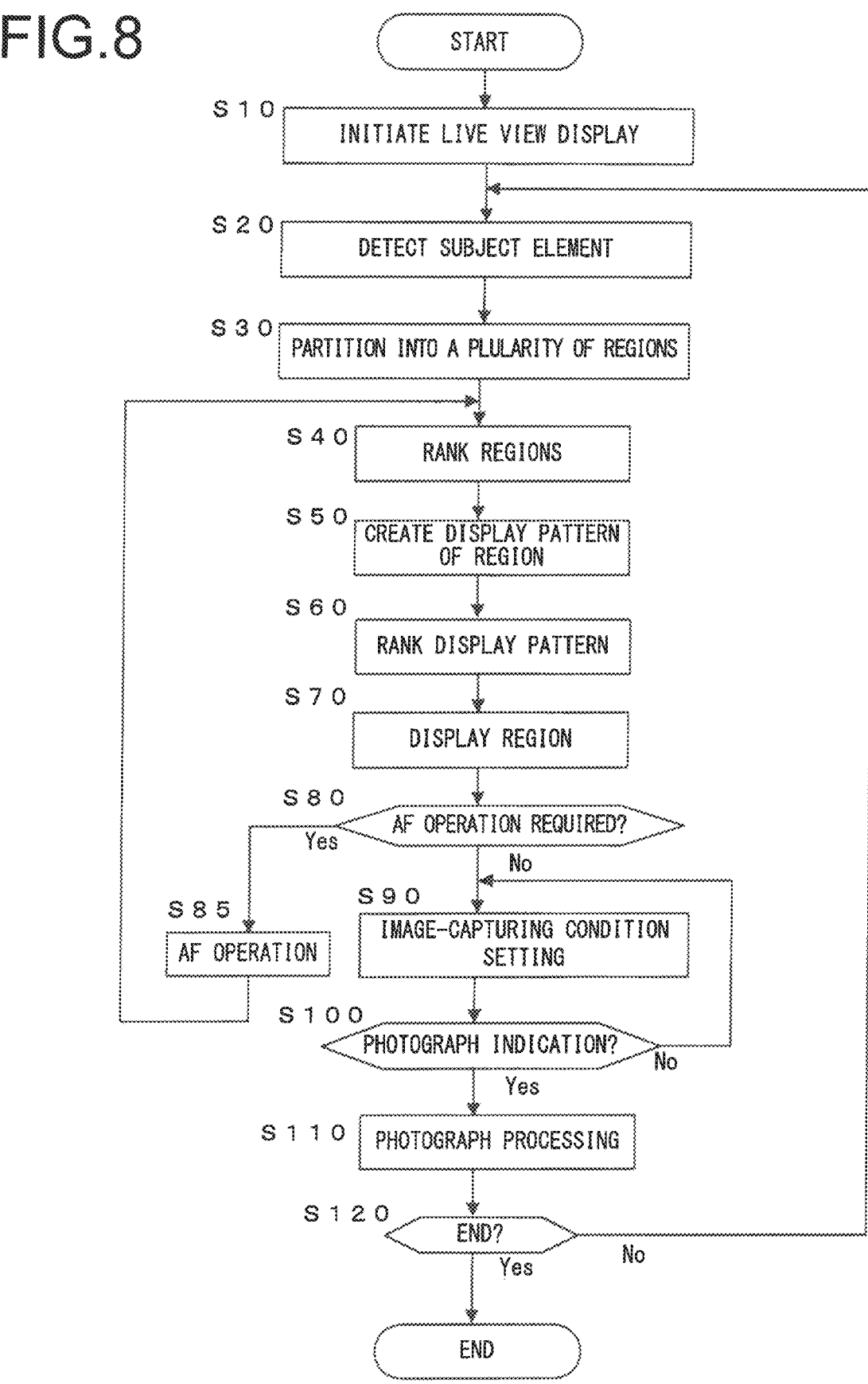
FIG. 8 is a flowchart for explaining a flow of a process of setting image-capturing conditions for each region and capturing an image.

FIG. 8 is a flowchart for explaining a flow of a process of setting image-capturing conditions and capturing an image for each region (single-subject regions or multi-subject regions). When a main switch of the camera 1 is turned on, the control unit 35 activates a program of executing the process illustrated in FIG. 8. In step S10, the control unit 35 starts live view display on the liquid crystal monitor 36 and proceeds to step S20.

Specifically, the control unit 35 instructs the image-capturing unit 32 to start to acquire live view images and sequentially display the acquired live view images on the liquid crystal monitor 36. As described above, at this point of time, the same image-capturing conditions are set over the entire image-capturing chip 113, i.e., the entire screen.

If the setting includes an AF operation performed during the live view display, the control unit 35 (the AF calculation unit 35*f*) controls the AF operation of focusing on a subject element corresponding to a predetermined focus point. If the setting does not include an AF operation performed during the live view display, the control unit 35 (the AF calculation unit 35*f*) performs the AF operation later at a point in time when the AF operation is instructed.

In step S20, the control unit 35 (the object detection unit 35*a*) detects subject elements from the live view image and proceeds to step S30. In step S30, the control unit 35 (the region partitioning unit 35*b*) partitions the screen of the live view image into regions including the subject elements, and proceeds to step S40.

In step S40, the control unit 35 (the setting unit 35*c*) ranks the plurality of regions partitioned in step S30 in accordance with the above-described procedures (1) to (11) and proceeds to step S50.

In step S50, the control unit 35 creates display patterns (i.e., the control unit 35 performs partitioning for display) for the plurality of regions partitioned in step S30. As described above, the control unit 35 creates the predetermined number of display patterns of the regions and proceeds to step S60. FIGS. 7(*a*) to 7(*c*) illustrate three display patterns: a first pattern (a single-subject display pattern) in which the contour of the first region 61 is highlighted, a second pattern (a multi-subject display pattern) in which the contours of the first region 61 and the second region 62 are highlighted, and a third pattern (a multi-subject display pattern) in which the contours of the first region 61, the second region 62, and the third region 63 are highlighted. The control unit 35 may create four or more display patterns by combining regions targeted for setting (changing) image-capturing conditions in various ways: for example, a fourth pattern (a multi-subject display pattern) in which the contours of the first region 61, the second region 62, and the fourth region 64 are highlighted, a fifth pattern (a multi-subject display pattern) in which the contours of the first region 61, the second region 62, the third region 63, the fourth region 64, the fifth region 65, and the sixth region 66 are highlighted, and a sixth pattern (a multi-subject display pattern) in which the second region 62, the third region 63, and the fourth region 64 are highlighted. Alternatively, the fourth region, the fifth region, and the sixth region are combined into one multi-subject region 1, and then a seventh pattern (a multi-subject display pattern) may be created in which the contours of the first region 61, the second region 62, and the multi-subject region 1 are highlighted.

In step S60, the control unit 35 ranks the plurality of display patterns generated in step S50 (i.e., the regions after the partitioning for display) and proceeds to step S70. Typically, the control unit 35 sets the first pattern as a first-ranked pattern. Additionally, the control unit 35 sets the second pattern as a second-ranked pattern. Furthermore, the control unit 35 sets the third pattern as a third-ranked pattern. The control unit 35 further sets the fourth pattern as a fourth-ranked pattern, the fifth pattern as a fifth-ranked pattern, and so on. The ranking is set by the control unit 35.

In step S70, the control unit 35 displays the regions in order of the ranking. As illustrated in FIG. 7(*a*), the control unit 35 displays the live view image 60*a* with the first pattern having the first rank and also displays the setting screen 70 for image-capturing conditions on the liquid crystal monitor 36, and proceeds to step S80. If the user performs a slide operation on the display screen with a finger, the control unit 35 displays another display pattern having a different rank on the liquid crystal monitor 36 as illustrated in FIGS. 7(*b*) and 7(*c*).

In step S80, the control unit 35 determines whether the AF operation is required. For example, if a focus adjustment state is changed due to movement of a subject, if the position of a focus point is changed by a user operation, or if an execution of the AF operation is instructed by a user operation, the control unit 35 makes a positive determination in step S80 and proceeds to step S85. If the focus adjustment state remains unchanged, the position of the focus point is not changed by any user operation, and the execution of the AF operation is not instructed by any user operation, the control unit 35 makes a negative determination in step S80 and proceeds to step S90.

In step S85, the control unit 35 performs the AF operation and then returns to step S40. Returning to step S40, the control unit 35 repeats the same process steps as the above-described process steps on the basis of a live view image acquired after the AF operation.

In step S90, the control unit 35 (the image-capturing condition setting unit 35*d*) sets image-capturing conditions for a highlighted region in response to a user operation and proceeds to step S100. The display change of the liquid crystal monitor 36 and the setting of the image-capturing conditions in response to the user operation in step S90 have been described above.

In step S100, the control unit 35 determines the presence or absence of an image-capturing instruction. If a release button (not shown) constituting the operation member 37 or a display icon for instructing image-capturing is operated, the control unit 35 makes a positive determination in step S100 and proceeds to step S110. In the case of absence of the image-capturing instruction, the control unit 35 makes a negative determination in step S100 and returns to step S90.

In step S110, the control unit 35 performs predetermined image-capturing processing. In other words, the image-capturing control unit 35e controls the image sensor 100 to capture an image under the image-capturing conditions set for each of the regions, and the image processing unit 33 performs predetermined image processing on the captured and acquired image data. Then, the recording unit 39 records the image data in a recording medium (not shown).

In step S120, the control unit 35 determines whether an end operation is performed. If the end operation is performed, the control unit 35 makes a positive determination in step S120 and ends the process of FIG. 8. If the end operation is not performed, the control unit 35 makes a negative determination in step S120 and returns to step S20. Returning to step S20, the control unit 35 repeats the above-described process steps.

According to the above-described embodiment, the following operational advantages can be obtained.

(1) The camera 1 includes the image-capturing unit 32 that captures an image of a subject with the image sensor 100 configured to be able to set image-capturing conditions for a plurality of regions on an image-capturing surface; and a region partitioning unit 35b that partitions the image-capturing surface into a plurality of regions on the basis of a captured live view image. Since the camera 1 automatically partitions the image-capturing surface into a plurality of regions, the user can easily perform the setting for each region.

(2) The camera 1 further includes the image-capturing condition setting unit 35d that sets image-capturing conditions for the plurality of regions. A region targeted for setting image-capturing conditions is sequentially changed from one region to another and image-capturing conditions for the region targeted for setting are set on the basis of a user operation, so that the user can sequentially perform the setting for each region.

(3) The camera 1 includes the setting unit 35c that ranks the plurality of regions partitioned by the region partitioning unit 35b, so that the regions are appropriately ranked.

(4) The camera 1 includes the liquid crystal monitor 36 that displays the image captured by the image-capturing unit 32, and the control unit 35 displays a region targeted for setting in the live view image displayed on the liquid crystal monitor 36 in a manner different from other regions. This can clearly show the region targeted for setting to the user.

(5) The region partitioning unit 35b detects a plurality of subject elements from the live view image with the object detection unit 35a and partitions the image-capturing surface into a plurality of single-subject regions, each including a single subject element; partitions the image-capturing surface into multi-subject regions and single-subject regions, wherein each multi-subject region is a combination of two or more single-subject regions; or partitions the image-capturing surface into a plurality of multi-subject regions. It is thus possible to partition the image-capturing surface into not only single-subject regions, each including a single subject element, but also into multi-subject regions, each including two or more subject elements. This allows image-capturing conditions to be set collectively for a plurality of subject elements.

(6) The setting unit 35c assigns a higher rank to a region including a subject element associated with the preset scene capture mode, among the subject elements detected by the object detection unit 35a. This may more likely increase a rank of a region including a subject element that the user desires to photograph the most, which results in an improved usability.

(7) The setting unit 35c assigns a higher rank to a region including a focused subject element, among the subject elements detected by the object detection unit 35a. This may more likely increase a rank of a region including a subject element that the user desires to photograph the most, which results in an improved usability.

(8) The setting unit 35c assigns a higher rank to a region including the closest subject element, among the subject elements detected by the object detection unit 35a. This may more likely increase a rank of a region including a subject element that the user desires to photograph the most, which results in an improved usability.

(9) The setting unit 35c assigns a higher rank to a region including a subject element having a lower or higher brightness than the predetermined value, among the subject elements detected by the object detection unit 35a. This may more likely increase the rank of the region including the subject element for which the user wishes to change its image-capturing conditions, which results in an improved usability.

(10) The setting unit 35c assigns a higher rank to a region including a subject element having a smaller difference between a distance to the subject element and a distance to a subject element included in a region having a high rank, among the subject elements detected by the object detection unit 35a. For example, this may more likely increase a rank of a region including a subject element that the user desires to photograph the second most, which results in an improved usability.

(11) The setting unit 35c assigns a higher rank to a region including a subject element having a larger difference between brightnesses of the subject element and a subject element included in a region having a high rank, among the subject elements detected by the object detection unit 35a. For example, this may more likely increase the rank of the region including the subject element for which the user wishes to change its image-capturing conditions, which results in an improved usability.

(12) The setting unit 35c assigns a higher rank to a region including a larger subject element than other subject elements, among the subject elements detected by the object detection unit 35a. For example, this may more likely increase a rank of a region including a subject element that the user desires to photograph the second most, which results in an improved usability.

(13) The setting unit 35c assigns a higher rank to a region including a subject element that is closer to the center of the live view image than other subject elements, among the subject elements detected by the object detection unit 35a. For example, this may more likely increase a rank of a region including a subject element that the user desires to photograph the second most, which results in an improved usability.

(14) The camera 1 includes: a liquid crystal monitor 36 that displays a live view image acquired by the image-capturing unit 32, wherein the image-capturing unit 32 captures an image of a subject by means of the image sensor 100 which is configured to be able to set image-capturing conditions for a plurality of regions on an image-capturing surface; and a region partitioning unit 35b that partitions the screen into a plurality of regions on the basis of the live view image. Since the camera 1 automatically partitions the screen into a plurality of regions, the user can easily perform the setting for each region.

(15) The camera 1 includes the setting unit 35c that ranks the plurality of regions partitioned by the region partitioning unit 35b, and the control unit 35 that performs predetermined processes corresponding to the plurality of regions in order of the ranking, so that the processes for the regions are preformed in an appropriate sequence.

(16) The control unit 35 sends an instruction of setting image-capturing conditions for the regions in the image-capturing surface, as predetermined processing. In this way, in the case where the image-capturing unit 32 is installed at a position remote from the main body of the camera 1 and the control unit 35 remotely controls the image-capturing unit 32, for example, setting processing for each region in the image can be remotely performed. This results in an improved usability for the user.

The following variations also fall within the scope of the present invention, and one or more of the variations can be combined with the above-described embodiment.

(First Variation)

Although the setting unit 35c ranks the plurality of regions partitioned by the region partitioning unit 35b in the above description, the setting unit 35c is not limited to this configuration. The setting unit 35c may add information concerning whether a region is to be targeted for changing image-capturing conditions, for the regions partitioned by the region partitioning unit 35b. The setting unit 35c may determine whether a region is to be targeted for changing image-capturing conditions, on the basis of the above-described method of ranking the regions.

(Second Variation)

The above description has illustrated an example in which one pattern is displayed on the liquid crystal monitor 36 at one time in the case where a plurality of display patterns of regions are created, as illustrated in FIGS. 7(a) to 7(c). In response to a slide operation performed by the user on the screen of the liquid crystal monitor 36, the control unit 35 switches between the display patterns. A plurality of display patterns may instead be displayed side by side on the liquid crystal monitor 36 so that the user can select any one of the display patterns.

Figure 9:
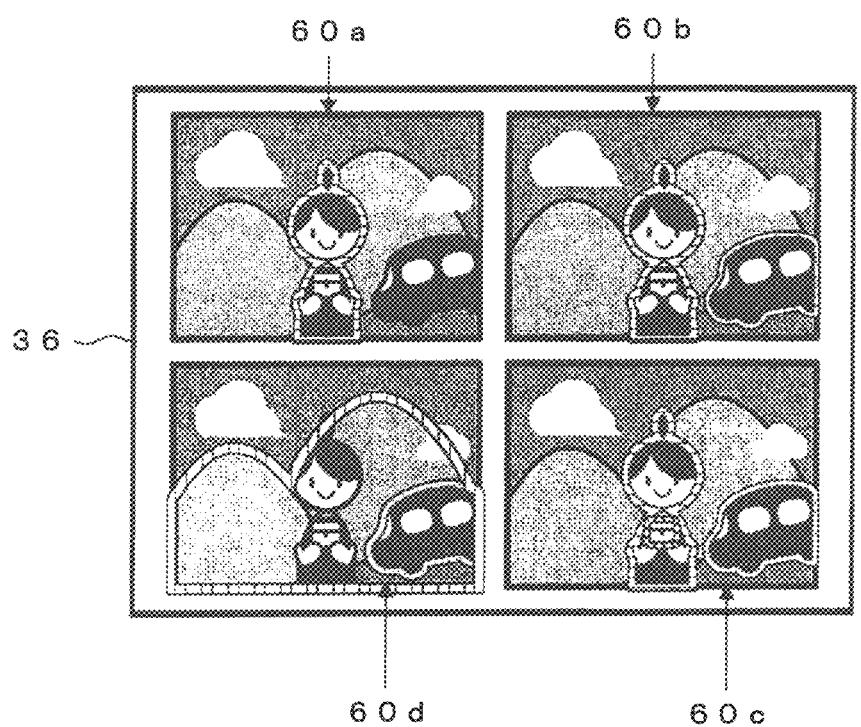
FIG. 9 is a view illustrating a listing display of four display patterns.

In the second variation, it is assumed that four display patterns of the regions are created. The control unit 35 displays a list of four display patterns on the liquid crystal monitor 36, as illustrated in FIG. 9. In the example of FIG. 9, the first pattern 60a having the first rank is displayed in the upper left quadrant of the screen, the second pattern 60b having the second rank is displayed in the upper right quadrant of the screen, and the fourth pattern 60d having the third rank is displayed in the lower left quadrant of the screen, and the third pattern 60c having the fourth rank is displayed in the lower right quadrant of the screen.

If the user taps a display pattern on the display screen of FIG. 9, the control unit 35 displays only the display pattern tapped by the user on the liquid crystal monitor 36, in place of the listing display. For example, when the second pattern is tapped on the display screen of FIG. 9, the control unit 35 displays only the second pattern having the second rank on the liquid crystal monitor 36, as in FIG. 7(b).

(Third Variation)

Figure 10:
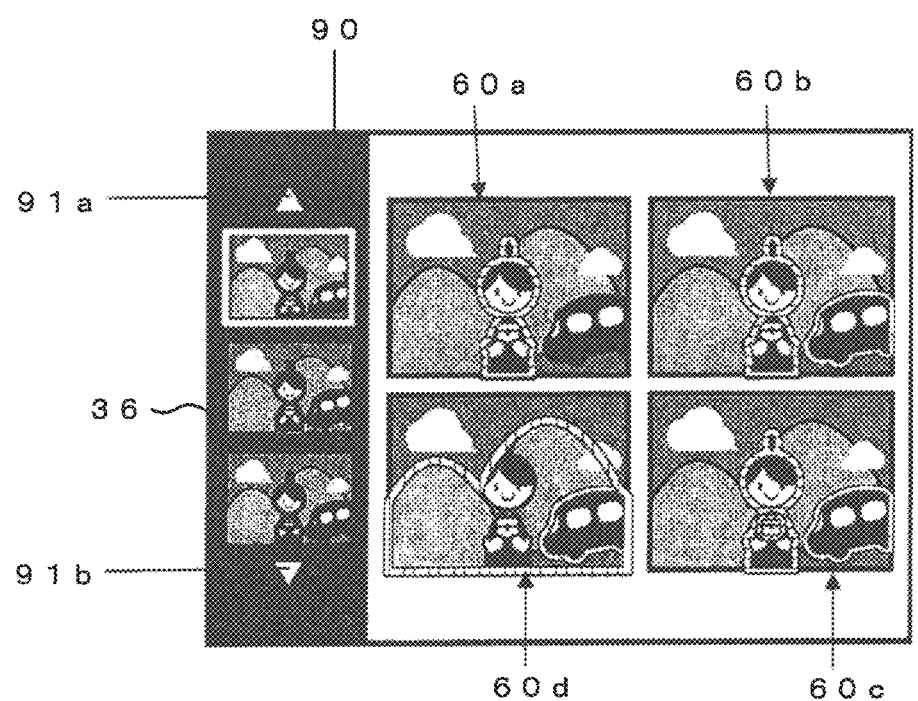
FIG. 10 is a view illustrating a display screen according to a third variation.

It is assumed that eight display patterns are created. Since the number of the created display patterns is larger than the number (e.g., four) of display patterns that can be listed, the control unit 35 displays an auxiliary screen 90 in addition to the listing display. FIG. 10 is a view illustrating a display screen of the liquid crystal monitor 36 according to a third variation. In FIG. 10, the first pattern 60a having the first rank is displayed in the upper left quadrant of the listing display, the second pattern 60b having the second rank is displayed in the upper right quadrant of the listing display, and the fourth pattern 60d having the third rank is displayed in the lower left quadrant of the listing display, and the third pattern 60c having the fourth rank is displayed in the lower right quadrant of the listing display.

The control unit 35 displays information on display patterns that cannot be listed, in the auxiliary screen 90. In the example of FIG. 10, for example, a fifth pattern having a fifth rank, a sixth pattern having a sixth rank, and a seventh pattern having a seventh rank are displayed in a reduced size in the auxiliary screen 90.

If the user taps an up icon 91a or a down icon 91b on the auxiliary screen 90, the control unit 35 switches display patterns to be displayed on the auxiliary screen 90. In other words, display patterns to be displayed are switched in response to the tap operation.

If the user taps a display pattern on the display screen of FIG. 10, the control unit 35 displays only the tapped display pattern on the liquid crystal monitor 36.

(Fourth Variation)

Figure 11:
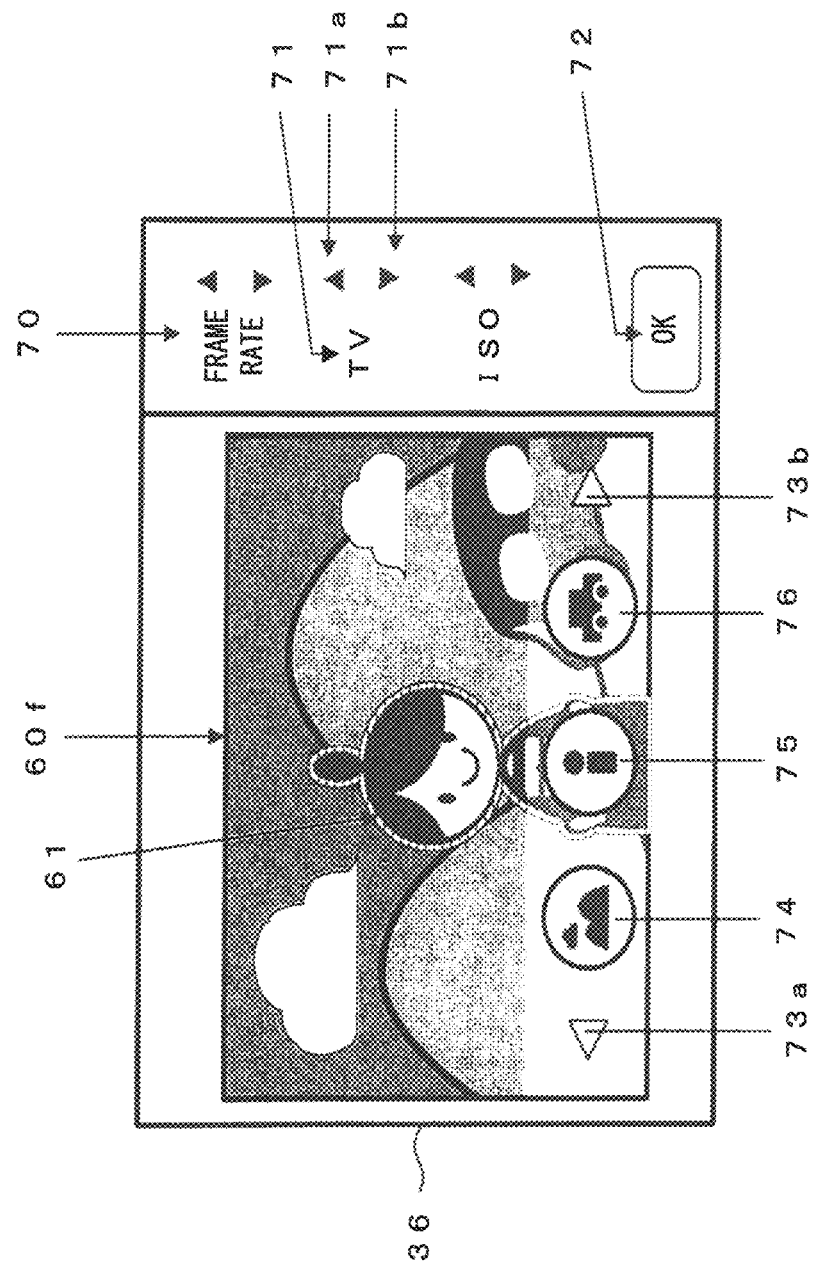
FIG. 11 is a view illustrating switching between display patterns according to a fourth variation.

FIG. 11 is a view for explaining switching between display patterns according to a fourth variation. In FIG. 11, a landscape icon 74, a person icon 75, and an automobile icon 76 are displayed, superimposed on a live view image 60f. If the user taps the person icon 75, the control unit 35 displays a live view image 60f in which a first region 61 having a person 61a (FIG. 6) as a subject element has a highlighted contour.

If an icon different from the person icon 75 is tapped, the control unit 35 changes the display pattern to display a live view image in which a region having a subject element corresponding to the icon has a highlighted contour.

For example, if the user taps the automobile icon 76, the control unit 35 displays a live view image in which a second region having an automobile 62a (FIG. 6) as the subject element has a highlighted contour. If the user taps the landscape icon 74, the control unit 35 displays a live view image in which a fourth region having a mountain 64a (FIG. 6) as a subject element has a highlighted contour.

The combination of the landscape icon 74, the person icon 75, and the automobile icon 76 which are displayed superimposed on the live view image can be changed. If a left icon 73a or a right icon 73b is tapped, the control unit 35 changes the combination of displayed icons.

Figure 12A:
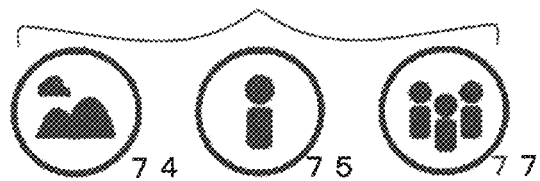
FIGS. 12(a) to 12(c) are views illustrating combinations of icons.

FIG. 12 is a view illustrating combinations of icons. FIG. 12(a) is a view illustrating a combination of the landscape icon 74, the person icon 75, and a person group icon 77. If the group person icon 77 is tapped, the control unit 35 displays a live view image in which a region including a plurality of persons has a highlighted contour in the live view image.

Figure 12B:
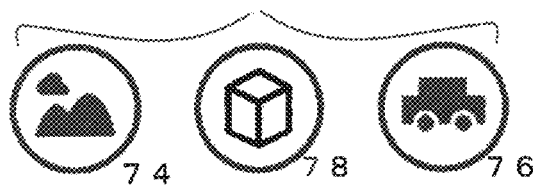

FIG. 12(b) is a view illustrating a combination of the landscape icon 74, an object icon 78, and the automobile icon 76. If the object icon 78 is tapped, the control unit 35 displays a live view image in which a third region having an object (e.g., the bag 63a in FIG. 6) as a subject element has a highlighted contour in the live view image.

Figure 12C:
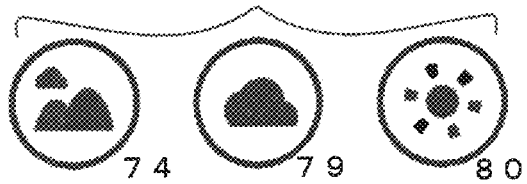

FIG. 12(c) is a view illustrating a combination of the landscape icon 74, a cloud icon 79, and a blown-out highlight icon 80. If the cloud icon 79 is tapped, the control unit 35 displays a live view image in which fifth and sixth regions having clouds (e.g., the clouds 65a, 66a in FIG. 6) as subject elements have a highlighted contour in the live view image. If the blown-out highlight icon 80 is tapped, the control unit 35 displays the live view image in which a region having a higher brightness value than a predetermined brightness value is highlighted or emphasized.

According to the fourth variation described above, the display pattern is switched to display a live view image in which a region including a subject element corresponding to an icon tapped by the user has a highlighted contour. The user can designate a region for which the user wishes to change its image-capturing conditions, by a tap operation.

It should be noted that the control unit 35 may be configured to rank the display patterns or change the ranking in accordance with a sequence of the display patterns switched in response to the tap operation by the user.

(Fifth Variation)

Although the above description illustrates the camera 1 as an example, an electronic device having a camera function may be employed such as a smartphone or a tablet terminal.

Figure 13A:
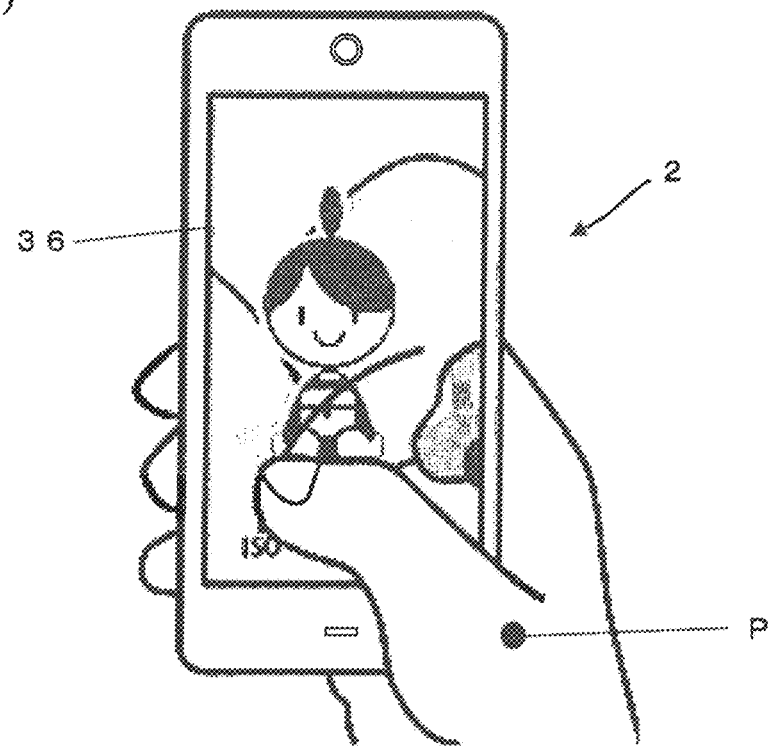
FIG. 13(a) is a view illustrating a user operation.
Figure 13B:
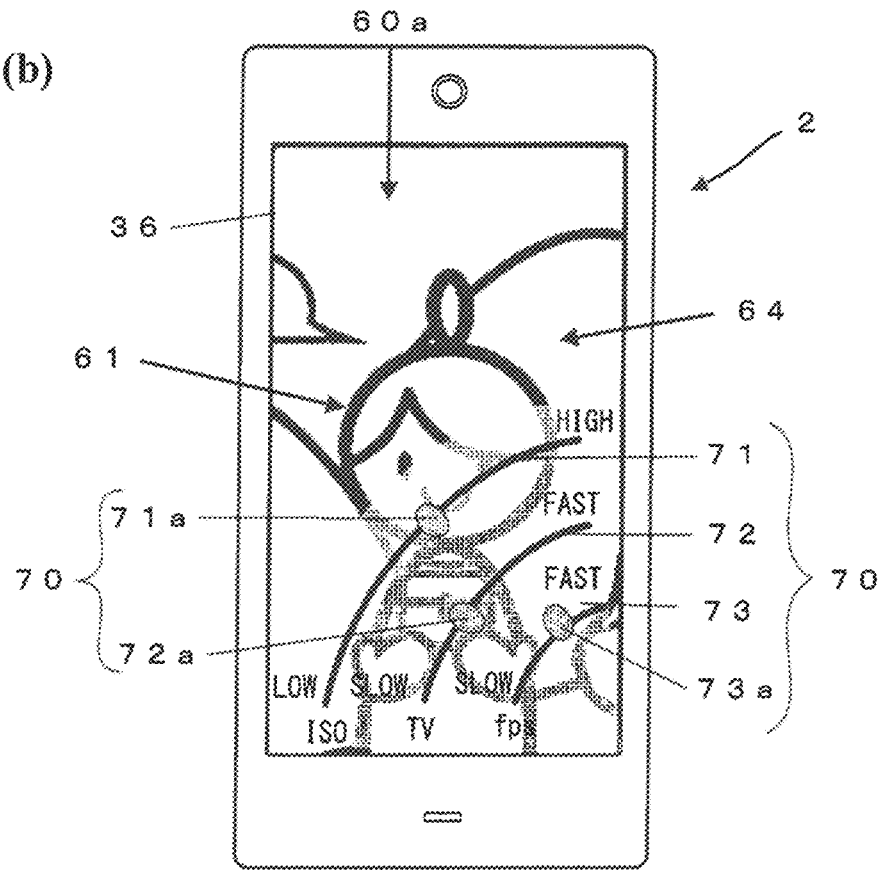
FIG. 13(b) is a view illustrating a setting screen for image-capturing conditions for a region.

FIG. 13(*a*) illustrates how image-capturing conditions are set in an electronic device 2 having a camera function. Assuming that a user operates the electronic device 2 as illustrated in FIG. 13(*a*), the electronic device 2 displays a setting screen for image-capturing conditions on the liquid crystal monitor 36. Typically, the user operates a touch operation member on a display surface of the liquid crystal monitor 36 with one hand. According to FIG. 13(*a*), the touch operation member of the electronic device 2 is operated with the thumb of the right hand, and the back surface of the electronic device 2 is supported by fingers other than the thumb. A movable range of the thumb of the right hand in the display surface of the liquid crystal monitor 36 is the inside of an arc having a radius that is equal to the length of the thumb about a thumb joint position P. The control unit 35 then predetermines the movable range of the thumb based on the average grip position at which the electronic device 2 is held by users and the average length of a human thumb, and displays an operation unit 70 (described later) in FIG. 13(*b*) within the movable range.

FIG. 13(*b*) is a view illustrating a setting screen for image-capturing conditions. Once the screen is partitioned into a plurality of regions by the region partitioning unit 35*b* and a region targeted for setting image-capturing conditions is determined, the control unit 35 then displays a live view image 60*a* as in FIG. 13(*b*) on the liquid crystal monitor 36. The target region for setting (changing) image-capturing conditions may be a region automatically selected by the control unit 35, instead of a region selected by the user. For example, regions partitioned by the region partitioning unit 35*b* may be prioritized to set a region selected by the control unit 35 based on the priorities as a target region for setting (changing) image-capturing conditions.

In FIG. 13(*b*), a live view image 60*a* is displayed in which the contour of a first region 61 is highlighted. A region having a highlighted or emphasized (thick, bright, differently colored, dashed-lined, blinking, etc.) contour among the first to sixth regions indicates a target region for setting (changing) image-capturing conditions. The highlight of the contour of the first region 61 clearly shows the user the target region for setting (changing) image-capturing conditions.

The user holds down the display position of the target region for setting (changing) image-capturing conditions on the display surface of the liquid crystal monitor 36 on which the live view image 60*a* is displayed, for some time (e.g., the user keeps touching for one second or more). Upon sensing this holding-down operation, the control unit 35 displays the operation unit 70 at the bottom right of the screen (within the movable range of the right thumb), superimposed on the live view image 60*a*.

When a region targeted for setting image-capturing conditions is determined, the control unit 35 may display the operation unit 70 without any user operation.

The operation unit 70 includes curves 71, 72, and 73 as an example of setting items of the image-capturing conditions, in this order from the outer side of the movable range. The curve 71 corresponds to an operation unit for increasing and decreasing a gain (ISO sensitivity), which is one of the exposure conditions. The curve 72 corresponds to an operation unit for increasing and decreasing a shutter speed TV (charge storage time), which is one of the exposure conditions. The curve 73 corresponds to an operation unit for increasing and decreasing a frame rate, which is one of the exposure conditions. The frame rate is the number of frames of live view image or frames of moving image acquired per second.

It should be noted that the image-capturing conditions (the exposure conditions and the image processing conditions) to be changed by the operation unit 70 may be determined by the control unit 35 on the basis of the live view image 60*a*, or the conditions to be changed may be image-capturing conditions specified in advance by a user operation. The user operation may involve voice control, and the control unit 35 displays the curve 71 as the operation unit 70 if "gain" is inputted by voice, for example.

If the operation unit 70 includes a plurality of curves, the control unit 35 displays an image-capturing condition to be changed having a wider adjustment range (e.g., the gain) at a position further from the joint position P (FIG. 13(*a*)). This is because an arc becomes longer as the arc becomes further away from the joint position P, and a longer arc is easy to correspond to a wider adjustment range.

Marks 71*a* to 73*a* are displayed on the curves 71 to 73, respectively. Initial positions (display positions on the curves) of the marks 71*a* to 73*a* displayed in the operation unit 70 correspond to the currently set image-capturing conditions of the target region for setting (changing) image-capturing conditions (the first region 61 in the example of FIG. 13(*b*)). For example, the mark 71*a* corresponds to the gain, the upper end of the curve 71 corresponds to the upper limit of a gain adjustment range, and the lower end of the curve 71 corresponds to the lower limit of the gain adjustment range. In the example of FIG. 13(*b*), the mark 71*a* is displayed at a position approximately one-half of the entire extent of the curve 71. This indicates that the value is an intermediate value of the gain adjustment range.

The mark 72*a* corresponds to the shutter speed, the upper end of the curve 72 corresponds to the upper limit of a shutter speed adjustment range, and the lower end of the curve 72 corresponds to the lower limit of the shutter speed adjustment range. In the example of FIG. 13(*b*), the mark 72*a* is displayed at approximately one-third of the entire extent of the curve 72 from the lower end of the curve 72. This indicates that the shutter speed value is a value of one-third of the entire width of the shutter speed adjustment range from the lower limit.

The mark 73*a* corresponds to the frame rate, the upper end of the curve 73 corresponds to the upper limit of a frame rate adjustment range, and the lower end of the curve 73 corresponds to the lower limit of the frame rate adjustment range. In the example of FIG. 13(*b*), the mark 73*a* is displayed at a position approximately one-half of the entire extent of the curve 73 from the lower end of the curve 73. This indicates that the value is an intermediate value of the frame rate adjustment range.

In the screen illustrated in FIG. 13(*b*), if the user performs a slide operation on the curve 71 with the thumb, the control unit 35 (the image-capturing condition setting unit 35*d*) changes the gain adjustment parameter of the first region 61 which is the target region for setting (changing) image-capturing conditions in the live view image, to a value corresponding to the position of the thumb after the slide operation.

In increasing the gain of the first region 61, the image-capturing condition setting unit 35*d* determines an adjustment parameter that increases the gain by setting an amplification degree of the signal read out from the first region 61 to be larger than the currently set gain.

In decreasing the gain of the first region 61, the image-capturing condition setting unit 35*c* determines an adjustment parameter that decreases the gain by setting an amplification degree of the signal read out from the first region 61 to be smaller than the currently set gain.

The image-capturing condition setting unit 35*d* sets the determined gain adjustment parameter in the image-capturing unit 32 or the image processing unit 33. The setting in the image-capturing unit 32 is intended to achieve the change in the gain by changing the exposure condition of the image sensor 100 in the next image-capturing event. The setting in the image processing unit 33 is intended to obtain an image after the change in the gain by image processing on the live view image.

The control unit 35 shifts the display position of the mark 71*a* on the curve 71 so as to correspond to the position of the thumb after the slide operation. The control unit 35 performs the above-described processing so that the user can view how the gain of the first region 61 changes in the live view image 60*a*.

The control unit 35 (the image-capturing condition setting unit 35*d*) maintains the preset gain adjustment parameters of regions that are not targeted for setting (changing) image-capturing conditions (regions other than the first region 61).

It should be noted that in a region that is not targeted for setting (changing) image-capturing conditions, image-capturing conditions may be changed near a boundary between the region and the first region 61 so that the discontinuity of the image-capturing conditions near the boundary is blurred, in consideration of balance of the entire image.

The control unit 35 (the image-capturing condition setting unit 35*d*) also sets (changes) the shutter speed and the frame rate in the same manner as in the case of setting (changing) the gain.

Figure 14A:
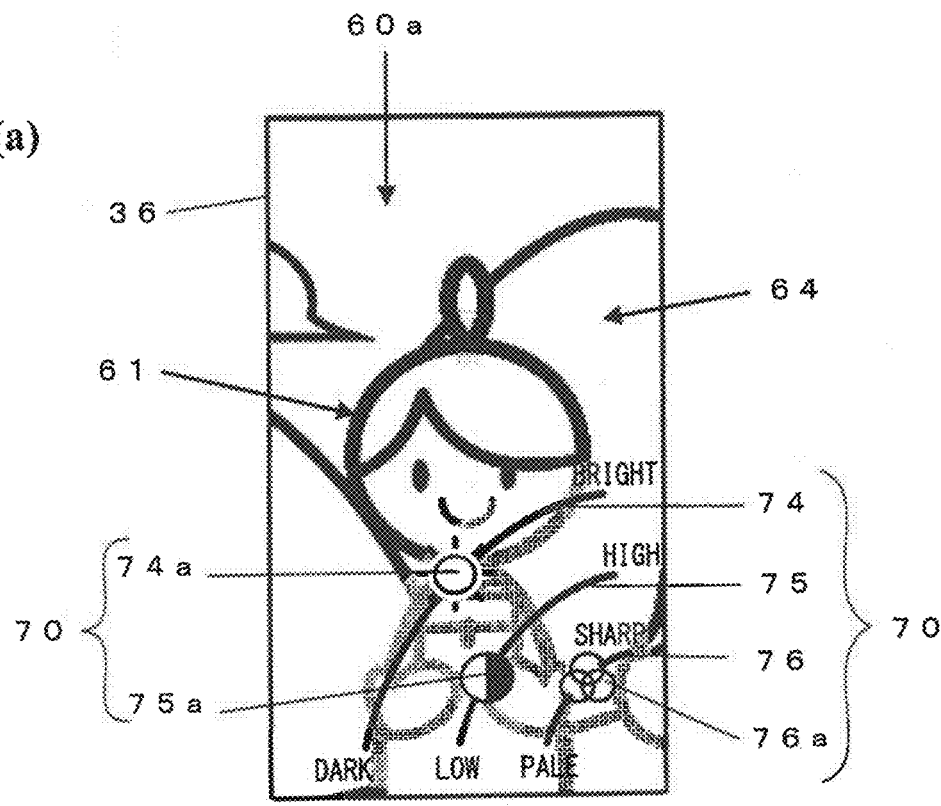
FIG. 14(a) is a view illustrating a setting screen for image-capturing conditions in a fifth variation.
Figure 14B:
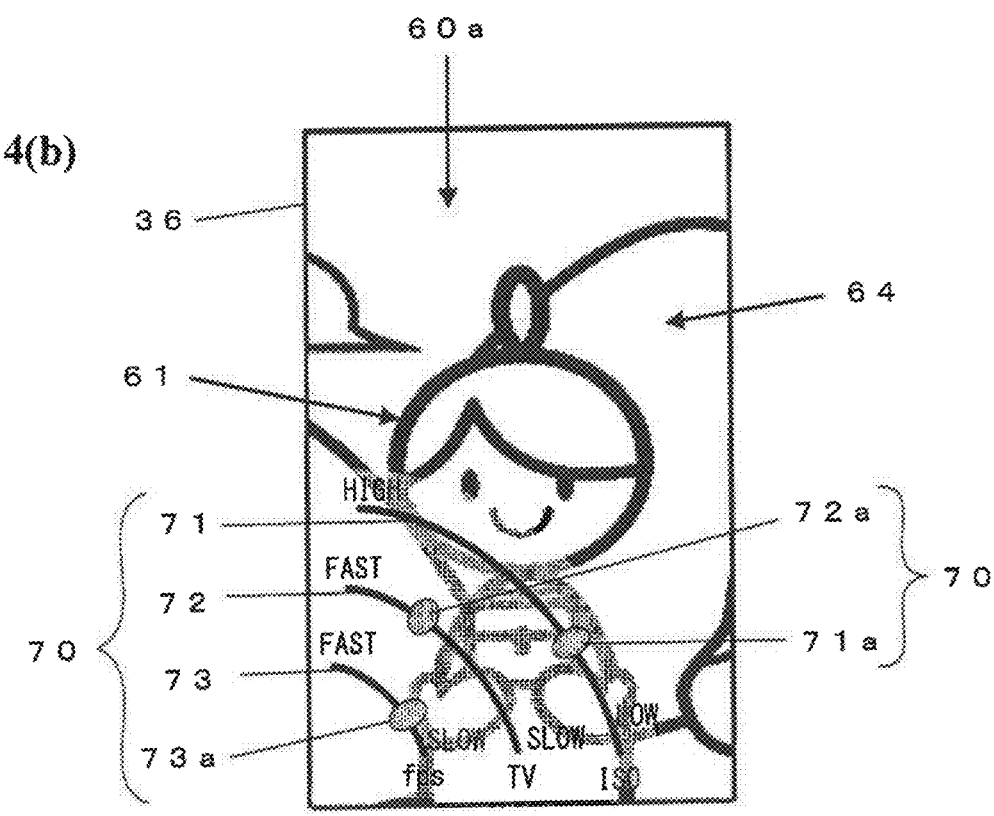
FIG. 14(b) is a view illustrating a setting screen for the image-capturing conditions in the fifth variation.

It should be noted that the image-capturing conditions (the exposure conditions and the image processing conditions) to be changed by the operation unit 70 may be brightness, contrast, and chroma. FIG. 14(*a*) is a view illustrating a setting screen for brightness, contrast, and chrome as image-capturing conditions. The operation unit 70 displayed at the bottom right position of the screen (i.e., within the movable range of the right hand thumb), superimposed on the live view image 60*a*, includes curves 74, 75, and 76 as an example of setting items of the image-capturing conditions, in this order from the outer side of the movable range. The curve 74 corresponds to an operation unit for increasing and decreasing a brightness, which is one of the exposure conditions. The curve 75 corresponds to an operation unit for increasing and decreasing a contrast, which is one of the image processing conditions. The curve 76 corresponds to an operation unit for increasing and decreasing a chroma, which is one of the image processing conditions. Although FIG. 14(*a*) illustrates an example in which three curves corresponding to three image-capturing conditions are displayed on the operation unit 70, only one curve corresponding to one image-capturing condition or two curves corresponding to two image-capturing conditions may be displayed.

Marks 74*a* to 76*a* are displayed on the curves 74 to 76, respectively. Positions (display positions on the curves) of the marks 74*a* to 76*a* displayed in the operation unit 70 correspond to the image-capturing conditions of the target region for setting (changing) image-capturing conditions (the first region 61 in the example of FIG. 14(*a*)). In other words, the mark 74*a* corresponds to the brightness, the upper end of the curve 74 corresponds to the upper limit of a brightness adjustment range, and the lower end of the curve 74 corresponds to the lower limit of the brightness adjustment range. The mark 75*a* corresponds to the contrast, the upper end of the curve 75 corresponds to the upper limit of a contrast adjustment range, and the lower end of the curve 75 corresponds to the lower limit of the contrast adjustment range. The mark 76*a* corresponds to the chroma, the upper end of the curve 76 corresponds to the upper limit of a chroma adjustment range, and the lower end of the curve 76 corresponds to the lower limit of the chroma adjustment range. The image-capturing conditions are set in the same manner as in the case of setting (changing) the gain, the shutter speed, and the frame rate.

FIG. 14(*b*) is a view illustrating a setting screen for image-capturing conditions, assuming that a user operates the device with the left hand. The curves 74 to 76 have the same functions as the curves of FIG. 13(*b*), although they are mirror-symmetrical. The detailed description of the curves 74 to 76 will thus be omitted.

The control unit 35 may switch between the display of FIG. 13(*b*) and the display of FIG. 14(*b*) in response to a switching operation on an operation menu screen or the like. The control unit 35 may switch between the display of FIG. 13(*b*) and the display of FIG. 14(*b*) in accordance with the detection result of the acceleration sensor. The control unit 35 may also switch between the display of FIG. 13(*b*) and the display of FIG. 14(*b*) on the basis of detection of a hand of a user gripping the electronic device 2.

Figure 15A:
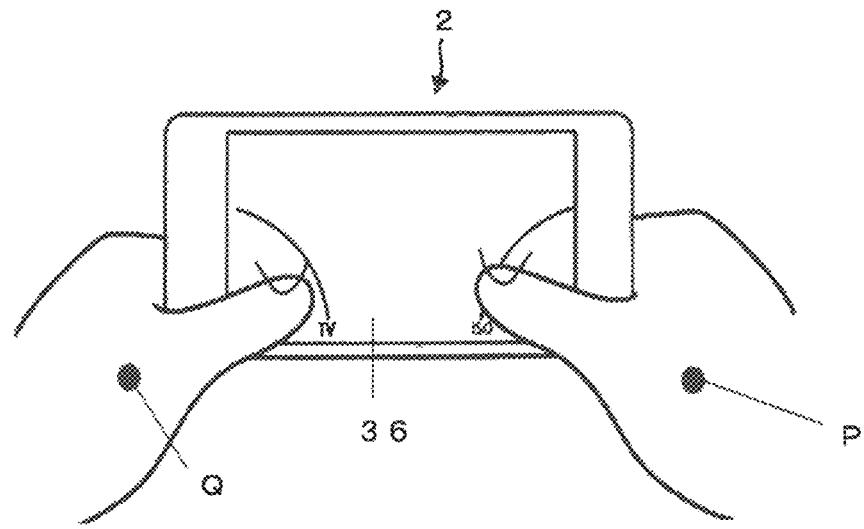
FIG. 15(a) is a view illustrating a user operation.
Figure 15B:
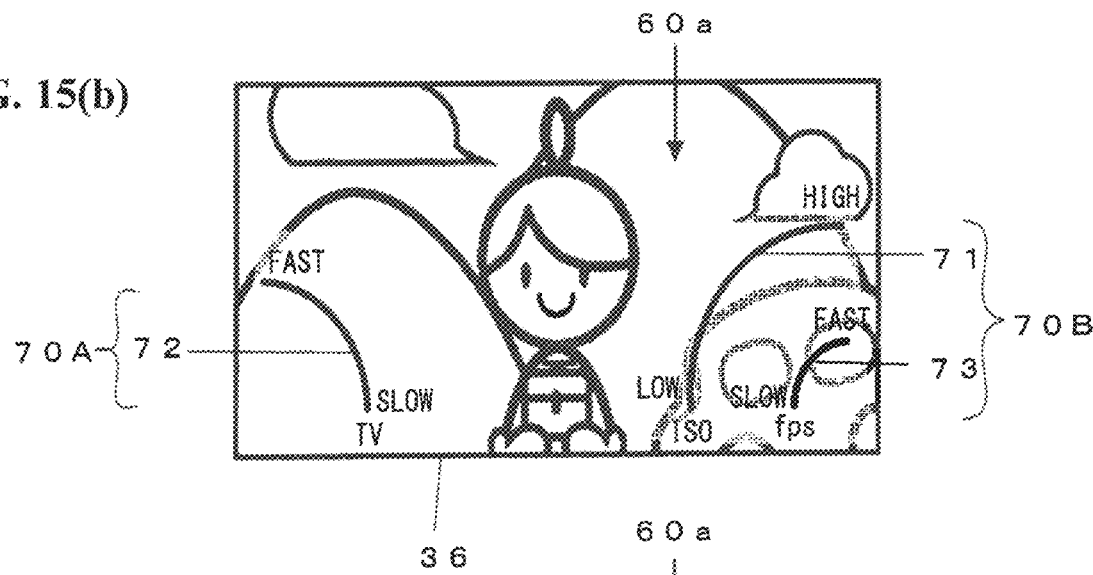
FIG. 15(b) is a view illustrating a setting screen for image-capturing conditions in the fifth variation.

FIG. 15(*a*) is a view illustrating a setting screen for image-capturing conditions, assuming that a user operates the device with both hands. According to FIG. 15(*a*), the touch operation member of the electronic device 2 is operated with the thumbs of both hands of the user, and the back surface of the camera 1 is supported by fingers other than the thumbs. A movable range of the thumb of the right hand in the display surface of the liquid crystal monitor 36 is the inside of an arc having a radius that is equal to the length of the thumb about a right thumb joint position P. A movable range of the thumb of the left hand in the display surface of the liquid crystal monitor 36 is the inside of an arc having a radius that is equal to the length of the thumb about a left thumb joint position Q.

The control unit 35 then predetermines the movable range of the thumb based on the average grip position at which the electronic device 2 is held by users and the average length of a human thumb, and displays operation units 70A, 70B (described later) in FIG. 15(*b*) within the movable ranges of the thumbs of both hands.

The operation unit 70A includes a curve 72 as an example of a setting item of the image-capturing conditions. The curve 72 corresponds to an operation unit for increasing and decreasing a shutter speed TV (charge accumulation time), which is one of the exposure conditions. The curve 72 has the same function as the curve of FIG. 13(*b*), although they are mirror-symmetrical. The detailed description of the curve 72 will thus be omitted.

The operation unit 70B includes curves 71 and 73 as an example of setting items of the image-capturing conditions, in this order from the outer side of the movable range of the right thumb. The curve 71 corresponds to an operation unit for increasing and decreasing a gain (ISO sensitivity), which is one of the exposure conditions. The curve 73 corresponds to an operation unit for increasing and decreasing a frame rate, which is one of the exposure conditions. The curves 71 and 73 have the same functions as the curves of FIG. 13(b) and thus the detailed description of the curves 71 and 73 will be omitted.

Figure 15C:
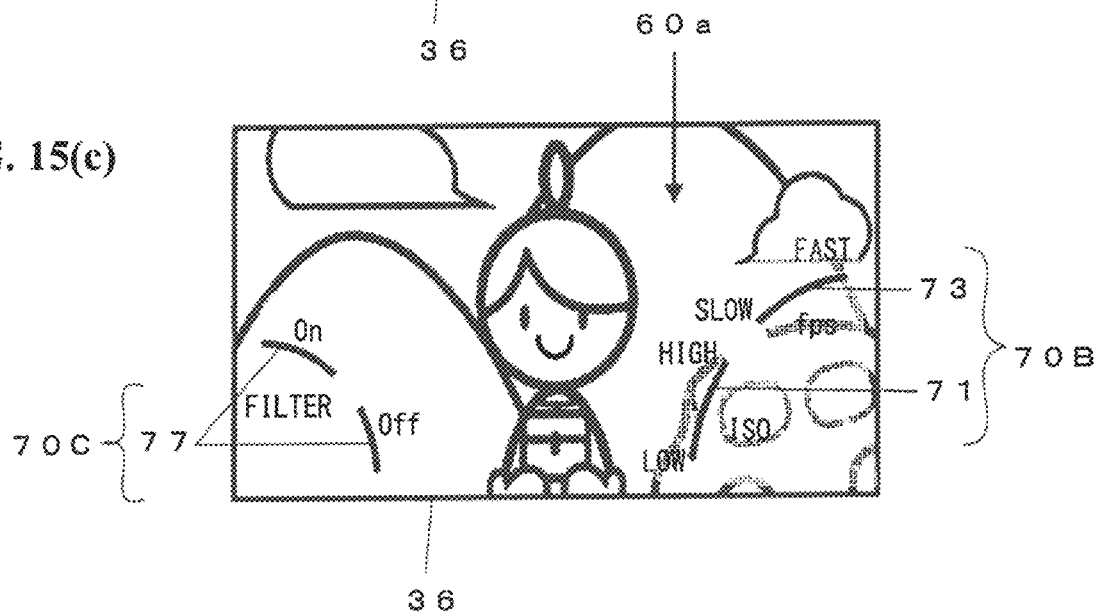
FIG. 15(c) is a view illustrating a setting screen according to the fifth variation.

FIG. 15(c) is a view illustrating another display form of the operation unit 70. In FIG. 15(c), the operation unit 70B is displayed at the bottom right of the screen (within the movable range of the right thumb), superimposed on the live view image 60a, while the operation unit 70C is displayed at the bottom left of the screen (within the movable range of the left thumb). The operation unit 70B includes curves 71 and 73 as an example of setting items of the image-capturing conditions. The curves 71 and 73 are separated arcs having the same radius, instead of arcs having different radii in FIG. 15(b).

In the case where the curves 71 and 73 are set as a plurality of operation units 70, the control unit 35 sets discontinuous curves 71 and 73 on a single virtual line. This allows a plurality of image-capturing conditions to be set (changed) without providing a plurality of curves based on arcs having different radii as in the previous embodiment.

Additionally, the operation unit 70A includes a curve 77 as an example of a setting item. A curve 77 corresponds to an operation unit for turning on and off filter processing. In the screen illustrated in FIG. 15(c), if the user performs a slide operation on the curve 77 with the thumb, the control unit 35 changes an on/off state of predetermined filter processing on the first region 61 which is the target region for setting (changing) image-capturing conditions in the live view image, to a setting corresponding to the position of the thumb after the slide operation.

The image-capturing condition setting unit 35d sets the setting corresponding to the end position of the slide operation on the curve 77, in the image processing unit 33. The setting in the image processing unit 33 is intended to obtain an image after the filter processing on the first region 61 by image processing on the live view image.

Figure 16A:
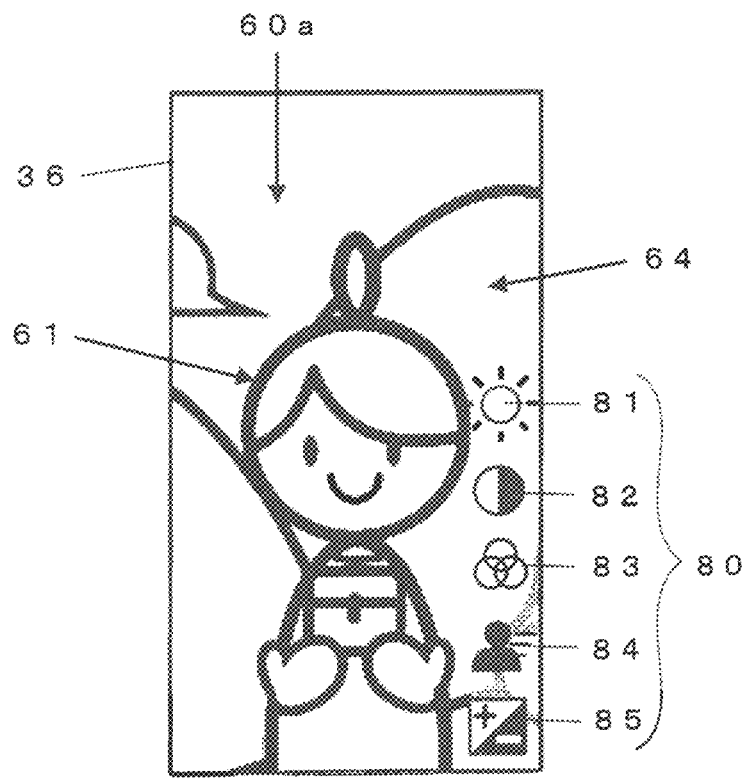
FIG. 16(a) is a view illustrating a setting screen for image-capturing conditions in the fifth variation.

FIG. 16(a) is a view illustrating another display form of the operation unit. In FIG. 16(a), an icon group 80 is displayed as an operation unit in the movable range of the thumb of the right hand.

An icon 81 is an operation icon for increasing and decreasing a brightness, which is one of the exposure conditions. An icon 82 is an operation icon for increasing and decreasing a contrast, which is one of the image processing conditions. An icon 83 is an operation icon for increasing and decreasing a chroma, which is one of the image processing conditions. An icon 84 is an operation icon for increasing and decreasing a shutter speed (charge accumulation time), which is one of the exposure conditions. An icon 85 is an operation icon for changing an exposure correction value so that an exposure is corrected to be higher or lower than a proper exposure.

The control unit 35 changes image-capturing conditions (i.e., brightness, contrast, chroma, shutter speed, and exposure correction value) corresponding to the icons operated by the user.

It should be noted that the image-capturing conditions (the exposure conditions and the image processing conditions) to be changed may be determined by the control unit 35 on the basis of the live view image 60a, or the conditions to be changed may be image-capturing conditions specified in advance by a user operation.

Additionally, the user holds down the display position of the target region for setting (changing) image-capturing conditions on the display surface of the liquid crystal monitor 36 on which the live view image 60a is displayed, for some time (e.g., the user keeps touching for one second or more). Upon sensing this holding-down operation, the control unit 35 displays the icon group 80 as an operation unit at the bottom right of the screen (within the movable range of the right thumb described above), superimposed on the live view image 60a.

Figure 16B:
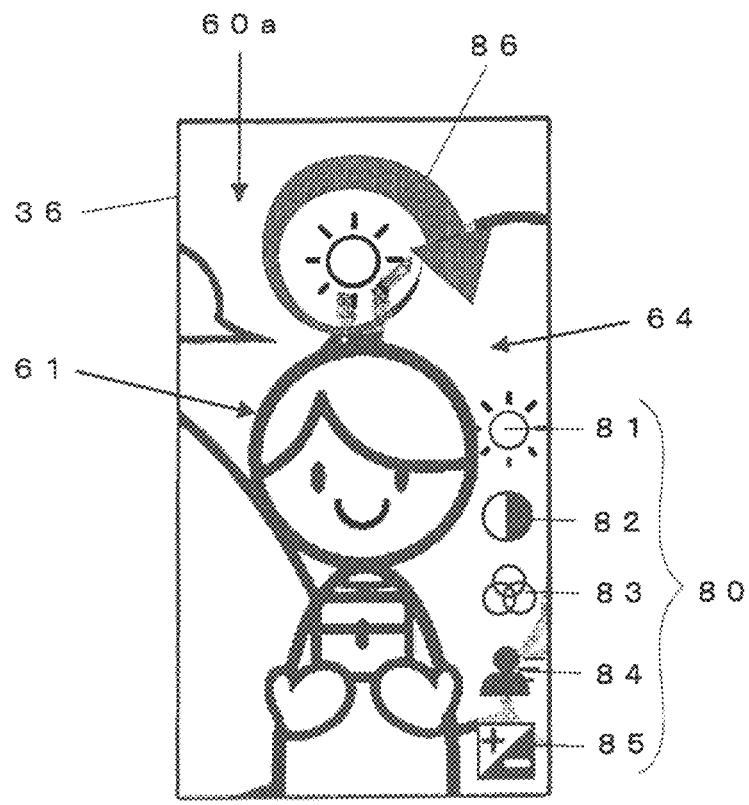
FIG. 16(b) is a view illustrating a setting screen during an operation on the icons.

FIG. 16(b) is a view illustrating a setting screen during an operation on the icon 81. In FIG. 16(b), while the user touches the icon 81 with the thumb (or any other finger), for example, the control unit 35 displays a rotating arrow icon 86 on the liquid crystal monitor 36, superimposed on the live view image 60a. The control unit 35 further displays the same icon as the operated icon 81, in the center of the arrow icon 86.

Figure 17A:
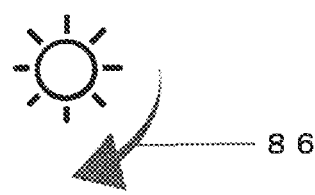
FIGS. 17(a) and 17(b) are views for explaining an arrow icon having a variable length.
Figure 17B:
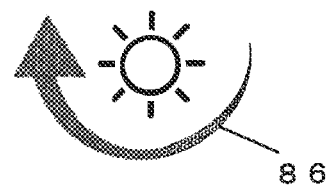

The control unit 35 changes a length of the arrow icon 86 in a predetermined time cycle (e.g., two seconds). FIG. 17 is a view for explaining the arrow icon 86 having a variable length. The control unit 35 gradually changes the displayed length from the arrow icon 86 in FIG. 17(a) to the arrow icon 86 in FIG. 17(b) and further to the arrow icon 86 in FIG. 16(b) over time. When the length of the arrow icon 86 reaches its maximum (FIG. 16(b)), the control unit 35 returns the length of the arrow icon 86 to its minimum and gradually increases the length again. The control unit 35 repeats the rotating display of the arrow icon 86 as described above in a predetermined time cycle (two seconds in this example) during the operation on the icon 81. In other words, the time required to change the length of the arrow icon 86 from its minimum to its maximum is two seconds, and the time required for one revolution of the arrow icon 86 is also two seconds.

The length of the arrow icon 86 correlates to a level of an adjustment value of the image-capturing condition (or the image processing condition) corresponding to the icon touched by the user. Thus, during the operation on the icon 81, the maximum length of the arrow icon 86 corresponds to the upper limit of the luminance adjustment range and the minimum length of the arrow icon 86 corresponds to the lower limit of the luminance adjustment range.

The control unit 35 (the image-capturing condition setting unit 35d) changes the brightness adjustment parameter of the first region 61, which is the target region for setting (changing) image-capturing conditions in the live view image, so as to correspond to a change in a length of the arrow icon 86.

In increasing the brightness of the first region 61, the image-capturing condition setting unit 35d determines an adjustment parameter that increases the brightness by increasing the charge accumulation time among the image-capturing conditions of the first region 61, for example.

In decreasing the brightness of the first region 61, the image-capturing condition setting unit 35d determines an adjustment parameter that decreases the brightness by decreasing the charge accumulation time, for example, among the image-capturing conditions of the first region 61.

The user ends the operation on the icon 81 at a desired timing with reference to the change in the brightness of the first region 61 reflected on the live view image 60a and the change in the length of the rotating arrow icon 86. The control unit 35 terminates the display of the arrow icon 86 in response to the end of the operation.

The image-capturing condition setting unit 35d determines an adjustment parameter at a point in time when the user ends the operation on the icon 81, and sets the determined brightness adjustment parameter in the image-capturing unit 32 or the image processing unit 33. The setting in the image-capturing unit 32 is intended to achieve the change in the brightness by changing the exposure condition of the image sensor 100 in the next image-capturing event. The setting in the image processing unit 33 is intended to obtain an image after the change in the brightness by image processing on the live view image.

The control unit 35 (the image-capturing condition setting unit 35d) maintains the preset brightness adjustment parameters of regions that are not targeted for setting (changing) image-capturing conditions (regions other than the first region 61).

It should be noted that in a region that is not targeted for setting (changing) image-capturing conditions, image-capturing conditions may be changed near a boundary between the region and the first region 61 so that the discontinuity of the image-capturing conditions near the boundary is blurred, in consideration of balance of the entire image.

Figure 18A:
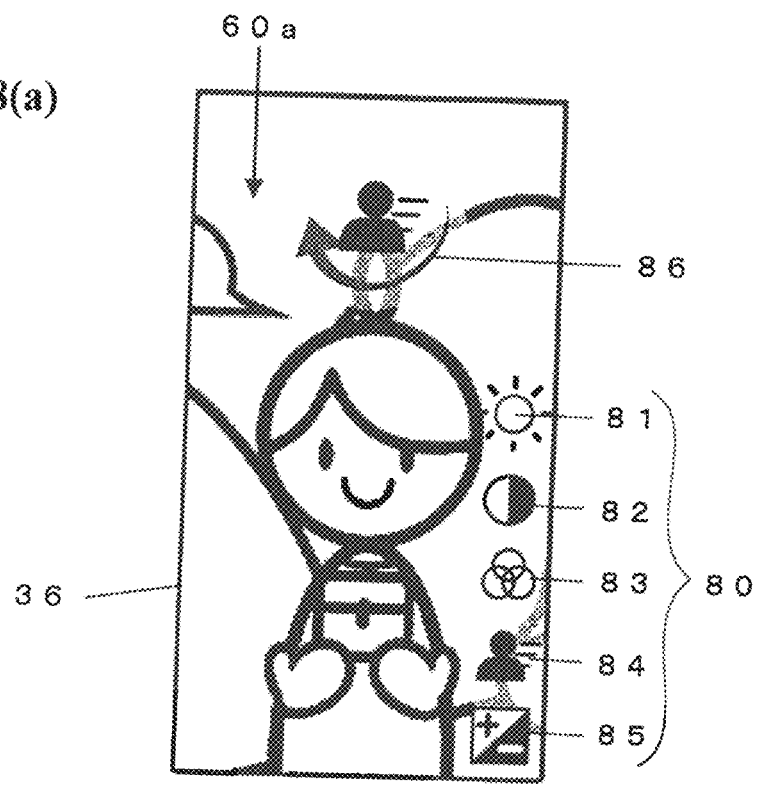
FIGS. 18(a) and 18(b) are views illustrating a setting screen during an operation on the icons.

FIG. 18(a) is a view illustrating a setting screen during an operation on the icon 84. In FIG. 18(a), while the user touches the icon 84 with the thumb (or any other finger), for example, the control unit 35 displays a rotating arrow icon 86 on the liquid crystal monitor 36, superimposed on the live view image 60a. The control unit 35 further displays the same icon as the operated icon 84, in the center of the arrow icon 86.

Figure 18B:
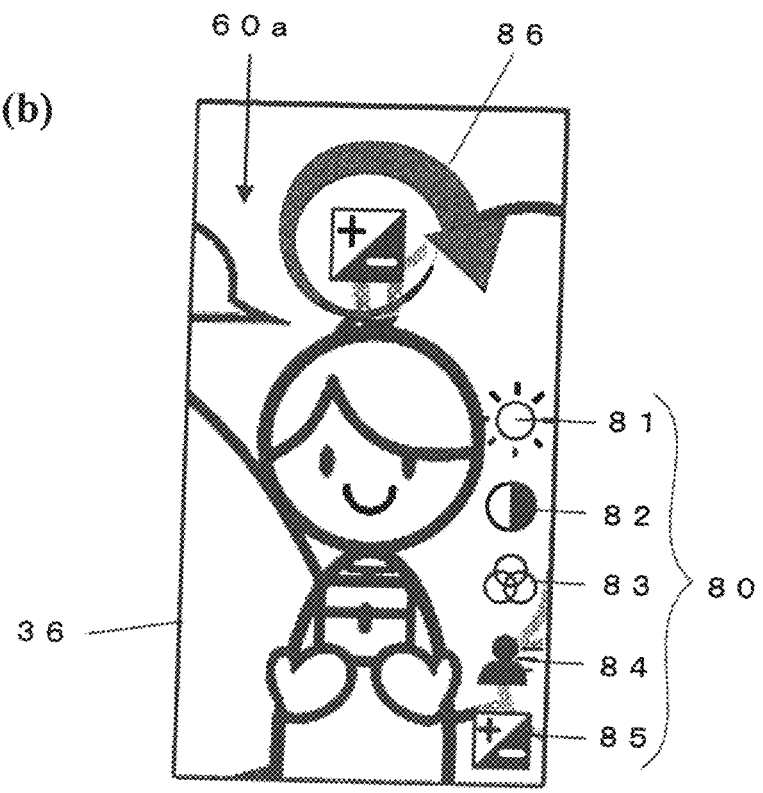

FIG. 18(b) is a view illustrating a setting screen during an operation on the icon 85. In FIG. 18(b), while the user touches the icon 85 with the thumb (or any other finger), for example, the control unit 35 (the display control unit 35f) displays a rotating circular arrow icon 86 on the liquid crystal monitor 36, superimposed on the live view image 60a. The control unit 35 (the display control unit 35f) further displays the same icon as the operated icon 85, in the center of the circular arrow icon 86.

The touch operation member provided on the display surface of the liquid crystal monitor 36 may be a touch operation member for detecting a contact pressure, in addition to the presence or absence of the contact operation and the contact position. The control unit 35 increases a rate of change of the image-capturing condition as the pressure of the contact operation increases. The control unit 35 increases a rotational speed of the rotating arrow icon 86 as the pressure of the contact operation increases. For example, the control unit 35 controls the rotational speed between 0.5 seconds per revolution and 5 seconds per revolution, in accordance with the level of the contact pressure. In this case, the control unit 35 also varies the time required to change the length of the arrow icon 86 from its minimum to its maximum between 0.5 seconds and 5 seconds. Accordingly, the user gently touches an icon in the icon group 80 if the user wishes to slowly set (change) an image-capturing condition, while the user firmly touches an icon of the icon group 80 if the user wishes to quickly set (change) an image-capturing condition. This results in an improved usability.

The touch operation member provided on the display surface of the liquid crystal monitor 36 may be a touch operation member for detecting a contact area, in addition to the presence or absence of the contact operation and the contact position. The control unit 35 increases a rate of change of the image-capturing condition as the contact area increases. The control unit 35 increases a rotational speed of the rotating arrow icon 86 as the contact area increases. For example, the control unit 35 controls the rotational speed between 0.5 seconds per revolution and 5 seconds per revolution, in accordance with the level of the contact area. In this case, the control unit 35 also varies the time required to change the length of the arrow icon 86 from its minimum to its maximum between 0.5 seconds and 5 seconds.

Accordingly, the user gently touches an icon in the icon group 80 with the tip of a finger if the user wishes to slowly set (change) an image-capturing condition, while the user firmly touches an icon of the icon group 80 with the ball of a finger if the user wishes to quickly set (change) an image-capturing condition. This results in an improved usability.

Even after the user ends the operation on the icon, the control unit 35 may continue to display the arrow icon 86 for a predetermined time (e.g., one second) without the rotation of the arrow icon 86.

If the user performs a rotational operation on the arrow icon 86 within the above-described predetermined time, the control unit 35 increases and decreases the adjustment parameter of the image-capturing condition from the value at a point in time when the icon operation ends, in accordance with the direction of the rotational operation along the arrow icon 86. For example, the user may finely adjust the adjustment parameter in the plus direction by rotating the icon clockwise with a finger and finely adjust the adjustment parameter in the minus direction by rotating the icon counter-clockwise with a finger.

If a predetermined time (e.g., one second) has elapsed since the user ceased the rotating operation on the arrow icon 86, the control unit 35 terminates the display of the arrow icon 86 and sets the finely adjusted adjustment parameter in the image-capturing unit 32 or the image processing unit 33.

If the predetermined time (e.g., one second) has elapsed without any rotational operation on the arrow icon 86 since the user ended the operation on the icon, the control unit 35 terminates the display of the arrow icon 86 and sets the adjustment parameter of the image-capturing conditions at a point in time when the icon operation is ended, in the image-capturing unit 32 or the image processing unit 33.

(Sixth Variation)

Figure 19:
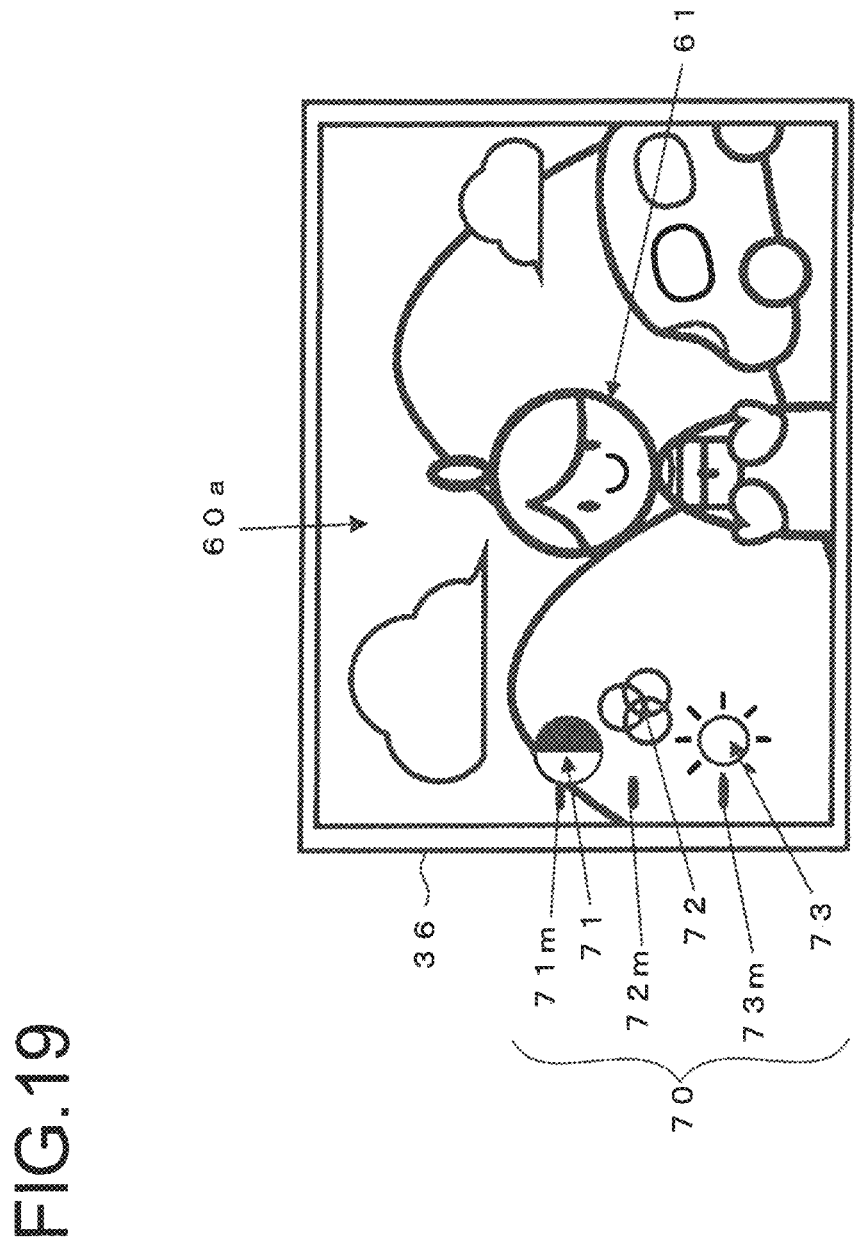
FIG. 19 is a view illustrating a setting screen for image-capturing conditions for regions.

FIG. 19 is a view illustrating a setting screen for image-capturing conditions in a sixth variation. The control unit 35 sets a region selected by the user as a target region for setting (changing) image-capturing conditions, among regions partitioned by the region partitioning unit 35b. In FIG. 19, the control unit 35 sets a first region 61 including a person 61a in a live view image 60a as a target region for setting (changing) image-capturing conditions, and also displays the first region 61 having a highlighted or emphasized contour.

The control unit 35 displays an icon group including an icon 71, an icon 72, and an icon 73 which are vertically aligned at the left end of the screen, for example, in association with the target region for setting (changing) image-capturing conditions (the first region 61 in the example of FIG. 19).

The icon 71 is an operation icon for increasing and decreasing a contrast, which is one of the image processing conditions. The icon 72 is an operation icon for increasing and decreasing a chroma, which is one of the image processing conditions. The icon 73 is an operation icon for increasing and decreasing a brightness, which is one of the exposure conditions.

The positions at which the icons 71 to 73 are displayed (the display positions in the vertical direction of the screen) correspond to the image-capturing conditions of the target region for setting (changing) image-capturing conditions (the first region 61 in the example of FIG. 19). For example, the icon 71 corresponds to the contrast, the upper end of the screen corresponds to the upper limit of a contrast adjustment range, and the lower end of the screen corresponds to the lower limit of the contrast adjustment range. The upper limit of the contrast is set to a value at which a signal of a part having a high brightness in the first region 61 of the live view image is not saturated and at which a signal of a part having a low brightness in the first region 61 is not shadowed in black. The lower limit of the contrast is set to a value at which a difference in brightnesses in the first region 61 of the live view image still remains.

In FIG. 19, since the icon 71 is displayed at a position one-half from the lower end in the vertical direction of the screen, the setting value of the contrast in the reference condition is an intermediate value of the contrast adjustment range.

The icon 72 corresponds to the chroma, the upper end of the screen corresponds to the upper limit of a chroma adjustment range, and the lower end of the screen corresponds to the lower limit of the chroma adjustment range. The upper limit of the chroma is set to a value at which a signal having a high chroma (an outstanding color component) in the first region 61 of the live view image is not saturated. Additionally, the lower limit of the chroma is set to a value at which the first region 61 of the live view image still has vividness of color (the first region 61 has no achromatic color).

In FIG. 19, since the icon 72 is displayed at a position approximately one-third from the lower end in the vertical direction of the screen, the setting value of the chroma in the reference condition is a value of one-third of the entire width of the chroma adjustment range from the lower limit.

The icon 73 corresponds to the brightness, the upper end of the screen corresponds to the upper limit of a brightness adjustment range, and the lower end of the screen corresponds to the lower limit of the brightness adjustment range. The upper limit of the brightness is set to a value at which a signal of a part having a high brightness in the first region 61 of the live view image is not saturated (not blown out in white). Additionally, the lower limit of the brightness is set to a value at which a signal of a part having a low brightness in the first region 61 of the live view image is not excessively dark (not shadowed in black).

In FIG. 19, since the icon 73 is displayed at approximately one fourth of the entire extent from the lower end in the vertical direction of the screen, the setting value of the brightness in the reference condition is a value of one fourth from the lower limit of the brightness adjustment range.

In the screen illustrated in FIG. 19, if the user vertically drags the icon 71, the control unit 35 (the image-capturing condition setting unit 35d) changes the contrast adjustment parameter of the first region 61 which is the target region for setting (changing) image-capturing conditions in the live view image, to a value corresponding to the position of the icon 71 after the drag operation. The user can view how the contrast of the first region 61 changes in the live view image 60a.

The control unit 35 (the image-capturing condition setting unit 35d) maintains the preset contrast adjustment parameters of regions that are not targeted for setting (changing) image-capturing conditions (regions other than the first region 61).

It should be noted that in a region that is not targeted for setting (changing) image-capturing conditions, image-capturing conditions may be changed near a boundary between the region and the first region 61 so that the discontinuity of the image-capturing conditions near the boundary is blurred, in consideration of balance of the entire image.

The image-capturing condition setting unit 35d determines a contrast adjustment parameter for the first region 61 so as to correspond to the position of the icon 71 after the drag operation and sets the parameter in the image processing unit 33. The setting in the image processing unit 33 is intended to obtain an image after the change in the contrast by image processing on the live view image.

The control unit 35 (image-capturing condition setting unit 35d) also sets (changes) the chroma and the brightness in the same manner as in the case of setting (changing) the contrast.

Figure 20A:
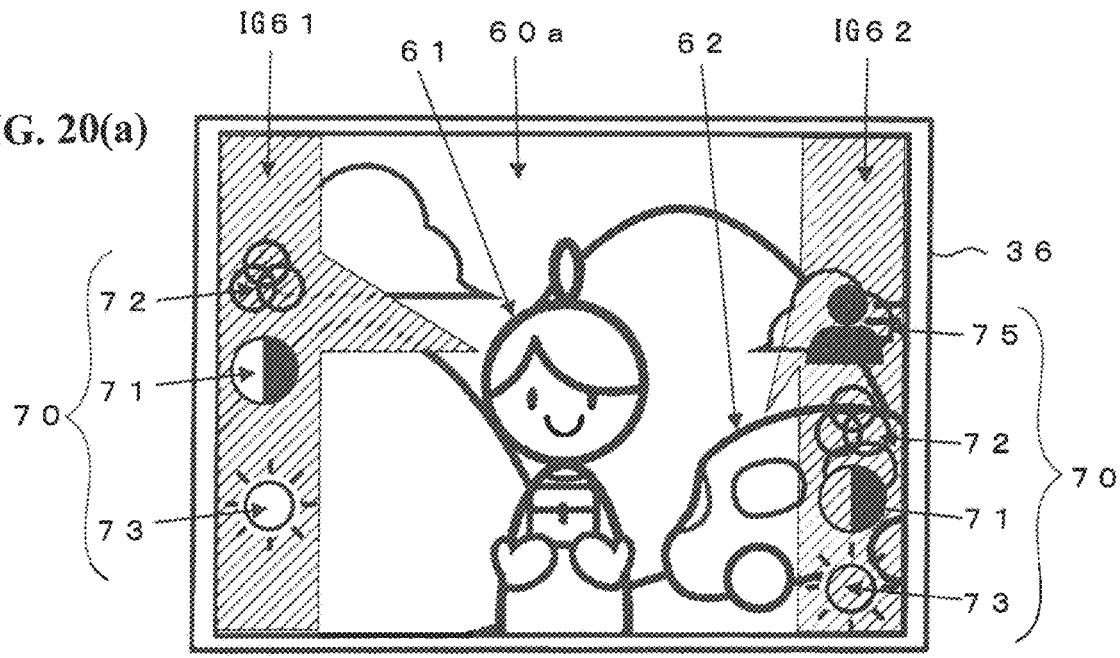
FIG. 20(a) is a view illustrating a setting screen for image-capturing conditions for a plurality of regions.

FIG. 20(a) is a view illustrating a setting screen for image-capturing conditions for a plurality of regions. For display positions of a person 61 and an automobile 62, for example, the control unit 35 highlights contours of these subject elements.

The control unit 35 displays a first icon group including an icon 71, an icon 72, and an icon 73 which are vertically aligned in an icon region IG61 at the left end of the screen, for example, in association with one target region for setting (changing) image-capturing conditions (the first region 61 in this example). The icon region IG61 has a balloon to clearly indicate the correspondence between the icon region IG61 and the first region 61.

The control unit 35 also displays a second icon group including an icon 71, an icon 72, an icon 73, and an icon 75 which are vertically aligned in an icon region IG62 at the right end of the screen, for example, in association with the other target region for setting (changing) image-capturing conditions (the second region 62 in this example). The icon region IG62 has a balloon to clearly indicate the correspondence between the icon region IG62 and the second region 62.

In the example of FIG. 20(a), the icon region IG61 corresponding to the first region 61 is displayed as an active region, while the icon region IG62 corresponding to the other region (the second region 62) is displayed as an inactive region. The control unit 35 enables operation on an icon group in the active icon region. The setting (change) of the image-capturing conditions for the target regions performed in the operation on the enabled icon group is the same as that in the case of only one target region. The description thereof will thus be omitted.

The control unit 35 controls the active icon region (IG61) and the target region for setting (changing) image-capturing conditions (i.e., the first region 61 having a highlighted contour in the live view image 60a) in correlation to each other. In FIG. 20(a), the contour of the first region 61 is highlighted in the live view image 60a displayed on the liquid crystal monitor 36.

Figure 20B:
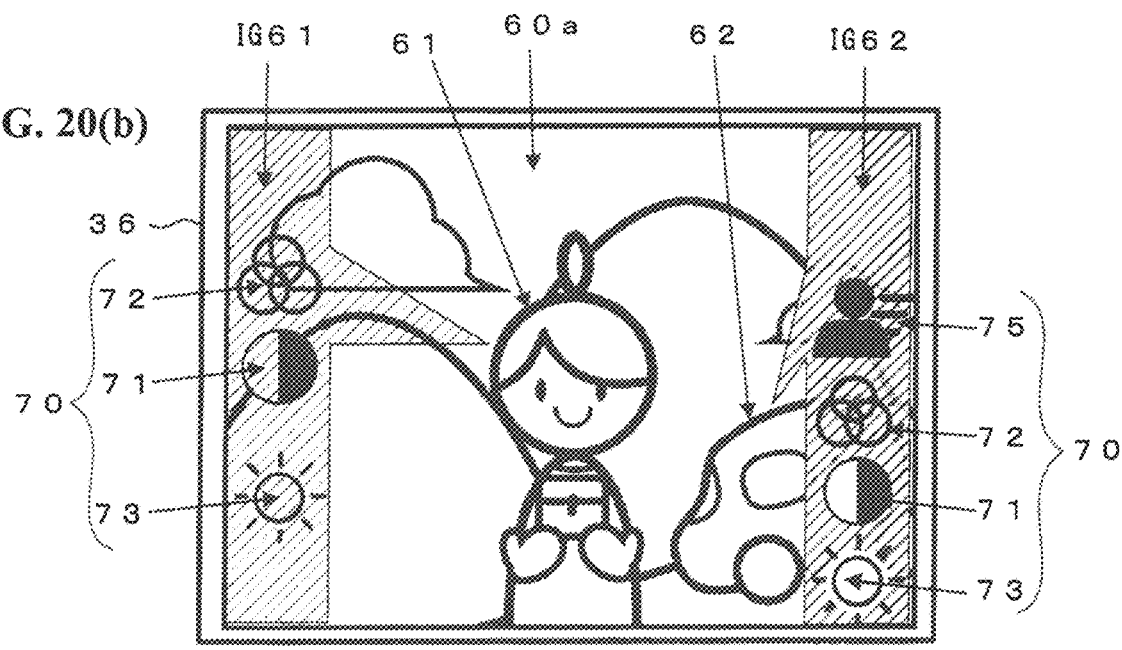
FIG. 20(b) is a view illustrating a setting screen for image-capturing conditions for the plurality of regions.

FIG. 20(b) is a view illustrating a setting screen after switching of the target region for setting (changing) image-capturing conditions. In FIG. 20(b), the contour of the second region 62 is highlighted in the live view image 60a displayed on the liquid crystal monitor 36. In the example of FIG. 20(b), the icon region IG62 corresponding to the second region 62 is displayed as an active region, while the icon region IG61 corresponding to the other region (the first region 61) is displayed as an inactive region. The control unit 35 enables operation on an icon group in the active icon region.

Also when the display position of the icon region IG62 is tapped, instead of the second region 62 being tapped, the control unit 35 may switch an icon region to be displayed as an active region and thus a target region for setting (changing) image-capturing conditions.

In capturing an image of a moving subject, the subject image can generally be blurred depending on a value of the shutter speed (the charge accumulation time). If the automobile 62a is detected as a moving subject element by the object detection unit 35a, the control unit 35 automatically adds an icon 75 corresponding to the shutter speed (the charge accumulation time) to a second icon group corresponding to the second region 62. This allows the user to change the shutter speed (the charge accumulation time) for the second region.

If there are two target regions, two icon groups for changing image-capturing conditions are displayed. This gives the user an visual indication of a difference between setting values of image-capturing conditions for the first region 61 and the second region 62 in the live view image 60a. The user can grasp the difference between the image-capturing conditions for the first region 61 and the second region 62 by comparing vertical display positions of the icons for the icon region IG61 and the icon region IG62.

Although indicators corresponding to the icons are omitted in the icon region IG61 and the icon region IG62 in FIGS. 20(a) and 20(b), the indicators are the same as that in the case of one target region.

It should be noted that the display positions of the icons are not necessarily located in the icon region IG61 or the icon region IG62. The icon may be displayed so as to partly extend out of the icon region IG61 or the icon region IG62, for example, in the case where the display position of the icon is shifted to avoid an overlap of the icons as described above.

Alternatively, a width of the icon region IG61 or the icon region IG62 may be increased to prevent the icon from extending out of the region, for example, in the case where the display position of the icon is shifted.

Although the icon region IG61 and the icon region IG62 are displayed, superimposed on the live view image 60a in the above example, they may be displayed separately from the live view image 60a.

Figure 21A:
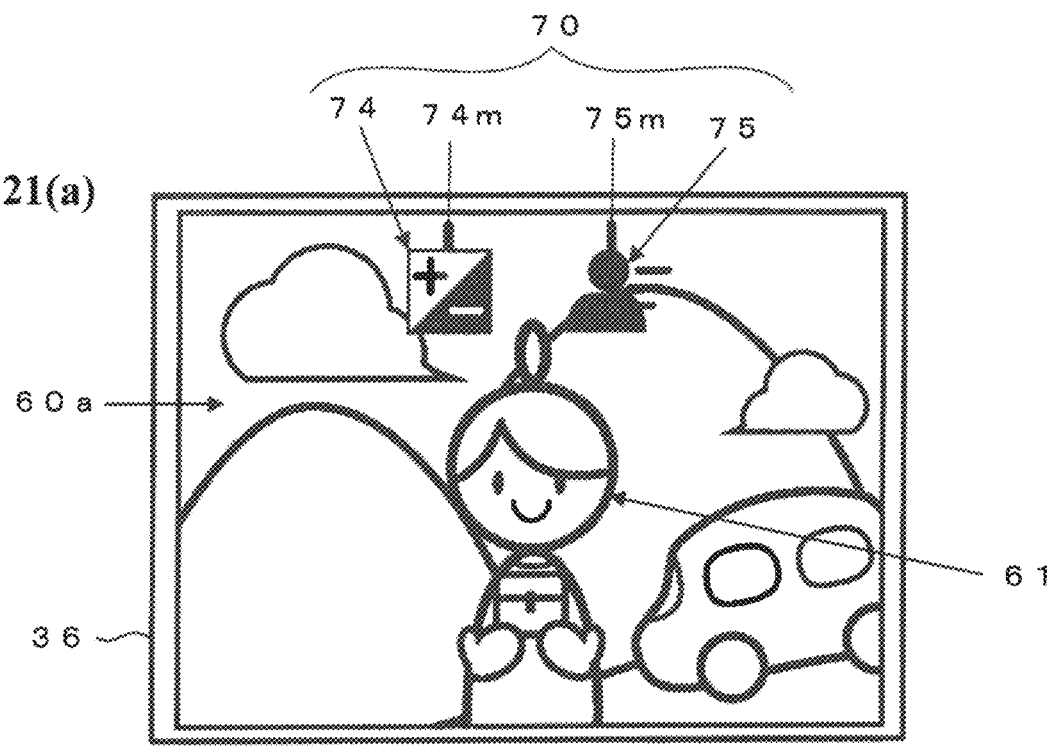
FIG. 21(a) is a view illustrating a setting screen for image-capturing conditions in a sixth variation.

FIG. 21(a) is a view of an exemplary setting screen for image capturing conditions, illustrating an icon 74 and an icon 75. It is assumed that the contour of a first region 61 is highlighted in a live view image 60a displayed on the liquid crystal monitor 36. As in the case of FIG. 19, the first region 61 including the person 61a is a target region for setting (changing) image-capturing conditions.

The icon 74 is an operation icon for changing an exposure correction value so that an exposure is corrected to be higher or lower than a proper exposure. The icon 75 is an operation icon for increasing and decreasing a shutter speed (the charge accumulation time), which is one of the exposure conditions.

The positions at which the icons 74 and 75 are displayed (the display positions in the horizontal direction of the screen) correspond to the image-capturing conditions of the target region for setting (changing) image-capturing conditions (the first region 61 in the example of FIG. 21(a)). The icon 74 corresponds to the exposure correction value, the right end of the screen corresponds to the upper limit of the exposure correction range in the plus direction, and the left end of the screen corresponds to the lower limit of the exposure correction range in the minus direction.

In the example of FIG. 21(a), the icon 74 is displayed slightly to the left of the center in the horizontal direction of the screen, which indicates that the setting value of the exposure correction is on the minus side of the intermediate value (zero exposure correction) of the exposure correction range, e.g., −0.5 EV. In other words, the exposure correction setting for the first region 61 is adjusted towards underexposure.

The icon 75 corresponds to the shutter speed (the charge accumulation time), the right end of the screen corresponds to the upper limit of the speed (i.e., the highest speed), and the left side of the screen corresponds to the lower limit of the speed (i.e., the lowest speed). In the example of FIG. 21(a), the display position of the icon 75 corresponds to a position that is neither the upper limit nor the lower limit, for example.

The display positions of the icon 74 and its indicator 74m in the horizontal direction of the screen are generally the same. This also applies to the icon 75 and its indicator 75m. However, in the case where the display position of the icon 74 or the icon 75 is shifted to avoid an overlap of the icon 74 and the icon 75 as in the above-described embodiment, the control unit 35 (the display control unit 35f) makes the display position of the indicator 74m or 75m different from the display position of the corresponding icon 74 or icon 75.

In the screen illustrated in FIG. 21(a), if the user horizontally drags the icon 74, the control unit 35 (the image-capturing condition setting unit 35d) changes the adjustment parameter of the exposure correction value of the first region 61 which is the target region for setting (changing) image-capturing conditions in the live view image, to a value corresponding to the position of the icon 74 after the drag operation.

If the exposure correction value of the first region 61 is increased in the plus direction, the image-capturing condition setting unit 35c determines an image-capturing condition after the exposure correction by increasing the charge accumulation time relative to the charge accumulation time of the above-described reference conditions or increasing the gain relative to the gain of the above-described reference conditions, among the image-capturing conditions of the first region 61, for example.

If the exposure correction value of the first region 61 is increased in the minus direction, the image-capturing condition setting unit 35c determines an image-capturing condition after the exposure correction by increasing the charge accumulation time relative to the charge accumulation time of the above-described reference conditions or increasing the gain relative to the gain of the above-described reference conditions, among the image-capturing conditions of the first region 61, for example.

The user can view how the exposure of the first region 61 changes in the live view image 60a.

The control unit 35 (the image-capturing condition setting unit 35d) maintains the preset image-capturing conditions for regions that are not targeted for setting (changing) image-capturing conditions (regions other than the first region 61).

It should be noted that in a region that is not targeted for setting (changing) image-capturing conditions, image-capturing conditions may be changed near a boundary between the region and the first region 61 so that the discontinuity of the image-capturing conditions near the boundary is blurred, in consideration of balance of the entire image.

The image-capturing condition setting unit 35d determines an adjustment parameter of the exposure correction value for the first region 61 so as to correspond to the position of the icon 74 after the drag operation and sets the parameter in the image-capturing unit 32 or in the image processing unit 33. The setting in the image-capturing unit 32 is intended to achieve the change in the the exposure correction value by changing the exposure condition of the image sensor 100 in the next image-capturing event. The setting in the image processing unit 33 is intended to obtain an image after the change in the exposure correction value by image processing on the live view image.

The control unit 35 (the image-capturing condition setting unit 35d) also sets (changes) the shutter speed with the icon 75 in the same manner as in the case of setting (changing) the exposure condition.

Figure 21B:
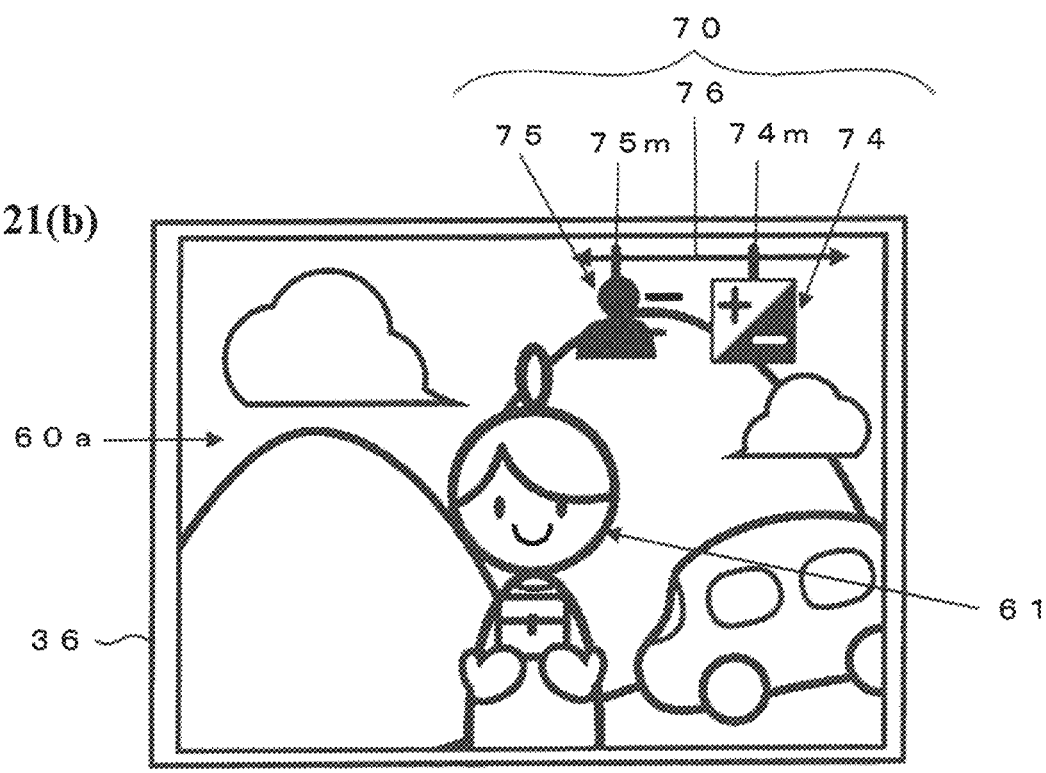
FIG. 21(b) is a view illustrating a setting screen for image-capturing conditions in the sixth variation.

FIG. 21(b) is a view illustrating a setting screen for image-capturing conditions. If setting (changing) one of the image-capturing conditions (for example, the exposure correction value) cause a restriction of an allowable setting range of another image-capturing condition (for example, the shutter speed (the charge accumulation time)), the control unit 35 displays an indication 76 indicating the restricted range, as shown in FIG. 21(b). For example, if changing the exposure correction value in the plus direction causes a restriction of the allowable setting range of the shutter speed, the control unit 35 displays an indication 76 indicating the restricted setting range of the shutter speed, together with the icon 75.

The icon 75 corresponding to the shutter speed (the charge accumulation time) and the indication 76 indicating the restricted setting range can clearly show the setting range of the shutter speed to the user.

Instead of displaying all of the icons 71 to 73 at a time as illustrated in FIGS. 21(a) and 21(b), the operation icons for changing the image-capturing conditions may be alternately displayed.

Figure 22A:
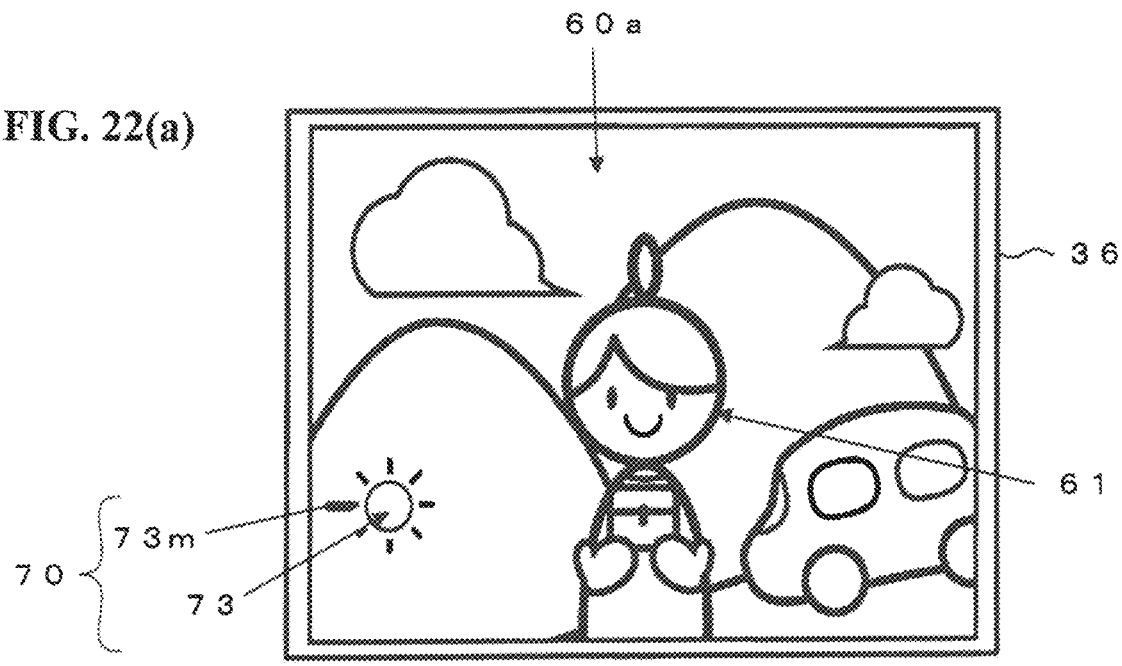
FIGS. 22(a) and 22(b) are views illustrating a setting screen for image-capturing conditions in the sixth variation.

FIG. 22(a) is a view of an exemplary setting screen for the image-capturing conditions, illustrating an icon 73 and its indicator 73m. The contour of the first region 61 is highlighted in the live view image 60a displayed on the liquid crystal monitor 36. The first region 61 including the person 61a is thus a target region for setting (changing) image-capturing conditions.

For example, if the user drags the displayed icon 73, the control unit 35 displays the icon 71 and the icon 72 in addition to the icon 73. In other words, the control unit 35 displays a setting screen illustrated in FIG. 22(b) after setting (changing) the brightness adjustment parameter of the first region 61 which is the target region for setting (changing) image-capturing conditions in the live view image 60a.

Figure 22B:
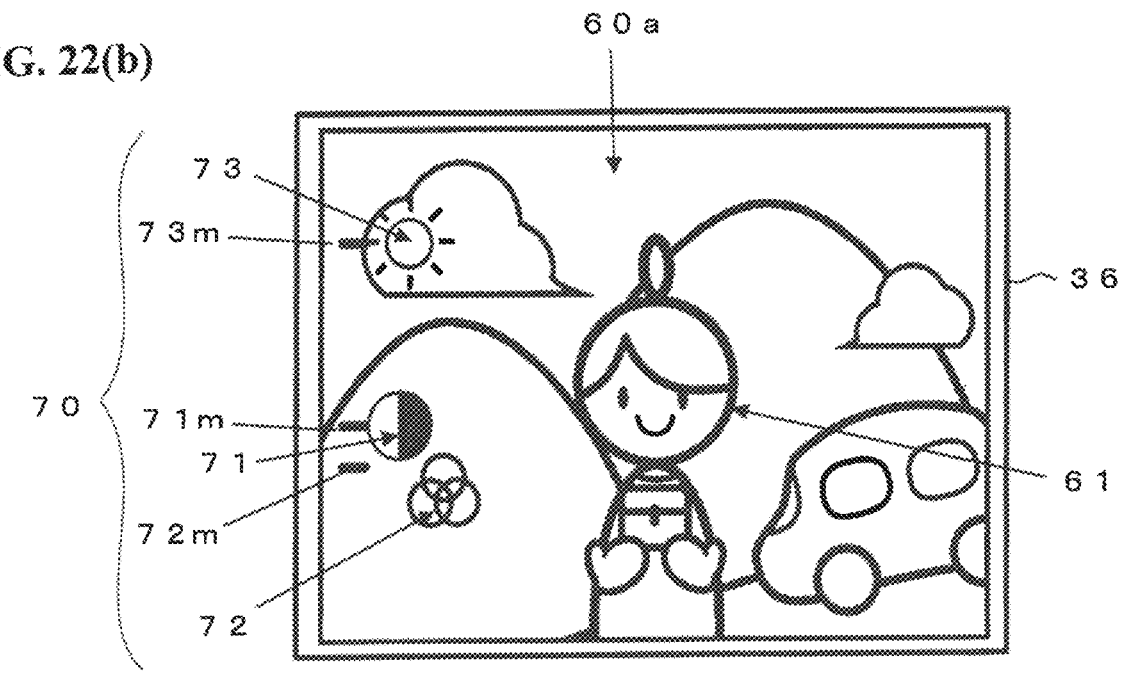

FIG. 22(b) is a view of an exemplary setting screen for image-capturing conditions for regions, illustrating the icon 71 and an indicator 71m and the icon 72 and an indicator 72m, which are now additionally displayed. The user can change the contrast corresponding to the icon 71 and the chroma corresponding to the icon 72 in the setting screen of FIG. 22(b) displayed after the brightness adjustment parameter has been set (changed).

The order of displaying the icons 71 to 73 may be changed as appropriate.

If a predetermined time (e.g., two seconds) has elapsed without any drag operation on the icon 71 or the icon 72 in FIG. 22(b), or if the predetermined time (e.g., two seconds) has elapsed since a drag operation on any one of the icons 71 to 73, the control unit 35 terminates the display of the icon 71 and the indicator 71m and the icon 72 and the indicator 72m and displays the icon 73 and its indicator 73m again (as in FIG. 22(a)).

Until a shutter release instruction is provided, i.e., until a release button (not shown) constituting the operation member 37 or a display icon for instructing image-capturing is operated, the control unit 35 may continue to display the icon 71 and the indicator 71m and the icon 72 and the indicator 72m.

Figure 23A:
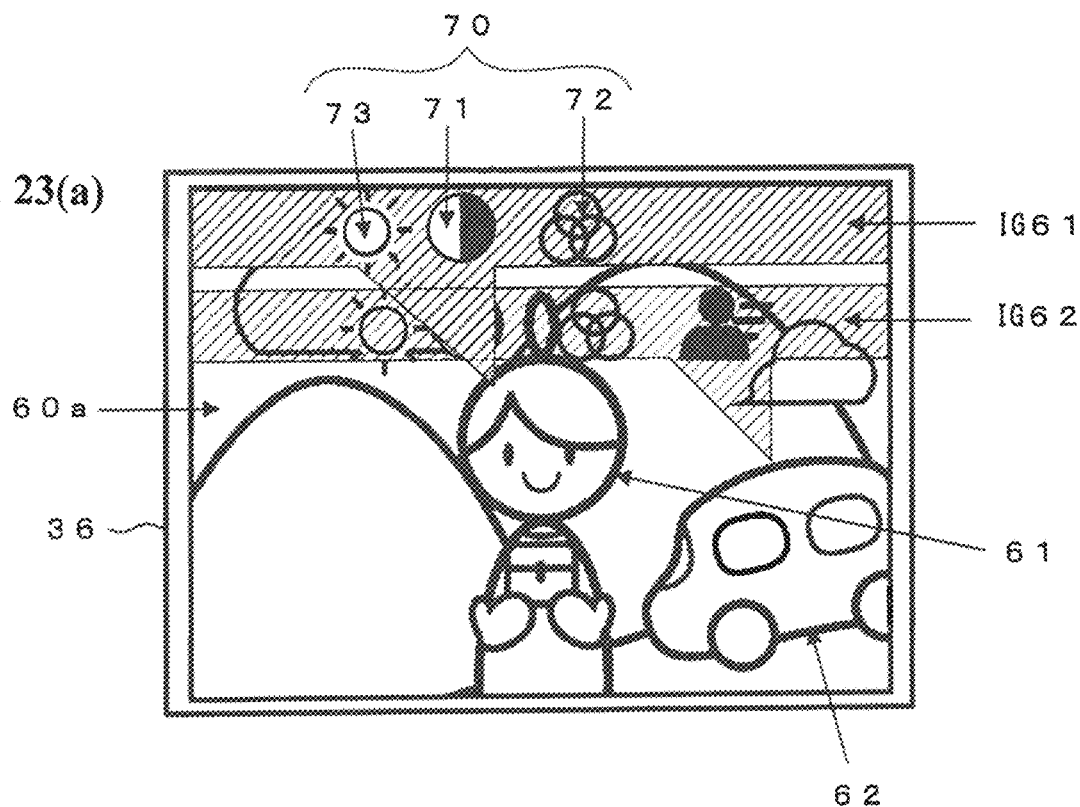
FIGS. 23(a) and 23(b) are views illustrating a setting screen for image-capturing conditions in the sixth variation.

The icon region IG61 and the icon region IG62 in FIG. 20(a) and FIG. 20(b) may be displayed in the horizontal direction. FIG. 23(a) is a view illustrating a setting screen for image-capturing conditions. The contour of the first region 61 is highlighted in the live view image 60a displayed on the liquid crystal monitor 36.

The control unit 35 displays a first icon group including an icon 71, an icon 72, and an icon 73 which are horizontally aligned in the icon region IG61 at the top end of the screen, for example, in association with one target region for setting (changing) image-capturing conditions (the first region 61 in this example). The icon region IG61 has a balloon to clearly indicate the correspondence between the icon region IG61 and the first region 61.

The control unit 35 also displays a second icon group including an icon 71, an icon 72, an icon 73, and an icon 75 which are horizontally aligned in the icon region IG62 located below the icon region IG61, for example, in association with the other target region for setting (changing) image-capturing conditions (the second region 62 in this example). The icon region IG62 has a balloon to clearly indicate the correspondence between the icon region IG62 and the second region 62.

In the example of FIG. 23(a), the icon region IG61 corresponding to the first region 61 is displayed as an active region, while the icon region IG62 corresponding to the other region (the second region 62) is displayed as an inactive region. As in the case of FIGS. 20(a) and 20(b), the control unit 35 enables operation on an icon group in the active icon region. The setting (change) of the image-capturing conditions for the target regions performed in the operation on the enabled icon group is the same as described above. The description thereof will thus be omitted.

Figure 23B:
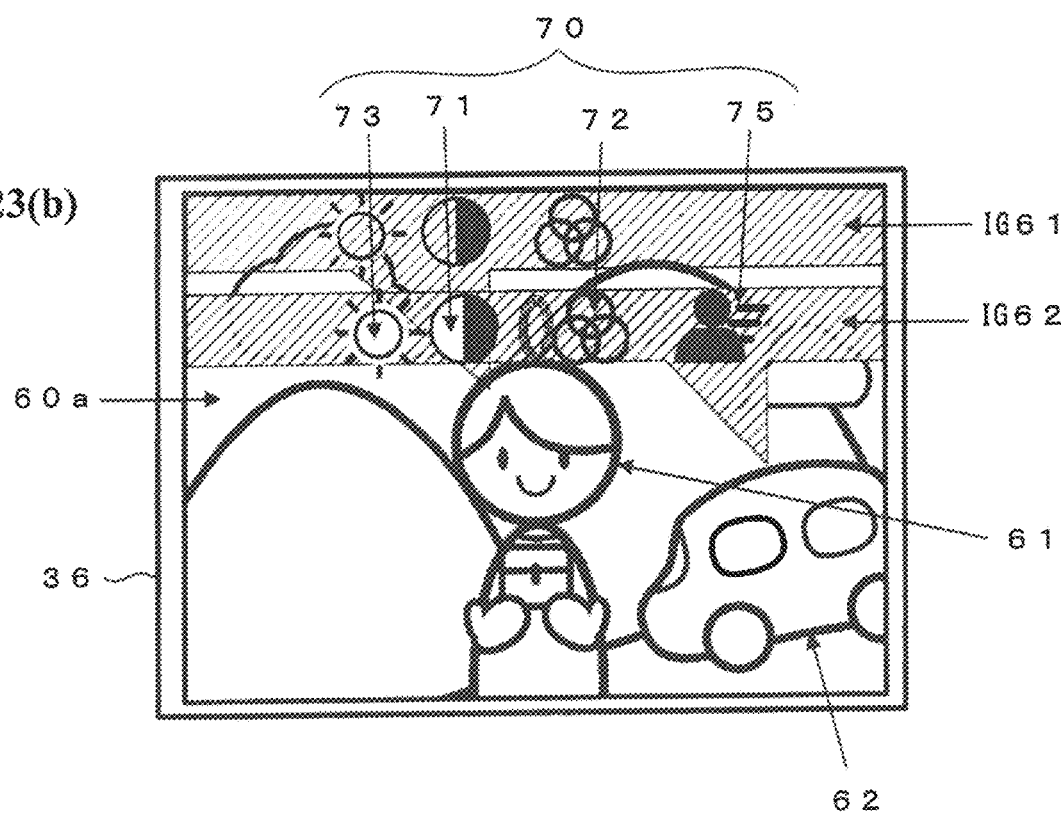

FIG. 23(b) is a view illustrating a setting screen after switching of the target region for setting (changing) image-capturing conditions. The contour of the second region 62 is highlighted in the live view image 60a displayed on the liquid crystal monitor 36. In the example of FIG. 23(b), the icon region IG62 corresponding to the second region 62 is displayed as an active region, while the icon region IG61 corresponding to the other region (the first region 61) is displayed as an inactive region. The control unit 35 enables operation on an icon group in the active icon region. The setting (change) of the image-capturing conditions for the target regions performed in the operation on the enabled icon group is the same as described above. The description thereof will thus be omitted.

Figure 24A:
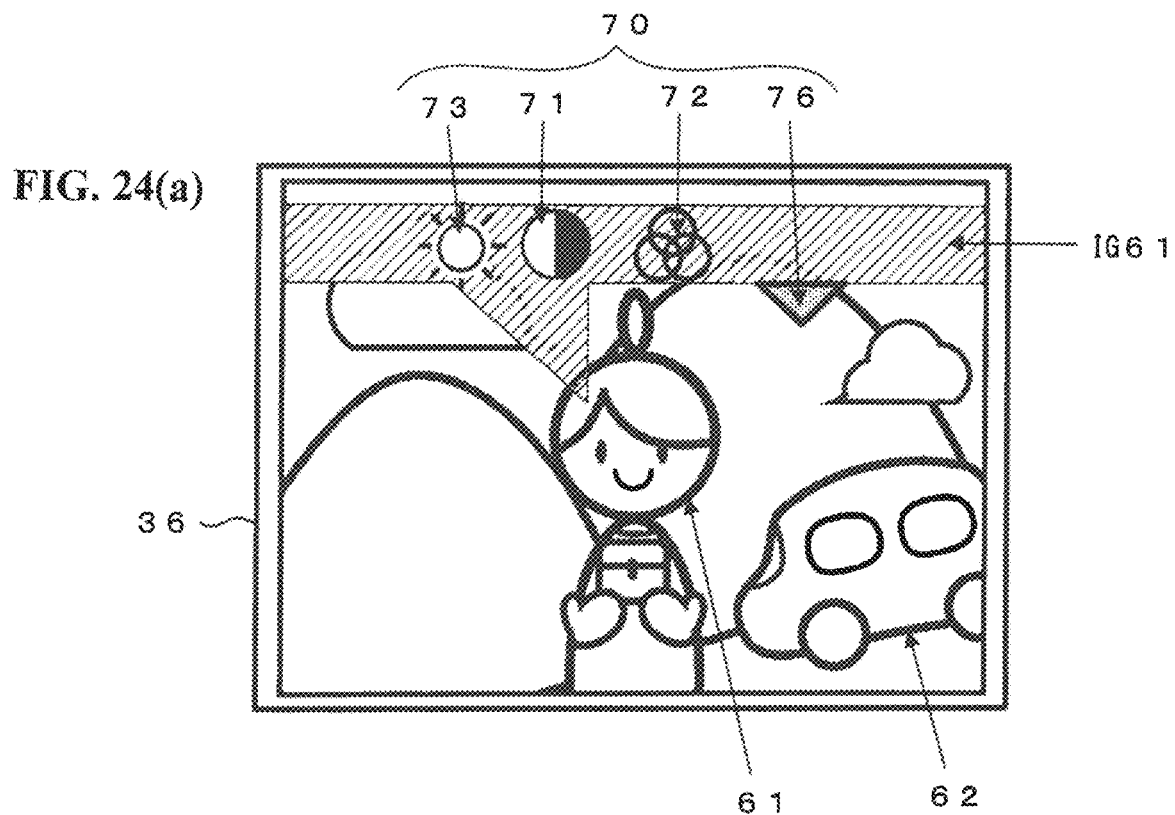
FIGS. 24(a) and 24(b) are views illustrating a setting screen for image-capturing conditions in the sixth variation.

The icon region IG61 and the icon region IG62 may be separately displayed. FIG. 24(a) is a view illustrating a setting screen for image-capturing conditions. The contour of the first region 61 is highlighted in the live view image 60a displayed on the liquid crystal monitor 36.

In FIG. 24(a), the control unit 35 displays a first icon group including an icon 71, an icon 72, and an icon 73 which are horizontally aligned in the icon region IG61 at the top end of the screen, for example, in association with the target region for setting (changing) image-capturing conditions (the first region 61 in this example). The icon region IG61 has a balloon to clearly indicate the correspondence between the icon region IG61 and the first region 61. The control unit 35 (the display control unit 35f) further displays a switching icon 76.

The control unit 35 enables operation on a first icon group in the displayed icon region IG61. The setting (change) of the image-capturing conditions for the target regions performed in the operation on the enabled icon group is the same as described above. The description thereof will thus be omitted.

Figure 24B:
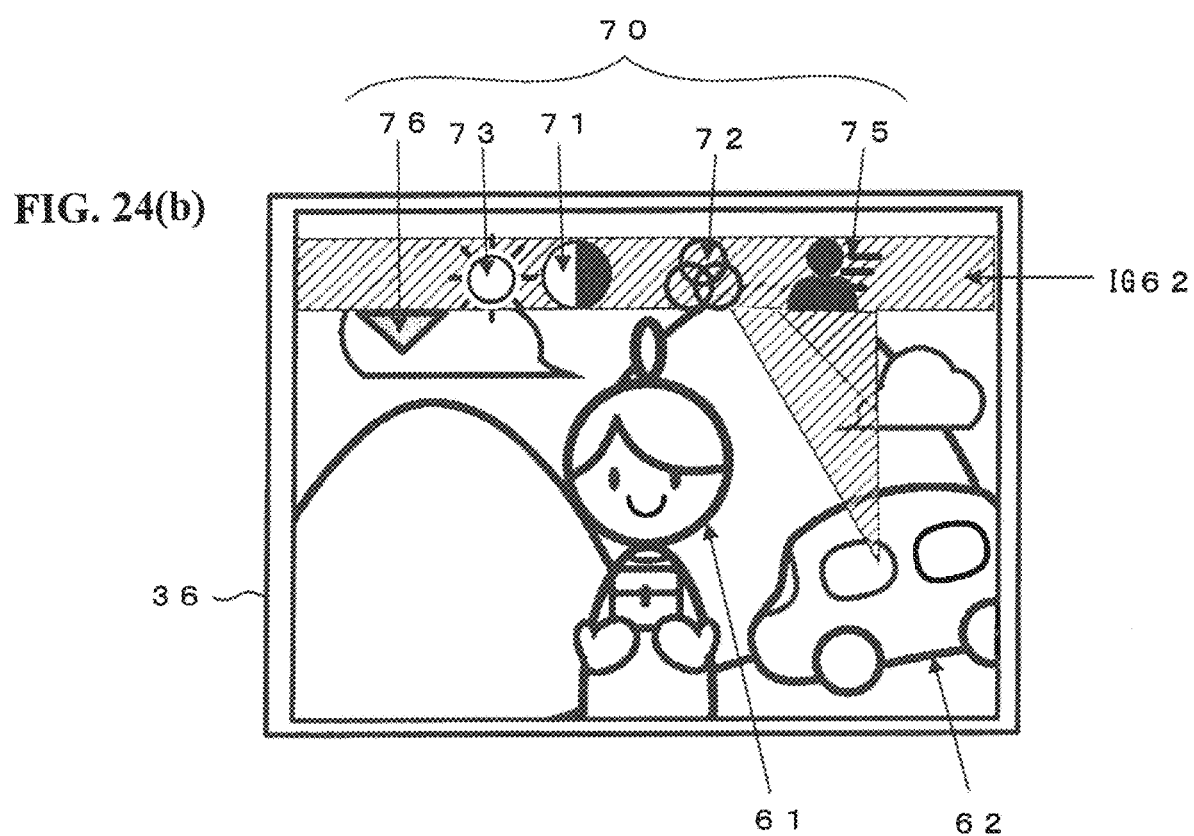

FIG. 24(b) is a view illustrating a setting screen for image-capturing conditions if the switching icon 76 is tapped. If the switching icon 76 is tapped, the control unit 35 displays an icon region IG62 corresponding to the other target region for setting (changing) image-capturing conditions (the second region 62 in this example), instead of displaying the icon region IG61. The control unit 35 then displays a second icon group including an icon 71, an icon 72, an icon 73, and an icon 75 which are horizontally aligned, in the icon region IG62. The icon region IG62 has a balloon to clearly indicate the correspondence between the icon region IG62 and the second region 62. In FIG. 24(b), the contour of the second region 62 is highlighted in the live view image 60a displayed on the liquid crystal monitor 36.

The control unit 35 enables operation on a second icon group in the displayed icon region IG62. The setting (change) of the image-capturing conditions for the target regions performed in the operation on the enabled icon group is the same as described above. The description thereof will thus be omitted.

Switching between the icon region IG61 and the icon region IG62 may be performed without the switching icon 76. FIG. 25(a) is a view illustrating a setting screen for image-capturing conditions. The contour of the first region 61 is highlighted in the live view image 60a displayed on the liquid crystal monitor 36.

In FIG. 25(a), the control unit 35 displays a first icon group including an icon 71, an icon 72, and an icon 73 which are vertically aligned in the icon region IG61 to the left of the screen, for example, in association with the target region for setting (changing) image-capturing conditions (the first region 61 in this example). The icon region IG61 has a balloon to clearly indicate the correspondence between the icon region IG61 and the first region 61.

The control unit 35 enables operation on a first icon group in the displayed icon region IG61. The setting (change) of the image-capturing conditions for the target regions performed in the operation on the enabled icon group is the same as described above. The description thereof will thus be omitted.

The user drags a balloon portion of the icon region IG61 in the following manner. For example, the user drags the balloon portion to the display position of the second region 62 with a finger 90. Upon sensing this drag operation, the control unit 35 switches the screen to the setting screen illustrated in FIG. 25(b). The contour of the second region 62 is highlighted in the live view image 60a.

In the example of FIG. 25(b), the control unit 35 displays a second icon group including an icon 71, an icon 72, an icon 73, and an icon 75 which are vertically aligned, in the icon region IG62 corresponding to the second region 62. The icon region IG62 has a balloon to clearly indicate the correspondence between the icon region IG62 and the second region 62.

The control unit 35 enables operation on a second icon group in the displayed icon region IG62. The setting (change) of the image-capturing conditions for the target regions performed in the operation on the enabled icon group is the same as described above. The description thereof will thus be omitted.

The icon region IG61 and the icon region IG62 may be displayed in a horizontal position. FIG. 25(c) is a view illustrating a setting screen for image-capturing conditions. The contour of the first region 61 is highlighted in the live view image 60a displayed on the liquid crystal monitor 36.

In FIG. 25(c), the control unit 35 displays a first icon group including an icon 71, an icon 72, and an icon 73 which are horizontally aligned in the icon region IG61 at the top of the screen, for example, in association with the target region for setting (changing) image-capturing conditions (the first region 61 in this example). The icon region IG61 has a balloon to clearly indicate the correspondence between the icon region IG61 and the first region 61.

The control unit 35 enables operation on a first icon group in the displayed icon region IG61. The setting (change) of the image-capturing conditions for the target regions performed in the operation on the enabled icon group is the same as described above. The description thereof will thus be omitted.

The user drags a balloon portion of the icon region IG61 in the following manner. For example, the user drags the balloon portion to the display position of the second region 62 with a finger 90. Upon sensing this drag operation, the control unit 35 switches the screen to the setting screen illustrated in FIG. 25(d). The contour of the second region 62 is highlighted in the live view image 60a.

In the example of FIG. 25(d), the control unit 35 displays a second icon group including an icon 71, an icon 72, an icon 73, and an icon 75 which are horizontally aligned, in the icon region IG62 corresponding to the second region 62. The icon region IG62 has a balloon to clearly indicate the correspondence between the icon region IG62 and the second region 62.

The control unit 35 enables operation on a second icon group in the displayed icon region IG62. The setting (change) of the image-capturing conditions for the target regions performed in the operation on the enabled icon group is the same as described above. The description thereof will thus be omitted.

The control unit 35 may set image-capturing conditions set (changed) for a certain region, also for another region (a copy of the image-capturing conditions). For example, on the screen illustrated in FIG. 25(a), the user holds down the icon region IG61 for some time (e.g., the user keeps touching for one second or more). Upon sensing this holding-down operation, the control unit 35 changes the display mode of the icon region IG61 to display the icon region IG61 as if it were embossed on the screen.

The user taps the display position of the second region 62, for example, while the display mode of the icon region IG61 has been changed. Upon sensing this tap operation, the control unit 35 switches the screen to a setting screen illustrated in FIG. 25(e). The contour of the second region 62 is highlighted in the live view image 60a.

In the example of FIG. 25(e), the control unit 35 displays a second icon group including an icon 71, an icon 72, an icon 73, and an icon 75 which are vertically aligned, in the icon region IG62 corresponding to the second region 62. The display positions of the icons 71 to 73 in the vertical direction are the same as the display positions of the first icon group of FIG. 25(a). The icon region IG62 has a balloon to clearly indicate the correspondence between the icon region IG62 and the second region 62.

The control unit 35 (the image-capturing condition setting unit 35d) further sets the same adjustment parameters for the second region 62 as that for the first region 61, and sets the parameters in the image-capturing unit 32 or the image processing unit 33. The setting in the image-capturing unit 32 is intended to achieve the change by changing the exposure condition of the image sensor 100 in the next image-capturing event. The setting in the image processing unit 33 is intended to obtain an image after the change by image processing on the live view image.

The icons 71 to 73 included in the second icon group of the second region 62 are the icons included in the first icon group (the icon 71, the icon 72, and the icon 73) in the icon region IG61 of FIG. 25(a).

The icon 75 is an icon that has not been included in the first icon group in the icon region IG61 of FIG. 25(a). The reason why the control unit 35 adds the icon 75 to the second icon group of the second region 62 is as follows.

The second region 62 includes the automobile 62a (FIG. 6) detected by the object detection unit 35a. The automobile 62a is typically a movable subject. Since an image of a moving subject may be blurred as described above, the control unit 35 automatically adds the icon 75 used for changing the shutter speed (the charge accumulation time) to the second icon group corresponding to the second region 62. The control unit 35 pops up and highlights the icon 75 that has not been included in the first icon group in the icon region IG61 (FIG. 25(a)), to inform the user of the fact that the icon 75 is now added to the second icon group in the icon region IG62 (FIG. 25(e)).

The control unit 35 enables operation on a second icon group in the displayed icon region IG62.

Icons to be displayed in the first icon group of the icon region IG61 or the second icon group of the icon region IG62 can be added by a user operation. An example will be described in which the icon 75 used for changing the shutter speed (the charge storage time) is added to the first icon group of the icon region IG61 illustrated in FIG. 23(a) and FIG. 24(a).

Figure 26A:
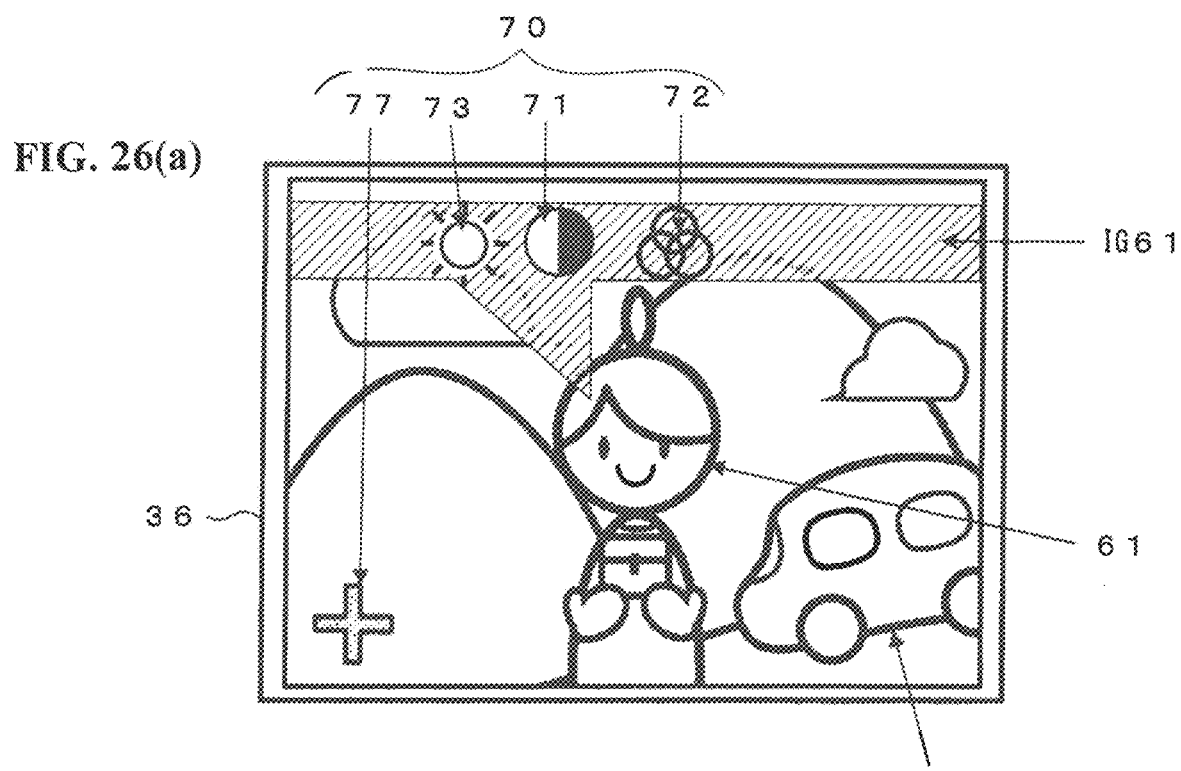
FIGS. 26(a) and 26(b) are views illustrating a setting screen for image-capturing conditions in the sixth variation.
Figure 26B:
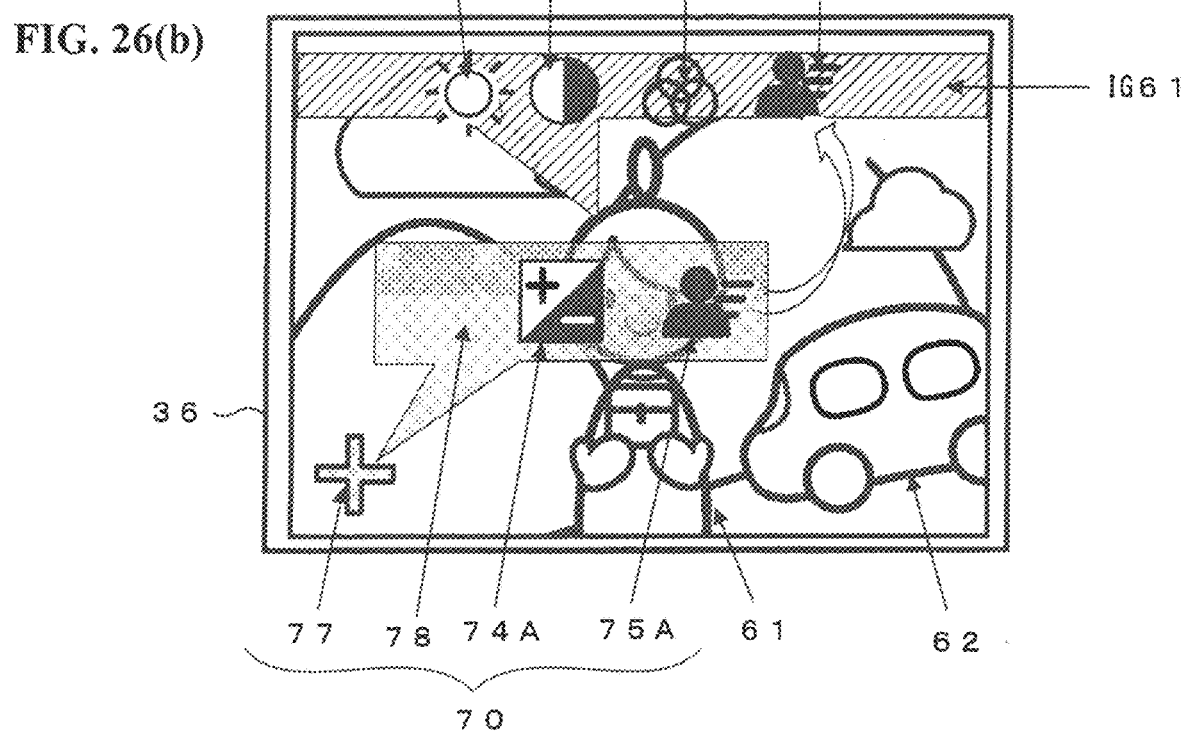

FIG. 26(b) is a view illustrating a setting screen for image-capturing conditions. The contour of the first region 61 is highlighted in the live view image 60a displayed on the liquid crystal monitor 36.

In FIG. 26(a), the control unit 35 displays a first icon group including an icon 71, an icon 72, and an icon 73 which are horizontally aligned in the icon region IG61 at the top end of the screen, for example, in association with the target region for setting (changing) image-capturing conditions (the first region 61 in this example). The icon region IG61 has a balloon to clearly indicate the correspondence between the icon region IG61 and the first region 61. For example, the user holds down the icon region IG61 for some time (e.g., the user keeps touching for one second or more). Upon sensing this holding-down operation, the control unit 35 (the display control unit 35f) changes the display mode of the icon region IG61 to display the icon region IG61 as if it were embossed on the screen and also display a plus icon 77.

If the user taps the plus icon 77, the control unit 35 switches the screen to a setting screen illustrated in FIG. 26(b). In FIG. 26(b), the display mode of the icon region IG61 is returned to the normal mode and a candidate icon region 78 is displayed, which displays a candidate icon 74A and a candidate icon 75 as additional candidates.

If the user taps the icon 75A, for example, the control unit 35 adds the icon 75 corresponding to the candidate icon 75A to the first icon group of the icon region IG61 and displays the icon 75 while terminating the display of the candidate icon region 78.

The control unit 35 enables operation on an icon group in the displayed icon region IG61. The setting (change) of the image-capturing conditions for the target regions performed in the operation on the enabled icon group is the same as described above. The description thereof will thus be omitted.

If a predetermined time (e.g., two seconds) has elapsed without any tap operation on the candidate icon 74A or the candidate icon 75A in the candidate icon region 78, the control unit 35 terminates the display of the candidate icon region 78 without adding any icon to the first icon group of the icon region IG61.

When a knob icon 80 provided in the icon region is dragged, the control unit 35 may switch an icon region to be displayed as an active region and thus a target region for setting (changing) image-capturing conditions.

Figure 27A:
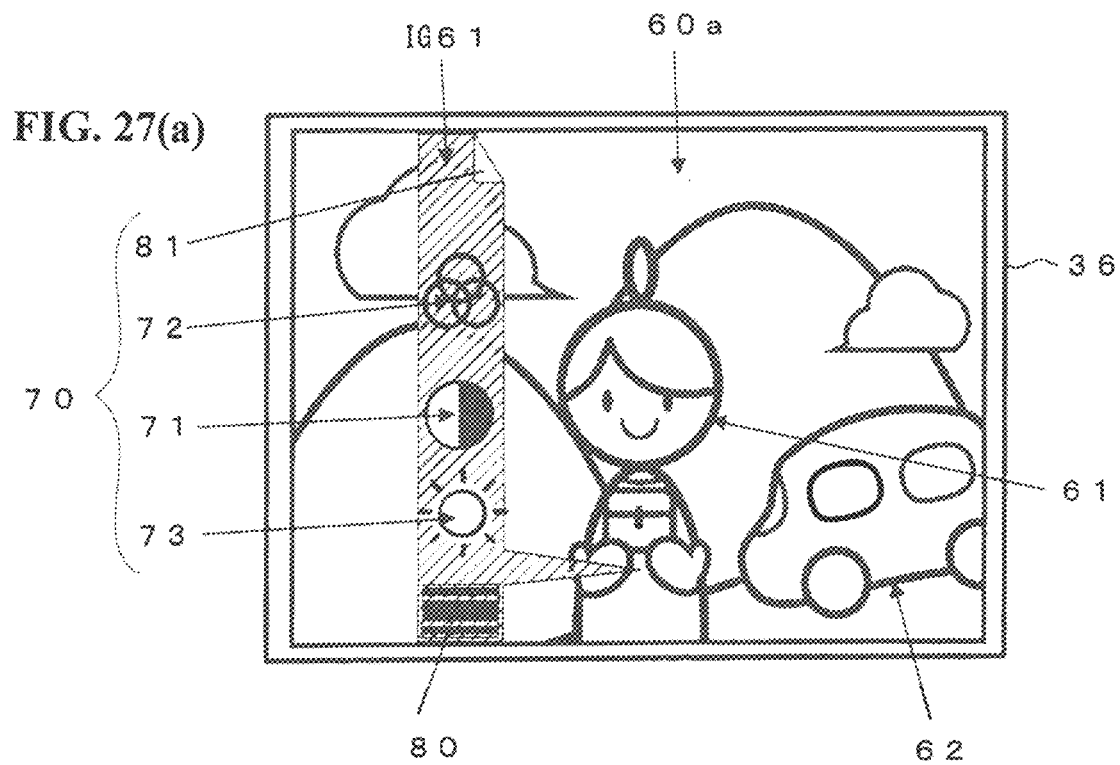
FIGS. 27(a) and 27(b) are views illustrating a setting screen for image-capturing conditions in the sixth variation.

FIGS. 27(a) to 28(b) are views illustrating setting screens of image-capturing conditions. In FIG. 27(a), the contour of the first region 61 is highlighted in the live view image 60a displayed on the liquid crystal monitor 36.

The control unit 35 displays a first icon group including an icon 71, an icon 72, and an icon 73 which are vertically aligned in the icon region IG61 located to the left of the first region 61, in association with the target region for setting (changing) image-capturing conditions (the first region 61 in this example). The control unit 35 (the display control unit 35f) further displays the knob icon 80 at the bottom of the screen in the icon region IG61. The icon region IG61 has a balloon to clearly indicate the correspondence between the icon region IG61 and the first region 61.

The control unit 35 enables operation on a first icon group in the icon region IG61 displayed on the screen of FIG. 27(a). The setting (change) of the image-capturing conditions for the target regions performed in the operation on the enabled icon group is the same as described above. The description thereof will thus be omitted.

The user drags the knob icon 80 of the icon region IG61 in the following manner. For example, the user drags the knob icon 80 toward the second region 62 (in the right direction of the screen in the example of FIG. 27(b)) with a finger 90. Upon sensing this drag operation, the control unit 35 shifts the icon region IG61 to the right in the screen. When the icon region IG61 reaches the first region 61, the control unit 35 switches the screen to the setting screen illustrated in FIG. 27(b). The contour of the second region 62 is highlighted in the live view image 60a of FIG. 27(b).

Figure 27B:
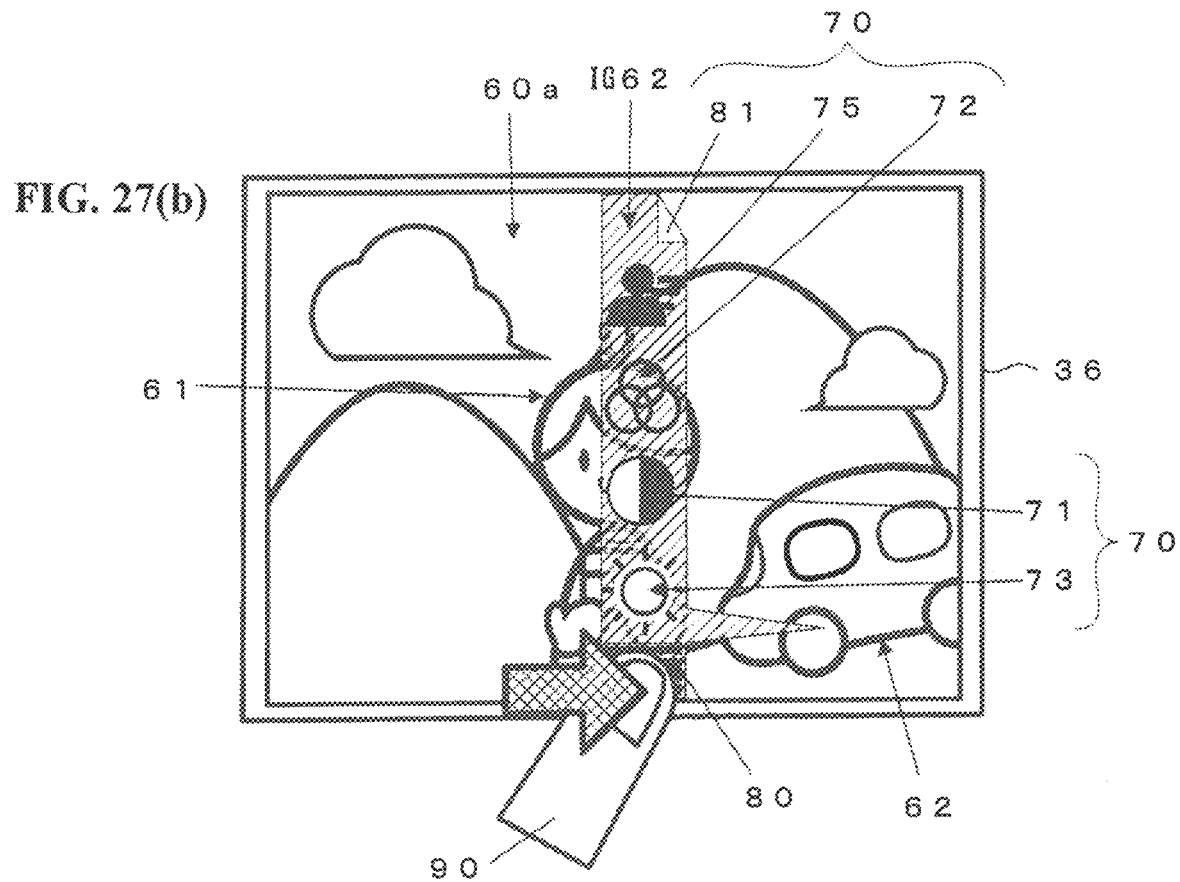

In the example of FIG. 27(b), the control unit 35 displays a second icon group including an icon 71, an icon 72, an icon 73, and an icon 75 which are vertically aligned, in the icon region IG62 corresponding to the second region 62. The icon region IG62 has a balloon to clearly indicate the correspondence between the icon region IG62 and the second region 62. The knob icon 80 displayed at the bottom of the screen in the icon region IG62 is the same as that in the icon region IG61.

The control unit 35 enables operation on a second icon group in the displayed icon region IG62.

The image-capturing conditions set (changed) by the user operating the icons of the icon group can be cancelled in the following manner. In FIG. 27(a), the control unit 35 displays the icon region IG61 with a representation of a folded corner 81 (e.g., an upper right corner) of the icon region IG61.

Figure 28A:
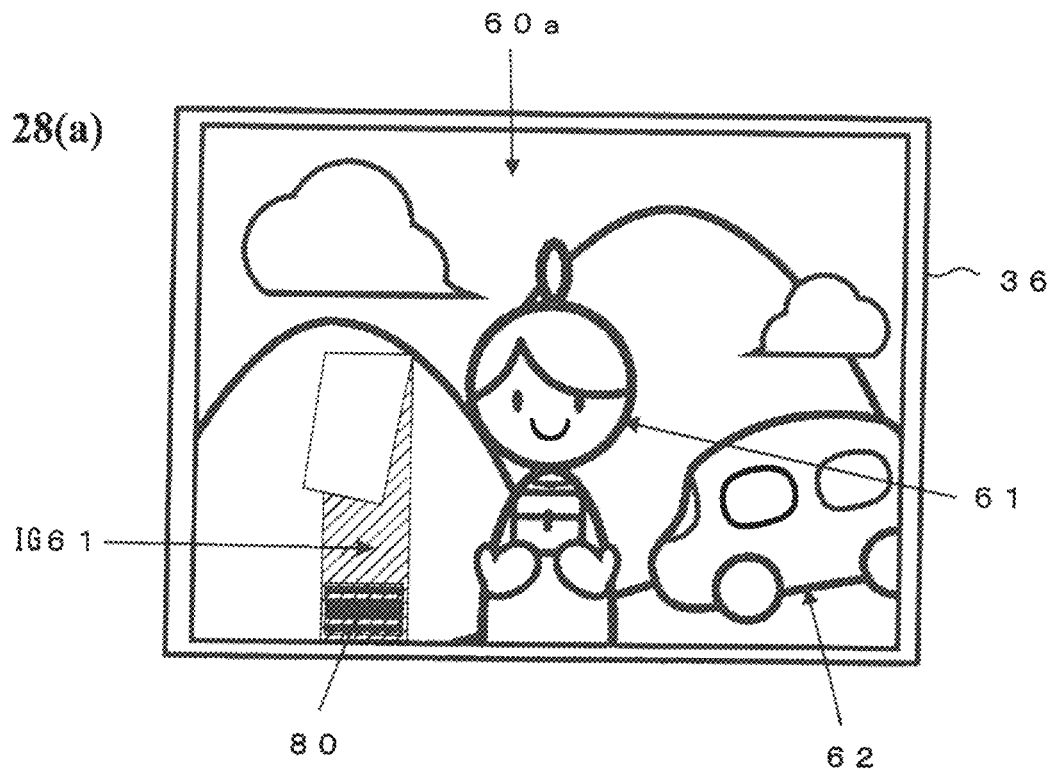
FIGS. 28(a) and 28(b) are views illustrating a setting screen for image-capturing conditions in the sixth variation.

FIG. 28(a) is a view illustrating a state in which the corner 81 of the icon region IG61 of FIG. 27(a) has been dragged. When the user wishes to return the image-capturing conditions set (changed) by the icon operation to the reference conditions, the user drags the corner 81 downward in the screen as if the user peeled off the icon region IG61 of FIG. 27(a). Upon sensing the drag operation illustrated in FIG. 28(a), the control unit 35 cancels the image-capturing conditions set (changed) with the first icon group of the icon region IG61.

Upon detecting the same drag operation on the corner 81 of the icon region IG62, the control unit 35 cancels the image-capturing conditions set (changed) with the second icon group of the icon region IG62 of FIG. 27(b).

Figure 28B:
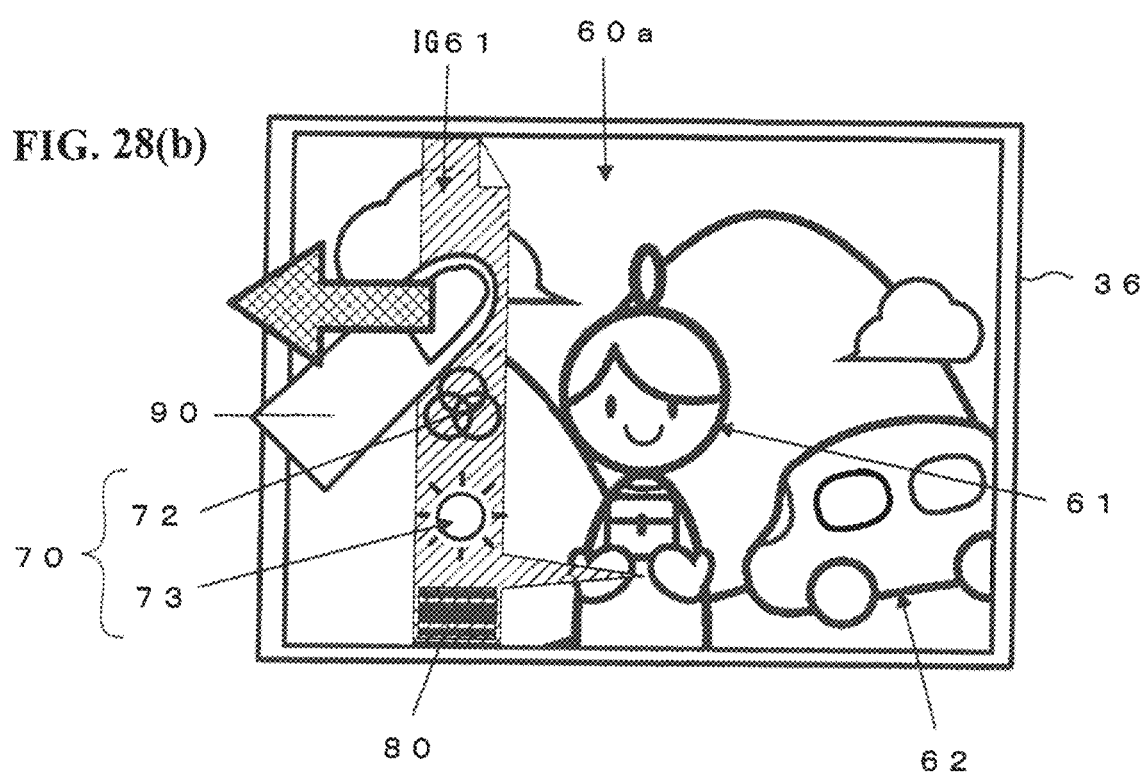

The icons displayed in the first icon group of the icon region IG61 and the second icon group of the icon region IG62 can be deleted by a user operation. FIG. 28(b) is a view illustrating a state in which one of the icons in the icon region IG61 is swiped with a finger 90. For example, if the swipe operation swipes the icon 71 from the icon region IG61 out of the screen, the control unit 35 deletes the icon 61 from the icon region IG61 and resets the image-capturing condition corresponding to the icon 71.

Instead of the swipe operation described above, the icon may be deleted in the following manner. The control unit 35 displays a delete icon (not shown) in the screen, in advance. If the user drags an unnecessary icon to the display position of the delete icon, the control unit 35 deletes the unnecessary icon and resets the image-capturing condition corresponding to the icon.

The control unit 35 adds the icon deleted from the icon region IG61 to the candidate icon region 78 (FIG. 26(b)) described in the eighth variation. This allows the once deleted icon to be added (restored) into the first icon group of the icon region IG61 or the second icon group of the icon region IG62 by a user operation.

The control unit 35 may separately display an icon region IGA for displaying the icon group corresponding to the exposure conditions and an icon region IGB for displaying the icon group corresponding to the image processing conditions.

Figure 29A:
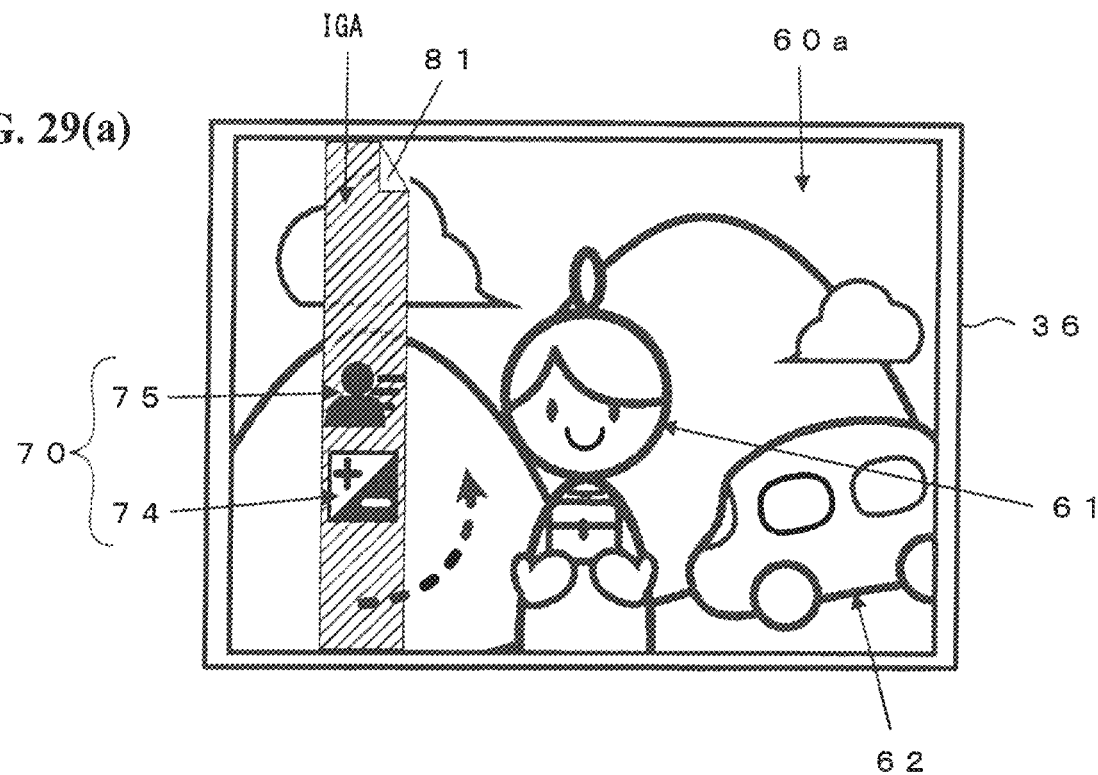
FIGS. 29(a) and 29(b) are views illustrating a setting screen for image-capturing conditions in the sixth variation.
Figure 29B:
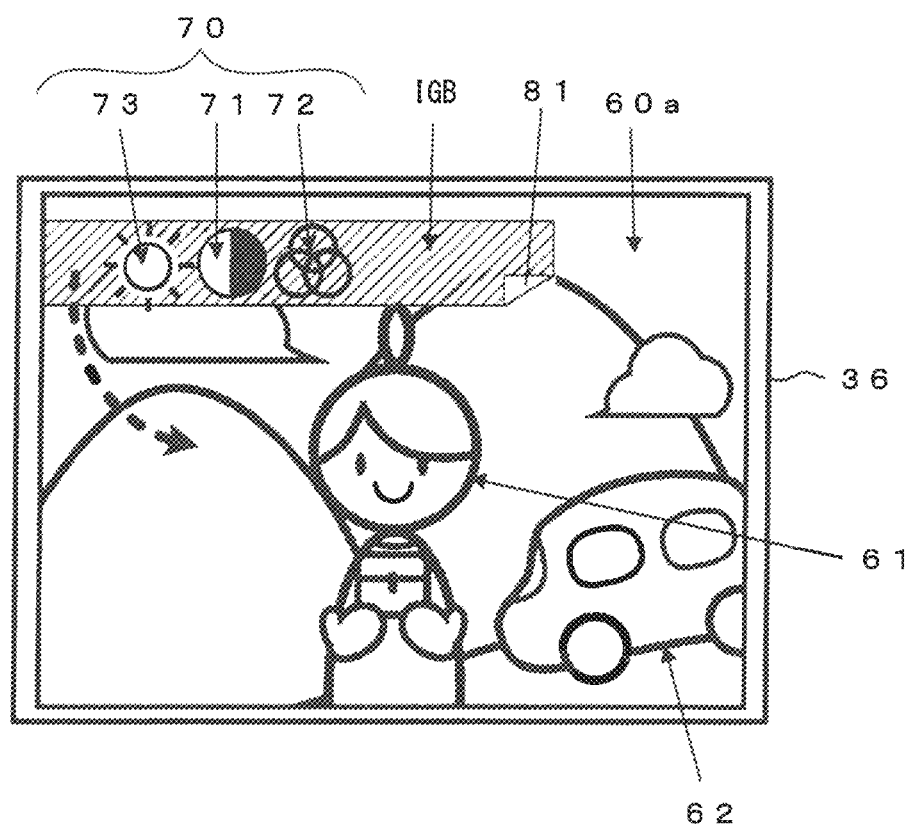

FIGS. 29(a) and 29(b) are views illustrating setting screens for image-capturing conditions. FIG. 29(a) illustrates the icon region IGA for displaying the icon group exclusively corresponding to the exposure conditions and FIG. 29(b) illustrates an icon region IGB for displaying the icon group exclusively corresponding to the image processing conditions.

In FIG. 29(a), the contour of the first region 61 is highlighted in the live view image 60a displayed on the liquid crystal monitor 36. The control unit 35 displays an icon 74 and an icon 75 that are vertically aligned in the icon region IGA located to the left of the first region 61, in association with the target region for setting (changing) image-capturing conditions (the first region 61 in this example). The control unit 35 (the display control unit 35f) further displays the icon region IGA with a representation of a folded corner 81.

The control unit 35 enables operation on the icon 74 and the icon 75 displayed on the screen of FIG. 29(a). The setting (change) of the image-capturing conditions for the target regions performed in the operation on the enabled icon group is the same as described above. The description thereof will thus be omitted. The cancellation operation of the image-capturing condition is also the same as described above, and thus the description thereof will be omitted.

When the user wishes to display the icon region IGB for displaying the icon group exclusively corresponding to the image processing conditions, the user swipes to draw an arc in the direction of an arrow in FIG. 29(a) as if the user pulled down the icon region IGA.

Upon detecting the swipe operation illustrated in FIG. 29(a), the control unit 35 displays the icon region IGB at the upper side of the first region 61 and displays the icons 71 to 73 horizontally aligned in the icon region IGB, correspondingly to the target region for setting (changing) image-capturing conditions, i.e., the first region 61 in this example (FIG. 29(b)). Additionally, the control unit 35 displays the icon region IGB with a representation of a folded corner 81. Also in FIG. 29(b), the contour of the first region 61 is highlighted in the live view image 60a displayed on the liquid crystal monitor 36.

The control unit 35 enables operation on the icons 71 to 73 displayed on the screen of FIG. 29(b). The setting (change) of the image-capturing conditions for the target regions performed in the operation on the enabled icon group is the same as described above. The description thereof will thus be omitted. The cancellation operation of the image-capturing condition is also the same as described above, and thus the description thereof will be omitted.

When the user wishes to display the icon region IGA for displaying the icon group exclusively corresponding to the exposure conditions, the user swipes to draw an arc in the direction of an arrow in FIG. 29(b) as if the user raised the icon region IGB in an upright position.

When the user wishes to switch the target region for setting (changing) image-capturing conditions, the user taps the display position of a main subject to be targeted on the display surface of the liquid crystal monitor 36 on which the live view image 60a is displayed.

By displaying separately, the user is given a clear representation of the icon region IGA for displaying the icon group exclusively corresponding to the exposure conditions and the icon region IGB for displaying the icon group exclusively corresponding to the image processing conditions.

Figure 30A:
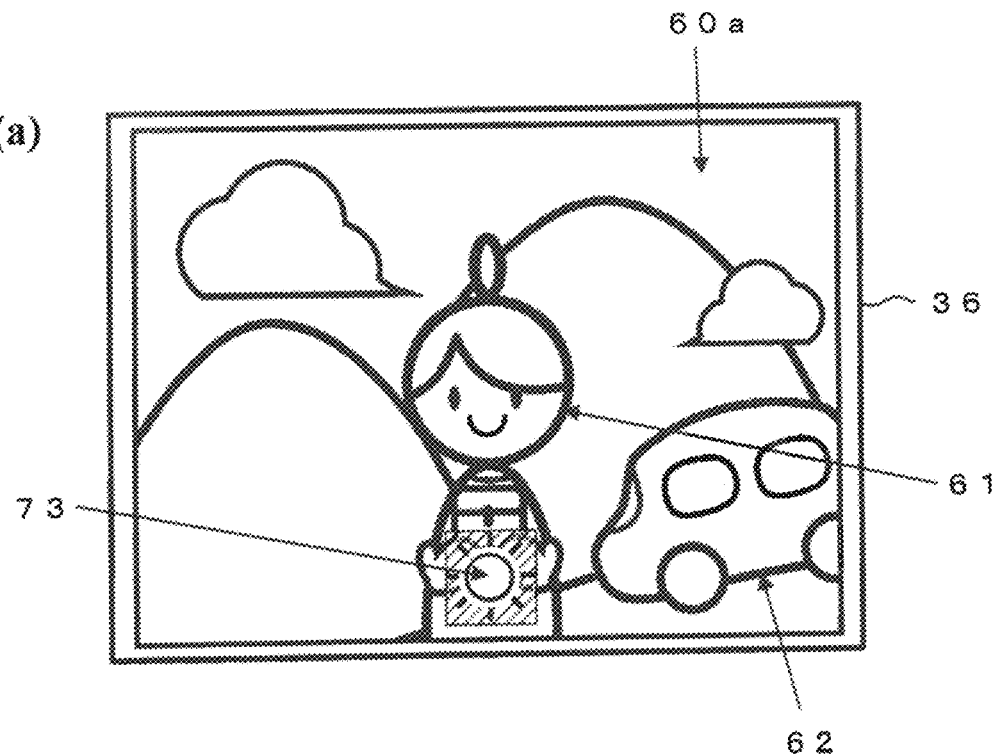
FIGS. 30(a) and 30(b) are views illustrating a setting screen for image-capturing conditions in the sixth variation.
Figure 30B:
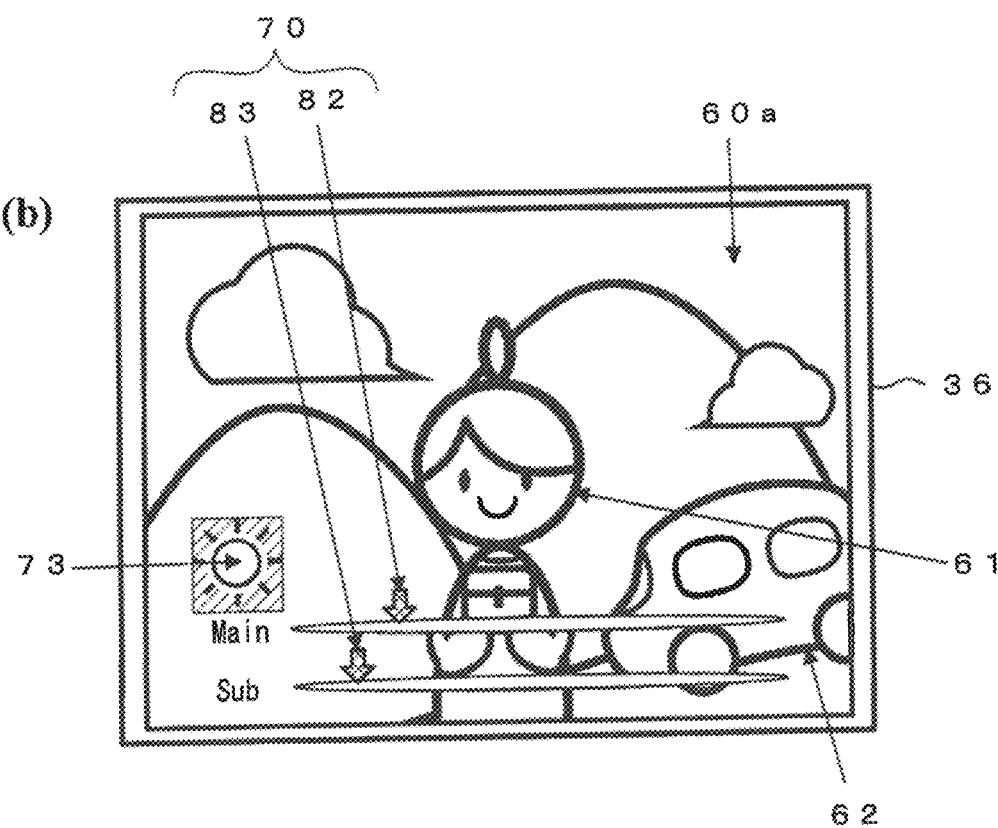

In the embodiments and variations described above, image-capturing conditions for one region are set (changed) without changing image-capturing conditions for other regions. The control unit 35 may set (change) image-capturing conditions of one region in conjunction with setting of other regions. FIGS. 30(a) and 30(b) are views illustrating setting screens for image-capturing conditions.

For example, on the screen illustrated in FIG. 29(b), the user holds down the first region 61 for some time (e.g., the user keeps touching for one second or more). Upon sensing this holding-down operation, the control unit 35 displays an icon menu (not shown) superimposed on the live view image 60a. The icon menu includes icons 71 to 75, for example. For example, if the user taps the icon 73 in the icon menu, the control unit 35 terminates the display of the icon menu and displays the icon 73 superimposed on the first region. An example of this screen is the setting screen of FIG. 30(a).

The control unit 35 changes the setting screen of FIG. 30(a) to the setting screen of FIG. 30(b). In the setting screen of FIG. 30(b), the control unit 35 determines the value of the brightness adjustment parameter set for other regions such as the second region 62, with reference to the value of the brightness adjustment parameter set for the first region 61.

A slide bar 82 of FIG. 30(b) is an operation member for changing the brightness for the first region 61, which is the target region. A slide bar 83 is an operation member for changing the brightness for regions (e.g., the second region 62) other than the target region. For example, if the user horizontally drags the slide bar 82 with a finger 90, the control unit 35 changes the brightness adjustment parameter of the first region 61 to a value corresponding to the position of the slide bar 82 after the drag operation.

The control unit 35 further controls the slide bar 83 to move by the same operation amount and in the same direction as that in the case of the slide bar 82, so that brightness adjustment parameters of regions other than the first region 61 are changed to values corresponding to the position of the slide bar 83 after the control.

If a predetermined time (e.g., two seconds) has elapsed without any operation on the slide bars 82, 83, the control unit 35 terminates the display of the slide bars 82, 83 and the icon 73 to display the screen of FIG. 29(*b*) again.

This makes it possible to adjust the brightness of the live view image 60*a* while the difference between brightnesses of the first region 61 and regions other than the first region 61 remains unchanged.

Figure 31A:
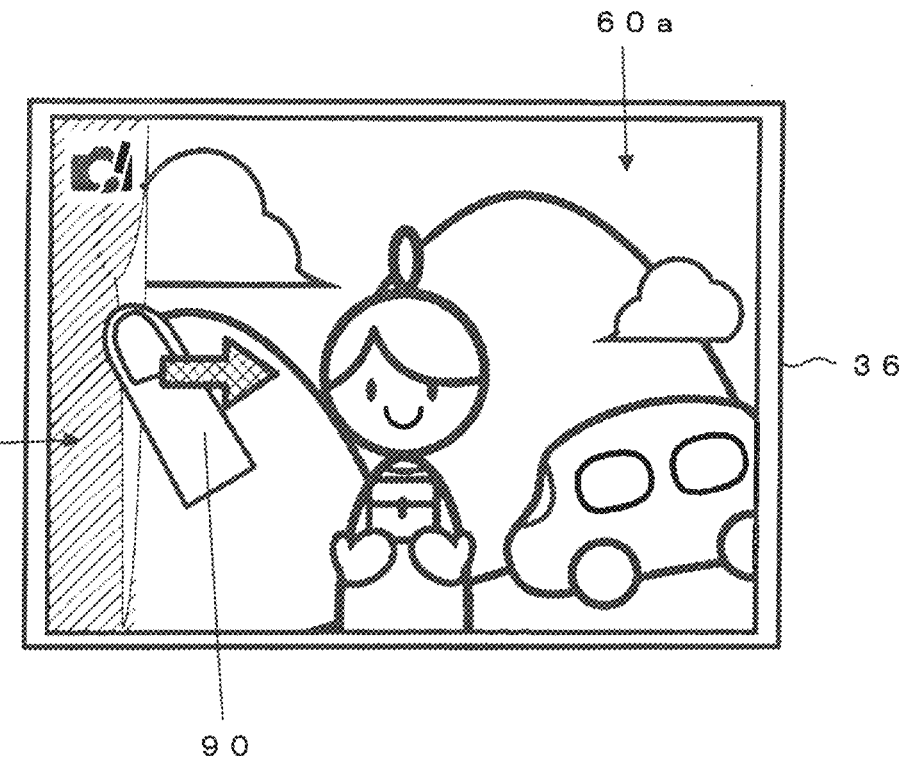
FIGS. 31(a) and 31(b) are views illustrating a setting screen for image-capturing conditions in the sixth variation.
Figure 31B:
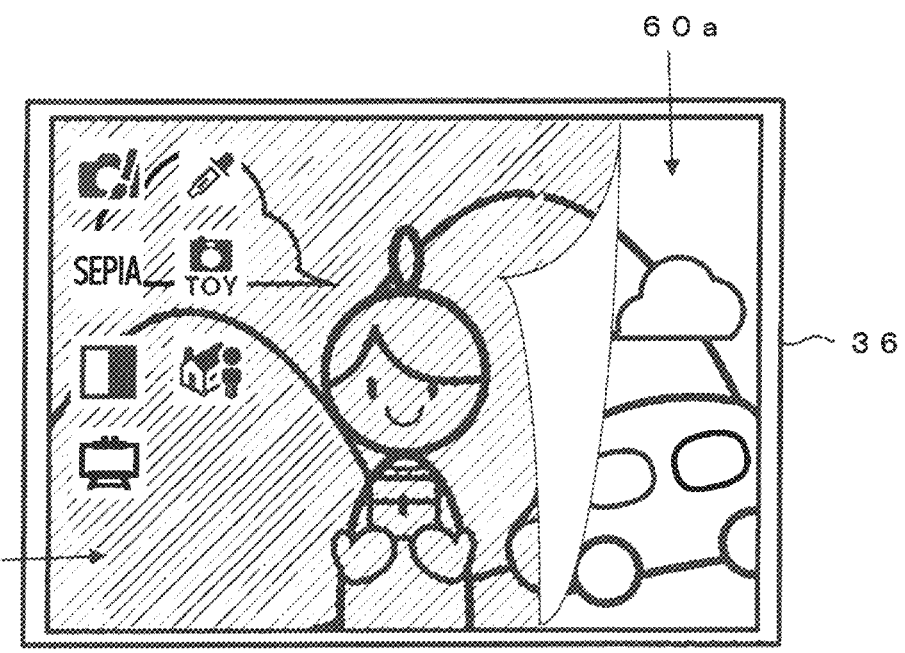

The control unit 35 can set (change) special effect processing on the image for regions. FIGS. 31(*a*) and 31(*b*) are views illustrating setting screens for image-capturing conditions.

For example, the user slides a finger 90 from the left end of the screen illustrated in FIG. 29(*b*) into the screen. Upon sensing this operation, the control unit 35 displays an effect palette 84 at the left end of the live view image 60*a*. An example of this screen is the setting screen of FIG. 31(*a*).

If the user performs an operation of pulling out the palette 84 with the finger 90, for example, the control unit 35 displays icons for special effect processing on the image, such as "selective color", "sepia", "toy camera effect", "monochrome", "miniature effect", and "painting effect", on the pulled-out pallet 84. An example of this screen is the setting screen of FIG. 31(*b*).

The user taps an icon among the icons. For example, if the user taps the "sepia" icon while the palette 84 covers the first region 61, the control unit 35 performs sepia tone processing on the image in the first region 61.

If an icon has been tapped on the setting screen of FIG. 31(*b*) or if a predetermined time (e.g., two seconds) has elapsed without any tap operation on the icons, the control unit 35 terminates the display of the palette 84.

In this way, the special effect processing on the image can be easily set (changed).

(Seventh Variation)

The above-described embodiment illustrates the camera 1 having the image-capturing unit 32 and the control unit 35 integrated into a single electronic device, as one example. An image-capturing system 1B may instead be configured in which the image-capturing unit 32 and the control unit 35 are separately provided and the control unit 35 controls the image-capturing unit 32 via communication means.

An example will be described below, in which a controller 1002 including the control unit 35 controls an image-capturing apparatus 1001 including the image-capturing unit 32.

Figure 32:
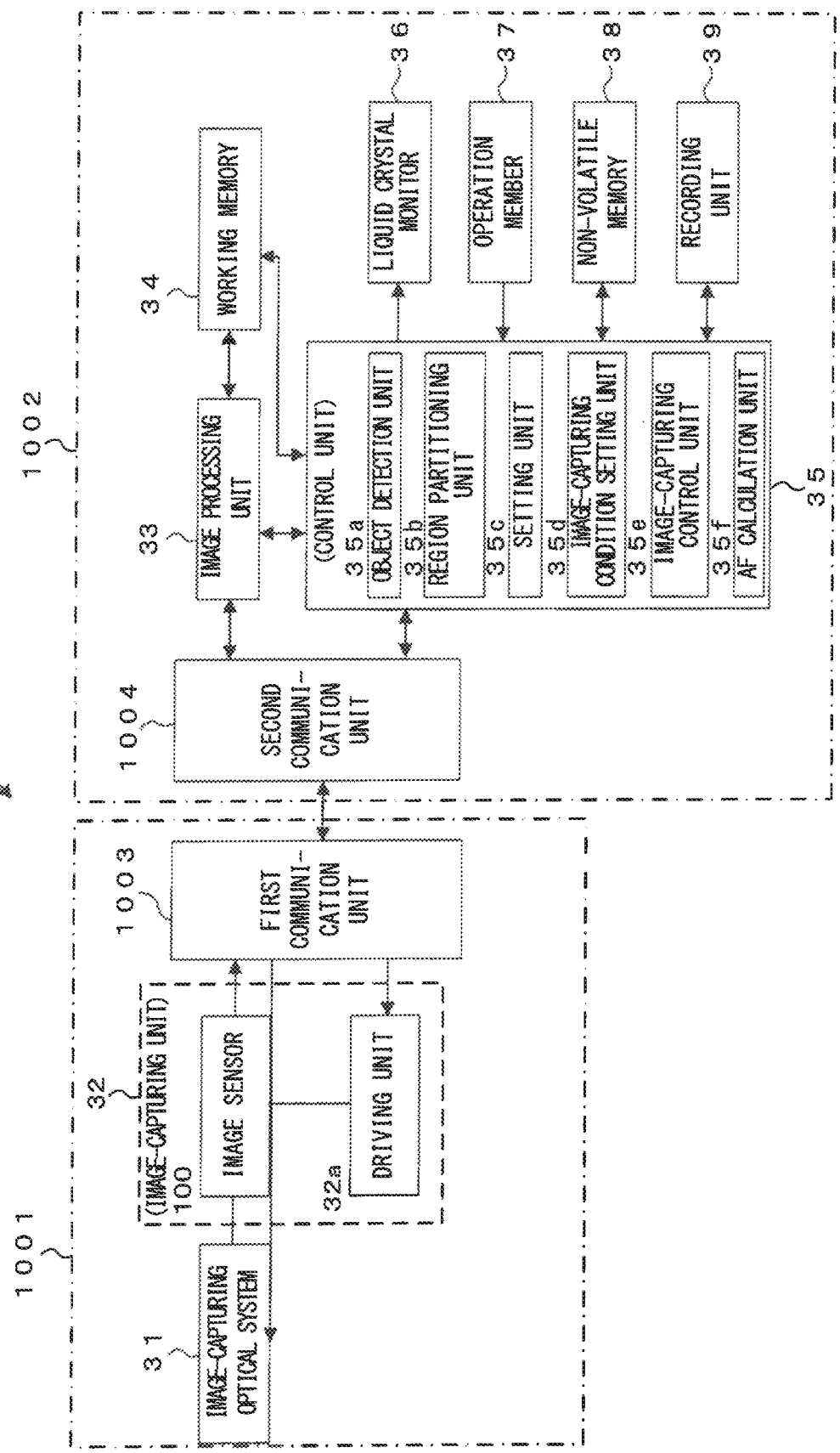
FIG. 32 is a block diagram illustrating a configuration of an image-capturing system according to a seventh variation.

FIG. 32 is a block diagram illustrating a configuration of the image-capturing system 1B according to a seventh variation. In FIG. 32, the image-capturing system 1B includes an image-capturing apparatus 1001 and a display device 1002. The image-capturing apparatus 1001 includes a first communication unit 1003 in addition to the image-capturing optical system 31 and the image-capturing unit 32 described in the above-described embodiment. The display device 1002 includes a second communication unit 1004 in addition to the image processing unit 33, the working memory 34, the control unit 35, the liquid crystal monitor 36, the operation member 37, the non-volatile memory 38, and the recording unit 39 described in the above-described embodiment.

The first communication unit 1003 and the second communication unit 1004 can bidirectionally communicate data by well-known wireless communication technology, optical communication technology, or the like.

The first communication unit 1003 and the second communication unit 1004 may also bidirectionally communicate data by wired connection between the image-capturing apparatus 1001 and the display device 1002 with a wire cable.

As the control unit 35 performs data communication via the second communication unit 1004 and the first communication unit 1003, the image-capturing system 1B performs controls on the image-capturing unit 32. For example, predetermined control data is transmitted and received between the image-capturing apparatus 1001 and the display device 1002, so that the display device 1002 partitions a screen into a plurality of regions, ranks the partitioned regions, sets different image-capturing conditions for different partitioned regions, reads out an image-capturing signal captured in each region, and so on, on the basis of the image as described above.

According to the seventh variation, a live view image acquired in the image-capturing apparatus 1001 and transmitted to the display device 1002 is displayed on the liquid crystal monitor 36 of the display device 1002. The user can thus remotely operate the image-capturing apparatus 1001 via the display device 1002 remote from the image-capturing apparatus 1001.

The display device 1002 may include an advanced mobile phone 250 such as a smartphone. The image-capturing apparatus 1001 may include an electronic device including the above-described stacked image sensor.

In the above-described example, the control unit 35 of the display device 1002 includes the object detection unit 35*a*, the region partitioning unit 35*b*, the setting unit 35*c*, the image-capturing condition setting unit 35*d*, the image-capturing control unit 35*e*, and the AF calculation unit 35*f*. Alternatively, the image-capturing apparatus 1001 may include parts of the object detection unit 35*a*, the region partitioning unit 35*b*, the setting unit 35*c*, the image-capturing condition setting unit 35*d*, the image-capturing control unit 35*e*, and the AF calculation unit 35*f*.

(Eighth Variation)

Figure 33:
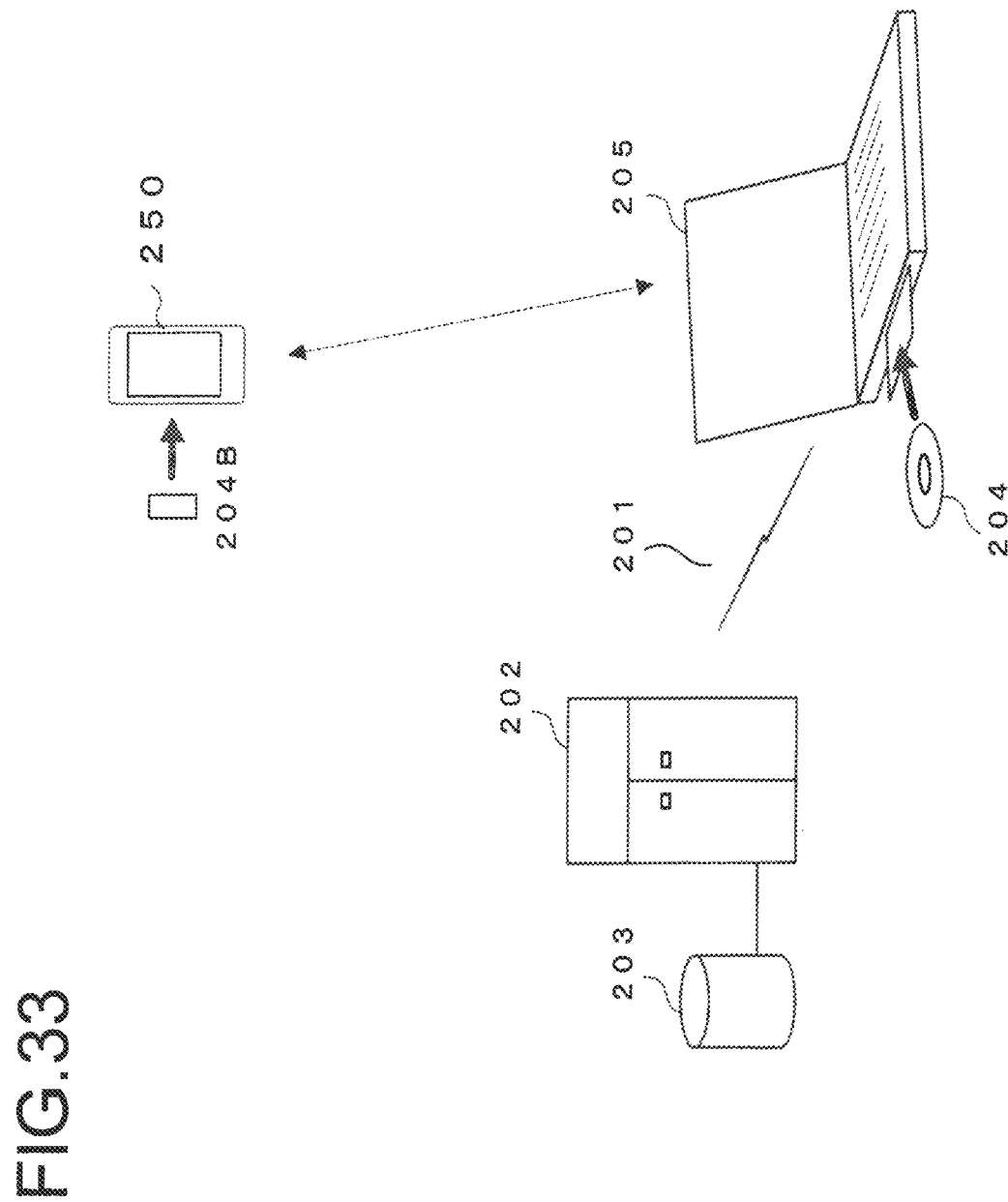
FIG. 33 is a view for explaining ways of supplying a program to a mobile device.

As illustrated in FIG. 33, for example, programs can be supplied from a personal computer 205 storing the programs, via infrared communication or near field wireless communication, to a mobile device as described above such as the camera 1, the advanced mobile phone 250, or a tablet terminal.

The personal computer 205 may be supplied with the programs by a recording medium 204, such as a CD-ROM storing the programs, inserted in the personal computer 205. Alternatively, programs may be loaded into the personal computer 205 via a communication line 201 such as a network. In the case of using the communication line 201, the programs are stored in a storage device 203 of a server 202 connected to the communication line or other storage devices.

The programs may also be directly transmitted to the mobile device via an access point (not shown) of a wireless LAN connected to the communication line 201. Alternatively, a recording medium 204B such as a memory card storing the programs may be inserted into the mobile device. Thus, the programs can be supplied in various forms of computer program products, such as products supplied via a recording medium or a communication line.

Although various embodiments and variations have been described above, the present invention is not limited to these embodiments and variations. Other aspects contemplated within the technical idea of the present invention are also included within the scope of the present invention.

The disclosure of the following priority application is incorporated herein by reference.

Japanese Patent Application No. 2014-245433 (filed Dec. 3, 2014)

REFERENCE SIGNS LIST

1 . . . camera
1B . . . image-capturing system
2 . . . electronic device
32 . . . image-capturing unit
35 . . . control unit
35a . . . object detection unit
35b . . . region partitioning unit
35c . . . setting unit
36 . . . liquid crystal monitor
100 . . . image sensor
1001 . . . image-capturing apparatus
1002 . . . display device

The invention claimed is:

1. An electronic device comprising: an image sensor having a pixel region for capturing an image of a subject; and a control unit, which comprises a CPU, configured to control the image sensor to set image capturing conditions different from one another for a first region and a second region in the pixel region, the second region being disposed at a position in a row direction with respect to the first region, wherein: the control unit is further configured to control a display to display an image indicating a region for which an image capturing condition is changeable among the first region and the second region in the pixel region, based on information of the subject the image of which has been captured by the first region and of the subject the image of which has been captured by the second region, wherein: the plurality of the first pixels are connected to a first output line through which a signal from each of the first pixels is output; and the plurality of the second pixels are connected to a second output line through which a signal from each of the second pixels is output.

2. The electronic device according to claim 1, wherein: the control unit controls the display to display, as the region for which an image capturing condition is settable, a region that has captured an image of a subject associated with a preset scene capture mode among the subject the image of which has been captured by the first region and the subject the image of which has been captured by the second region.

3. The electronic device according to claim 1, wherein: the control unit controls the display to display, as the region for which an image capturing condition is settable, a region that has captured an image of a focused subject among the subject the image of which has been captured by the first region and the subject the image of which has been captured by the second region.

4. The electronic device according to claim 1, wherein: the control unit controls the display to display, as the region for which an image capturing condition is settable, a region that has captured an image of a subject that is closest to a housing of the electronic device among the subject the image of which has been captured by the first region and the subject the image of which has been captured by the second region.

5. The electronic device according to claim 1, wherein: the control unit controls the display to display, as the region for which an image capturing condition is settable, a region that has captured an image of a subject having a lower or higher brightness than a predetermined value among the subject the image of which has been captured by the first region and the subject the image of which has been captured by the second region.

6. The electronic device according to claim 1, wherein: the control unit controls the display to display, as the region for which an image capturing condition is settable, a region that has captured an image of a subject having a smaller difference in distances between objects in the subject among the subject the image of which has been captured by the first region and the subject the image of which has been captured by the second region.

7. The electronic device according to claim 1, wherein: the control unit controls the display to display, as the region for which an image capturing condition is settable, a region that has captured an image of a subject having a larger difference in brightness between objects in the subject among the subject the image of which has been captured by the first region and the subject the image of which has been captured by the second region.

8. The electronic device according to claim 1, wherein: the control unit controls the display to display, as the region for which an image capturing condition is settable, a region that has captured an image of a subject closer to a center of an angle of view among the subject the image of which has been captured by the first region and the subject the image of which has been captured by the second region.

9. The electronic device according to claim 1, wherein: the pixel region includes a plurality of pixels arranged along the row direction and along a column direction; the first region includes at least one first pixel among the plurality of pixels; and the second region includes at least one second pixel among the plurality of pixels.

10. The electronic device according to claim 9, wherein: the first pixel is connected to a first control line via which a control signal for controlling the first pixel is output; and the second pixel is connected to a second control line via which a control signal for controlling the second pixel is output.

11. The electronic device according to claim 9, wherein: the first region includes a plurality of the first pixels arranged along the row direction; and the second region includes a plurality of the second pixels arranged along the row direction.

12. The electronic device according to claim 9, wherein: the first region includes a plurality of the first pixels arranged along the column direction; and the second region includes a plurality of the second pixels arranged along the column direction.

13. The electronic device according to claim 1, wherein: the control unit is further configured to rank the first region and second region; and wherein the control unit being configured for displaying the image comprises the control unit being configured to display the first and second regions in order of the ranking.

* * * * *